United States Patent
Hakoda et al.

(10) Patent No.: US 10,043,141 B2
(45) Date of Patent: Aug. 7, 2018

(54) INFORMATION PROVISION METHOD AND INFORMATION PROCESSING METHOD

(71) Applicant: PANASONIC INTELLECTUAL PROPERTY CORPORATION OF AMERICA, Torrance, CA (US)

(72) Inventors: Kotaro Hakoda, Osaka (JP); Motoji Ohmori, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 900 days.

(21) Appl. No.: 14/408,654

(22) PCT Filed: Apr. 10, 2014

(86) PCT No.: PCT/JP2014/002073
§ 371 (c)(1),
(2) Date: Dec. 17, 2014

(87) PCT Pub. No.: WO2014/167863
PCT Pub. Date: Oct. 16, 2014

(65) Prior Publication Data
US 2015/0379436 A1    Dec. 31, 2015

Related U.S. Application Data

(60) Provisional application No. 61/811,446, filed on Apr. 12, 2013.

(30) Foreign Application Priority Data

Jun. 26, 2013   (JP) .................................. 2013-133522

(51) Int. Cl.
*G01C 21/00*    (2006.01)
*G06Q 10/02*    (2012.01)
(Continued)

(52) U.S. Cl.
CPC ......... *G06Q 10/02* (2013.01); *G06F 3/04847* (2013.01); *G06Q 30/02* (2013.01);
(Continued)

(58) Field of Classification Search
CPC .... G06Q 30/02; G06Q 10/02; G06F 3/04847; G06F 17/24; H04L 41/069; H04L 43/04
See application file for complete search history.

(56) References Cited

U.S. PATENT DOCUMENTS 8,935,621 B1 * 1/2015 Lounsbury .......... G06F 3/04842
715/739
2004/0254810 A1  12/2004 Yamaga et al.
(Continued)

FOREIGN PATENT DOCUMENTS

JP    2004-355376 A    12/2004
JP    4206953 B        10/2008
(Continued)

OTHER PUBLICATIONS

International Search Report for corresponding International Application No. PCT/JP2014/002073 dated Jun. 2, 2014.

*Primary Examiner* — Hussein Elchanti
(74) *Attorney, Agent, or Firm* — Renner Otto Boisselle & Sklar, LLP

(57) ABSTRACT

An information providing method includes: transmitting, in response to a user's access using a display terminal, first display data, including multiple check items to be used by the user who is choosing a service provider to be allowed to use a target device's log information to check the reliability of that service provider, to a display terminal; receiving selection information representing a set of selected check items including at least one check item selected from the check items included in the first display data using the display terminal; transmitting second display data representing a set of reference check items including, among multiple (Continued)

check items received from other users' terminals, check items which are either similar to, or the same as, check items included in the set of selected check items represented by the selection information, to the display terminal; afterward receiving editing information representing an edited set of check items obtained by editing the set of selected check items, from the display terminal after that; and providing the log information to a computer of the service provider who has been chosen based on the edited set of check items.

23 Claims, 44 Drawing Sheets

(51) Int. Cl.
  *G06Q 30/02* (2012.01)
  *G06F 3/0484* (2013.01)
  *H04L 12/24* (2006.01)
  *H04L 12/26* (2006.01)
  *G06F 17/24* (2006.01)

(52) U.S. Cl.
  CPC ............ *H04L 41/069* (2013.01); *H04L 43/04* (2013.01); *G06F 17/24* (2013.01)

(56) References Cited

U.S. PATENT DOCUMENTS

| | | | |
|---|---|---|---|
| 2006/0089842 A1* | 4/2006 | Medawar | G06Q 40/08 705/4 |
| 2008/0104058 A1* | 5/2008 | Billmaier | G06F 17/30817 |
| 2009/0197580 A1* | 8/2009 | Gupta | G06Q 30/02 455/414.2 |
| 2012/0101890 A1* | 4/2012 | Matsushita | G06Q 30/02 705/14.25 |
| 2013/0254172 A1 | 9/2013 | Watanabe | |
| 2014/0129951 A1* | 5/2014 | Amin | G06Q 50/30 715/738 |
| 2014/0201649 A1* | 7/2014 | Schoenberg | H04L 65/403 715/753 |
| 2015/0350600 A1* | 12/2015 | Beinlich | G06Q 10/10 348/14.08 |
| 2017/0134820 A1* | 5/2017 | Dunnahoo | H04N 21/4828 |

FOREIGN PATENT DOCUMENTS

| | | |
|---|---|---|
| JP | 4559195 B | 7/2010 |
| JP | 2012-123578 A | 6/2012 |
| WO | WO 2012/043300 A1 | 4/2012 |

* cited by examiner

| CHECK ITEM SET ID | SIMILAR CHECK ITEM SET |
|---|---|
| setID1 | { setID2, setID3, setID4 } |
| setID2 | { setID1, setID3, setID4 } |
| setID3 | { setID1, setID2, setID4 } |
| setID5 | { setID5, setID6, setID7 } |

| CHECK ITEM SET ID | NUMBER OF USERS |
|---|---|
| setID1 | 14847 |
| setID2 | 3279 |
| setID3 | 5538 |
| setID5 | 12438 |

FIG. 13

| COMPANY ID | COMPANY INFORMATION |
|---|---|
| compID1 | NAME OF COMPANY: ○○ BUSINESS COMPANY<br>ADDRESS: 12-26-20 OKADOMA, KADOMA, OSAKA<br>NUMBER OF YEARS OF PROVIDING: 5 YEARS AND 3 MONTHS<br>NUMBER OF USERS: 154374 PERSONS<br>AVERAGE USER RATING: 4.5<br>SAFETY: THIRD-PARTY CERTIFIED<br>USERS' COMMENTS: (XXXX., YYYY, ZZZZ,....)<br>PURPOSE OF USE: (SURVEY OF TV VIEWING HOURS, SURVEY OF PROGRAM RECORDED HOURS, APPLY CONSUMER ELECTRONIC LOGS TO MARKETING,...)<br>PERIOD OF USE: (1 WEEK, 1 MONTH, SIX MONTHS, 1 YEAR,....) |
| compID2 | NAME OF COMPANY: ××BUSSAN COMPANY<br>ADDRESS: 1-6-20 HIRAKATA, HIRAKATA, OSAKA<br>NUMBER OF YEARS OF PROVIDING: 15 YEARS AND 3 MONTHS<br>NUMBER OF USERS: 14534740PERSONS<br>AVERAGE USER RATING: 3.5<br>SAFETY: THIRD-PARTY CERTIFIED<br>USERS' COMMENTS: (XXXX., YYYY, ZZZZ,~,.....)<br>PURPOSE OF USE: (TV利用調査、SURVEY TO DEVELOP CONSUMER ELECTRONIC OS, APPLY CONSUMER ELECTRONIC LOGS TO MARKETING,...)<br>PERIOD OF USE: (1 WEEK, 1 MONTH, SIX MONTHS, 1 YEAR,....) |

| COMPANY ID | DEVICE | PURPOSE OF USE |
|---|---|---|
| compID1 | TV | SURVEY OF TV VIEWING HOURS, APPLY CONSUMER ELECTRONIC LOGS TO MARKETING |
| | RECORDER | SURVEY OF PROGRAM RECORDED HOURS, APPLY CONSUMER ELECTRONIC LOGS TO MARKETING |
| compID2 | AIR CONDITIONER | SURVEY OF TEMPERATURE VARIATION |
| compID3 | WASHING MACHINE | SURVEY OF LOAD OF LAUNDRY, APPLY CONSUMER ELECTRONIC LOGS TO MARKETING |
| | FRIDGE | SURVEY OF TEMPERATURE VARIATION, SERVEY OF NUMBER OF ROTATION OF COMPRESSOR |
| | AIR CLEANER | SURVEY OF OPERATING SITUATIONS |

| USER ID | DEVICE | LOG-USE-ALLOWED COMPANY ID | PURPOSE OF USE | PERIOD OF USE |
|---|---|---|---|---|
| userID1 | TV | companyID1 | SURVEY OF TV VIEWING HOURS | 1 YEAR |
| | | companyID2 | SURVEY OF TV VIEWING HOURS | 2 YEARS |
| | RECORDER | companyID3 | SURVEY OF PROGRAM RECORDED HOURS | 1 YEAR |
| | FRIDGE | companyID4 | SURVEY OF TEMPERATURE VARIATION | 1 YEAR |
| userID2 | | companyID6 | SURVEY OF TEMPERATURE VARIATION | 1 YEAR |
| | | companyID7 | SURVEY OF TEMPERATURE VARIATION | 1 YEAR |

- PURPOSE OF USE #1

☑APPLY CONSUMER ELECTRONIC LOGS TO MARKETING

- PURPOSE OF USE #2

☐SURVEY OF PC USING HOURS

- PURPOSE OF USE #3

☐SURVEY OF TV VIEWING HOURS

FIG. 39

| COMPANY ID | COMPANY INFORMATION |
|---|---|
| compID1 | NAME OF COMPANY: ○○ MARKETING CORPORATION<br>ADDRESS: 12-26-20 OKADOMA, KADOMA, OSAKA<br>NUMBER OF YEARS OF PROVIDING: 5 YEARS AND 3 MONTHS<br>NUMBER OF USERS: 154374 PERSONS<br>AVERAGE USER RATING: 4.5<br>SAFETY: THIRD-PARTY CERTIFIED<br>USERS' COMMENTS: (XXXX., YYYY, ZZZZ, .....)<br>PURPOSE OF USE: (DO MARKETING IN AREA SURROUNDING RAILWAY STATION)<br>PERIOD OF USE: (1 WEEK, 1 MONTH, SIX MONTHS, 1 YEAR,....) |
| compID2 | NAME OF COMPANY: ×× BUSSAN COMPANY<br>ADDRESS: 1-6-20 HIRAKATA, HIRAKATA, OSAKA<br>NUMBER OF YEARS OF PROVIDING: 15 YEARS AND 3 MONTHS<br>NUMBER OF USERS: 14534740 PERSONS<br>AVERAGE USER RATING: 3.5<br>SAFETY: THIRD-PARTY CERTIFIED<br>USERS' COMMENTS: (XXXX., YYYY, ZZZZ, .....)<br>PURPOSE OF USE: (MAKE RESEARCH ON THE DEGREE OF CORRELATION BETWEEN ACTUAL CONDITIONS OF COMMUTING AND SALES OF DRINK PRODUCTS, ..)<br>PERIOD OF USE: (1 WEEK, 1 MONTH, SIX MONTHS, 1 YEAR,....) |

| USER ID | ITEM | LOG-USE-ALLOWED COMPANY ID | PURPOSE OF USE | PERIOD OF USE |
|---|---|---|---|---|
| userID1 | STATION, TIME AND HISTORY OF PURCHASE | companyID1 | PRODUCT DEVELOPMENT MARKETING | 1 YEAR |
| | | companyID2 | STATION SURROUNDING AREA DEVELOPMENT MARKETING | 2 YEARS |
| | STATION AND TIME | companyID3 | STATION SURROUNDING AREA DEVELOPMENT MARKETING | 1 YEAR |
| userID2 | STATION, TIME AND HISTORY OF PURCHASE | companyID4 | PRODUCT DEVELOPMENT MARKETING | 1 YEAR |
| | | companyID6 | STATION SURROUNDING AREA DEVELOPMENT MARKETING | 1 YEAR |
| | | companyID7 | STATION SURROUNDING AREA DEVELOPMENT MARKETING | 1 YEAR |

| USER ID | TYPE OF USE | DEPARTING STATION ID OR PURCHASE STORE ID | DEPARTURE TIME OR PURCHASE TIME | ARRIVING STATION ID | ARRIVAL TIME | PRODUCT PURCHASED | PAYMENT |
|---|---|---|---|---|---|---|---|
| userID1 | TRANSPORTATION | StaID:00032 | FEB. 8, 2013, 5:45 | StaID:00049 | FEB. 8, 2013, 6:05 | — | WITHIN COMMUTER PASS TICKET VALID RANGE |
| | PURCHASE | ShpID:10389 | FEB. 8, 2013, 10:00 | — | — | A BASS CANNED COFFEE BY S COMPANY AND AN EGG SANDWICH | 310 YEN |
| | TRANSPORTATION | StaID:00049 | FEB. 8, 2013, 17:53 | StaID:00032 | FEB. 8, 2013, 18:21 | — | WITHIN COMMUTER PASS TICKET VALID RANGE |
| userID2 | TRANSPORTATION | StaID:01205 | FEB. 7, 2013, 8:30 | StaID:01248 | FEB. 7, 2013, 9:15 | — | 320 YEN |
| | TRANSPORTATION | StaID:01248 | FEB. 7, 2013, 23:45 | StaID:01277 | FEB. 8, 2013, 0:15 | — | 280 YEN |
| | PURCHASE | ShpID:11219 | FEB. 8, 2013, 0:25 | — | — | A SPORT DRINK BY C COMPANY AND A HORSE RACING WEEKLY MAGAZINE | 580 YEN |

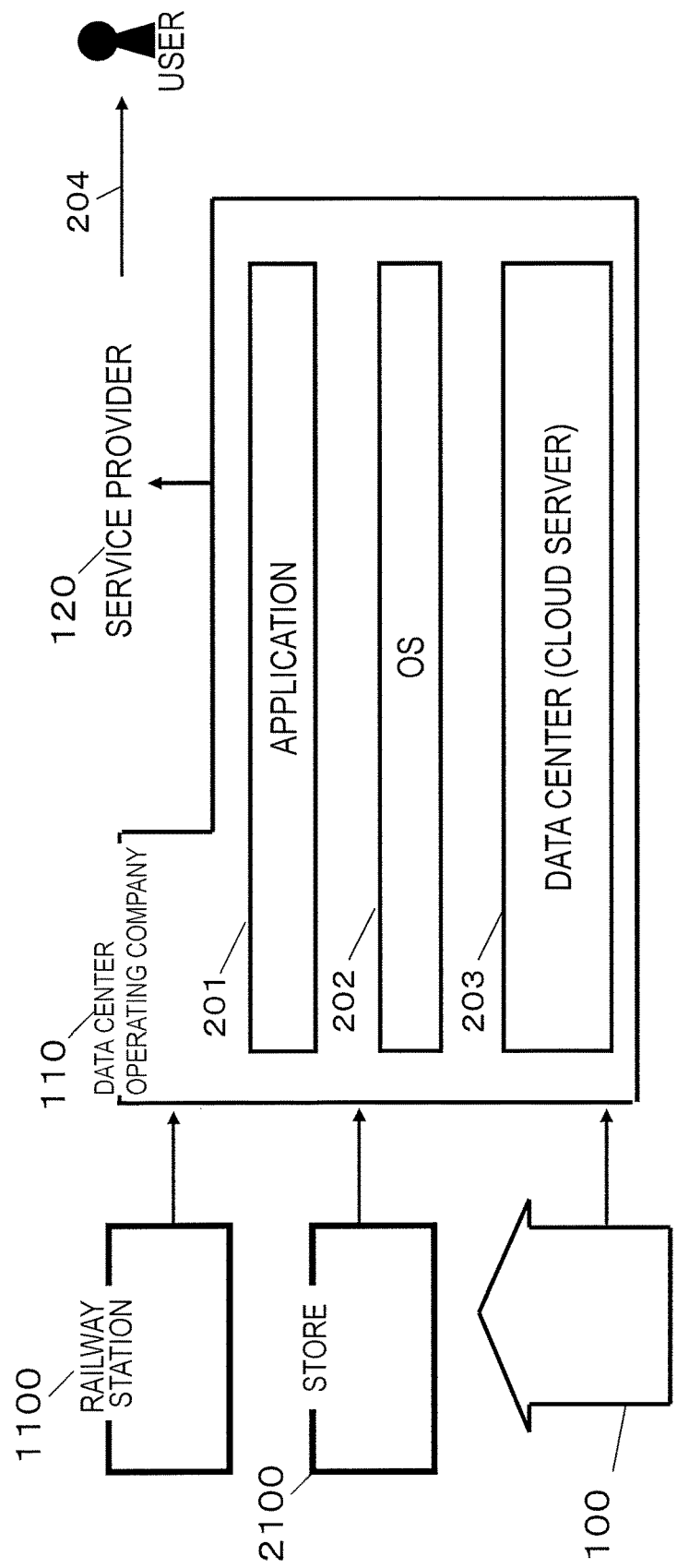

INFORMATION PROVISION METHOD AND INFORMATION PROCESSING METHOD

TECHNICAL FIELD

The present application relates to an information providing method and information processing method for use in an information management system to provide services by reference to the log information of a target device.

BACKGROUND ART

People have studied systems for collecting log information from a target device such as a consumer electronic device in a general household and providing services by reference to the log information thus collected. For example, Patent Document No. 1 mentions a system for aiding a consumer in maintaining his or her electronic device, and Patent Document No. 2 mentions a system for estimating the degree of deterioration of an air conditioner's performance.

CITATION LIST

Patent Literature

Patent Document No. 1: Japanese Patent No. 4559195
Patent Document No. 2: Japanese Patent No. 4206953

SUMMARY OF INVENTION

Technical Problem

However, such systems have not been realized yet and future studies and further improvements are needed to put those systems into practical use. Among other things, nobody has ever addressed a problem which should arise when the user is choosing a service provider who will be allowed to use log information in a system which is designed to collect the log information of a target device and give out that information to the service provider.

Solution to Problem

To overcome the problem described above, an information providing method according to an aspect of the present disclosure is designed to be used in an information management system which collects log information from a target device through a network and provides services by reference to the log information. The method includes transmitting, in response to a user's access using a display terminal, first display data to the display terminal. The first display data includes a plurality of check items to be used by the user who is choosing a service provider to be allowed to use the log information to check the reliability of the service provider. The method further includes: receiving selection information representing a set of selected check items including at least one check item that has been selected from the plurality of check items included in the first display data using the display terminal; and transmitting second display data representing a set of reference check items to the display terminal. The set of reference check items includes, among a plurality of check items that have been received from a number of other users' terminals, check items which are either similar to, or the same as, check items that are included in the set of selected check items represented by the selection information. The method further includes receiving editing information representing an edited set of check items obtained by editing the set of selected check items by reference to the set of reference check items represented by the second display data at the display terminal, from the display terminal, and providing the target device's log information to a computer of the service provider who has been chosen based on the edited set of check items.

An information processing method according to another aspect of the present disclosure is designed to be used in an information management system which collects log information from a target device through a network and provides services by reference to the log information. The method is defined to make a computer built in a display terminal for use in the information management system present information based on first display data on a display screen. The first display data includes a plurality of check items to be used by the user who is choosing a service provider to be allowed to use the log information to check the reliability of the service provider. The computer is also made to transmit selection information, representing a set of selected check items including at least one check item that has been selected from the plurality of check items, to a server in the information management system. The computer is further made to receive second display data representing a set of reference check items belonging to a plurality of check items that have been received from a number of other users' terminals. The set of reference check items includes check items which the server of the information management system has found either similar to, or the same as, check items that are included in the set of selected check items represented by the selection information. And the computer is made to present the set of reference check items represented by the second display data on the display screen and present the set of selected check items in an editable state on the display screen.

These general and particular aspects are implementable as a system, method or a computer program or a combination thereof.

Advantageous Effects of Invention

According to an aspect of the present disclosure, when a service provider who is going to be allowed to use a target device's log information is being chosen, materials for checking the reliability of that service provider is provided for the user. As a result, a system for providing services by reference to a target device's log information can be further improved.

BRIEF DESCRIPTION OF DRAWINGS

FIG. 13 A table which may be stored in a company information DB.

FIG. 14 Another table which may be stored in the company information DB.

FIG. 17 A table on which information about log-use-allowed companies registered is recorded in the user information DB.

FIG. 37 A diagram that shows how to allow purposes of use (using checkboxes).

FIG. 39 A diagram that shows an exemplary table which may be stored in a company information DB according to the second embodiment.

FIG. 40 A diagram that shows an exemplary table 240*c* which may be stored in a user information DB 240 according to the second embodiment.

FIG. 41 A diagram that shows another exemplary table 240*e* which may be stored in the user information DB 240 according to the second embodiment.

FIG. 46 A diagram that illustrates an overall configuration for an information providing system of Service Type 4 according to the present disclosure.

DESCRIPTION OF EMBODIMENTS

Figure 1:
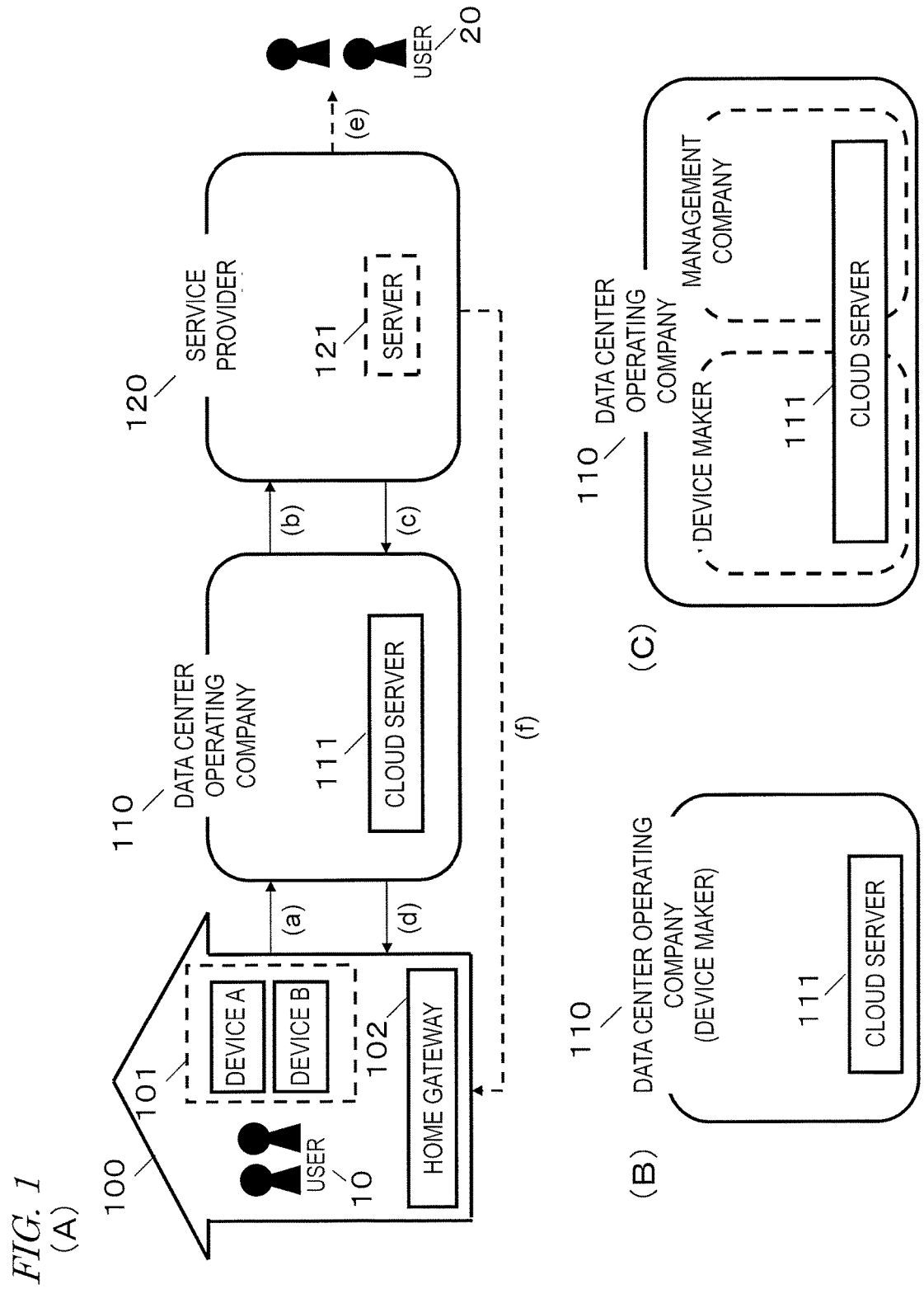
FIG. 1 A diagram that illustrates an overall configuration for an exemplary information providing system according to the present disclosure.

First of all, the findings that form the basis of the present disclosure will be described.

In implementing a system for collecting log information from a target device and giving out that information to a service provider (which will be sometimes hereinafter referred to as an "information management system" or a "service providing system"), it is risky to leave the choice of a service provider who will be allowed to use the log information only to a company who collects the log information. If the log information collected could be given to a service provider that the user does not like, he or she couldn't give out his or her log information with confidence. That is why there should be demands for choosing a service provider who will be allowed to use the log information by the user him- or herself who gives out the log information.

Meanwhile, it is not clear for the user exactly how to check the reliability of the service provider, because the criterion to check the reliability is indefinite. Even if the user has handpicked a service provider who will be allowed to use the log information, he or she cannot be 100% confident that he or she has made the right decision.

Thus, it occurred to the present inventors that if a person who is going to check the reliability of a service provider who will be allowed to use his or her log information can refer to the criteria of decision that have been thought to be important by other people, he or she will be more confident about his or her decision.

There is a search aiding system which allows the user to understand the contents of, and correct, a search expression more easily by representing the logical combination of the search expression by the relative positions of data items in a tree structure when a database is searched with those data items that form the database (see Japanese Laid-Open Patent Publication No. 2012-123578, for example). However, the technique disclosed in this document is nothing but a technique for searching information in a database with a data item or search expression that the user has selected by him- or herself. According to such a technique, the user cannot see what data items are selected by other users who are searching information in the same database for a similar purpose to his or hers.

In view of these considerations, the present inventors propose the following measures in order to improve the functionality of a service providing system.

An information providing method according to an aspect of the present disclosure is designed to be used in an information management system which collects log information from a target device through a network and provides services by reference to the log information. The method includes transmitting, in response to a user's access using a display terminal, first display data to the display terminal. The first display data includes a plurality of check items to be used by the user who is choosing a service provider to be allowed to use the log information to check the reliability of the service provider. The method further includes: receiving selection information representing a set of selected check items including at least one check item that has been selected from the plurality of check items included in the first display data using the display terminal; and transmitting, among a plurality of check items that have been received from a number of other users' terminals, second display data representing a set of reference check items to the display terminal. The set of reference check items includes check items which are either similar to, or the same as, check items that are included in the set of selected check items represented by the selection information. The method further includes receiving, by reference to the set of reference check items represented by the second display data at the display terminal, editing information representing an edited set of check items, obtained by editing the set of selected check items, from the display terminal, and giving the target device's log information to a computer of the service provider who has been chosen based on the edited set of check items.

In one embodiment, the information providing method includes determining, when the selection information is received, by reference to the plurality of check items that have been received from those other users' terminals, whether or not any other user has selected check items that are either similar to, or the same as, check items included in the set of selected check items represented by the selection information, and if the answer is yes, transmitting the second display data representing the set of reference check items to the display terminal.

In one embodiment, the information providing method includes transmitting, when the editing information is received, information about the number of other users who have selected the edited set of check items represented by that editing information to the display terminal.

In one embodiment, the set of reference check items includes at least a half of the check items that are included in the set of selected check items.

In one embodiment, the set of reference check items includes check items, of which the grade indicating a degree of similarity exceeds a predetermined grade. The degree of similarity is calculated based on the contents and arrangement order of those check items that are included in the plurality of check items received from those other users' terminals and on the contents and arrangement order of those check items that are included in the set of selected check items.

In one embodiment, the information providing method includes transmitting, when the editing information is received, third display data, including information about at least one service provider who deals with the edited set of check items represented by that editing information, to the display terminal. The third display data includes purpose of use information about the purpose for which each service provider is going to use that log information.

In one embodiment, the purpose of use information includes at least one item indicating for what purpose the log information is going to be used. The information providing method includes transmitting, when the choice of a service provider and a purpose of use that has been made through the display terminal is accepted, information about a period of time for which the service provider chosen is allowed to use the log information for the purpose of use to the display terminal.

In one embodiment, the third display data further includes purpose of use information about a purpose for which each service provider is going to use the log information and period-of-use information about a period of time for which each service provider is allowed to use the log information for that purpose of use.

In one embodiment, the target device includes a consumer electronic device that the user owns.

In one embodiment, the target device includes a first automatic ticket gate installed at a first railway station and a second automatic ticket gate installed at a second railway station. The log information includes entering history information indicating that the user has passed through the first automatic ticket gate to enter the first railway station from outside of the gate and leaving history information indicating that the user has passed through the second automatic ticket gate to leave the second railway station from inside of the gate. The entering history information includes a user ID by which the user is identifiable, first passage time information about a point in time when the user passed through the first automatic ticket gate, and a first railway station ID by which the first railway station is identifiable. And the leaving history information includes a user ID by which the user is identifiable, second passage time information about a point in time when the user passed through the second automatic ticket gate, and a second railway station ID by which the second railway station is identifiable.

An information processing method according to another aspect of the present disclosure is designed to be used in an information management system which collects log information from a target device through a network and provides services by reference to the log information. The method is defined to make a computer built in a display terminal for use in the information management system present information based on first display data on a display screen. The first display data includes a plurality of check items to be used by the user who is choosing a service provider to be allowed to use the log information to check the reliability of the service provider. The computer is also made to transmit selection information, representing a set of selected check items including at least one check item that has been selected from the plurality of check items, to a server in the information management system. The computer is further made to receive second display data representing a set of reference check items belonging to a plurality of check items that have been received from a number of other users' terminals. The set of reference check items includes check items which the server of the information management system has found either similar to, or the same as, check items that are included in the set of selected check items represented by the selection information. And the computer is made to present the set of reference check items represented by the second display data on the display screen and present the set of selected check items in an editable state on the display screen.

In one embodiment of the information processing method, the computer is further made to transmit editing information, representing an edited set of check items obtained by editing the set of selected check items, to the server of the information management system, and the edited set of check items is obtained by adding at least some check items, which are included in the set of reference check items presented on the display screen, to the set of selected check items.

In one embodiment of the information processing method, the computer is further made to receive the first display data and present the plurality of check items, represented by the first display data received, on the display screen.

In one embodiment of the information processing method, the computer is further made to present the set of selected check items on the display screen in parallel with the set of reference check items being presented on the display screen.

In one embodiment of the information processing method, the computer is further made to receive third display data, including information about at least one service provider who deals with the edited set of check items represented by the editing information, from the server of the information management system, and present the information about the at least one service provider on the display screen based on the third display data.

In one embodiment, the third display data includes purpose of use information about a purpose for which the at least one service provider is going to use the log information, and the information presented based on the third display data includes an indicator button indicating the purpose for which the at least one service provider is going to use the log information.

In one embodiment, the third display data includes purpose of use information about a purpose for which the at least one service provider is going to use the log information, and the information presented based on the third display data includes at least one item indicating the purpose for which the at least one service provider is going to use the log information.

In one embodiment, the third display data includes purpose of use information about a purpose for which the at least one service provider is going to use the log information. The information presented based on the third display data includes at least one item indicating the purpose for which the at least one service provider is going to use the log information. When a service provider who is going to be allowed to use the log information is chosen from the at least one service provider presented, the computer is further made to present the at least one item indicating the purpose for which the service provider chosen is going to use the log information on the display screen.

In one embodiment of the information processing method, the third display data includes purpose of use information about a purpose for which the at least one service provider is going to use the log information. The information presented based on the third display data includes an indicator button indicating the purpose for which the at least one service provider is going to use the log information. The computer is further made to present at least one item indicating the purpose for which the log information is going to be used on the display screen when the indicator button is pressed. The computer is further made to transmit information about a service provider who has been chosen from the at least one service provider and information about an item which has been selected from the at least one item indicating the purpose for which the log information is going to be used to the server in the information management system, and receive information about a period of time for which the service provider chosen is allowed to use the log information for the item selected from the server of the information management system.

In one embodiment of the information processing method, the computer is further made to transmit information about a service provider who has been chosen from the at least one service provider and information about an item which has been selected from the at least one item indicating the purpose for which the log information is going to be used to the server in the information management system. The computer is further made to receive information about a period of time for which the service provider chosen is allowed to use the log information for the item selected from the server of the information management system.

In one embodiment, the third display data includes purpose of use information about a purpose for which the at least one service provider is going to use the log information and period-of-use information about a period of time for which use of the log information is allowed for that purpose of use, and information presented based on the third display data further includes an indicator button indicating the period of time for which the log information is usable for the purpose of use.

In one embodiment, the third display data includes purpose of use information about a purpose for which the at least one service provider is going to use the log information and period-of-use information about a period of time for which use of the log information is allowed for that purpose of use, and information presented based on the third display data further includes at least one item indicating the purpose for which the at least one service provider is going to use the log information and information about the period of time for which the log information is usable for the purpose of use.

In one embodiment, when a service provider who is going to be allowed to use the log information is chosen from the at least one service provider presented, the computer is further made to present information about the purpose for which the service provider chosen is going to use the log information and information about a period of time for which the log information is usable for the purpose of use on the display screen.

In one embodiment, the target device includes a consumer electronic device that the user owns.

In one embodiment, the target device includes a first automatic ticket gate installed at a first railway station and a second automatic ticket gate installed at a second railway station. The log information includes entering history information indicating that the user has passed through the first automatic ticket gate to enter the first railway station from outside of the gate and leaving history information indicating that the user has passed through the second automatic ticket gate to leave the second railway station from inside of the gate. The entering history information includes a user ID by which the user is identifiable, first passage time information about a point in time when the user passed through the first automatic ticket gate, and a first railway station ID by which the first railway station is identifiable. The leaving history information includes a user ID by which the user is identifiable, second passage time information about a point in time when the user passed through the second automatic ticket gate, and a second railway station ID by which the second railway station is identifiable.

In this description, the terms are defined as follows:

The target device refers herein to a device which uses electric power for its heat source, light source or power source and from which information needs to be collected. The target device may be a consumer electronic device for use at home or in office or some device to be installed for business use at a railway station or at a store. Examples of consumer electronic devices include fridges, air conditioners, vacuum cleaners, air cleaners, TV sets, recorders/players, audio reproduction equipment, illuminators, hair dryers, and electric cookware. Examples of those devices for business use include automatic ticket gates to be installed at a railway station and cash registers (cashiers) to be installed at a store.

The log information refers herein to a record concerning the processing or operation that the target device has performed and the manipulations that the user has made on the target device. The log information may include various kinds of information that can be obtained from the target device such as information about the operation status or operation date and time of the target device. Examples of the log information include the viewing history of TV programs, the recording schedule of a recorder, the date and time of operation of a washing machine and the load of laundry put into the washing machine, the date and time and number of times a fridge was opened and closed, the history of a person's entering and leaving railway stations through automatic ticket gates, and the history of purchase at a cash register.

The user refers herein to a person who uses the service providing system, more specifically, a person who receives a service based on the log information given out or a person who does various settings about the log information given out using a service providing system. Such settings include the user's manipulation of choosing a service provider whom he or she allows to use the log information of the target device. In a general household, the head of the family who signed the contract with a service providing system may be the "user". For business use, on the other hand, a company, corporation or natural person who signed the contract with a service providing system may be the "user". If the target device is a consumer electronic device, the "user" in a general household is the person who owns the consumer electronic device, of which the log information will be given out, and the family members (including the "user" him- or herself) are the persons who use that consumer electronic device. The "user" may be the same as, or different from, the person who uses the consumer electronic device. In embodiments of the present disclosure, the "user" is supposed to be the same as the person who uses the consumer electronic device for convenience sake. However, they may be different from each other. On the other hand, if the target device is a device for business use such as an automatic ticket gate installed at a railway station or a cashier installed at a store, the person who owns that device is different from the "user".

The display data refers herein to any arbitrary kind of data to be presented on a display screen. The form of the data is not limited to any particular one, but may be data in XML (Exchangeable Markup Language) form, text data, or image data, for example. The "display data" may be numerical value data which is not compliant with any existent data form. If the display terminal constitutes a user interface that receives and presents the numerical value data, the numerical value data can be said to be "display data".

The display terminal refers herein to an information device with the ability to present information on a display screen. The "display terminal" may be not only a device with a built-in display screen but also a device which presents information on an external display screen. Examples of the "display terminals" include smartphones, tablet terminals, cellphones, laptop computers, desktop computers, and dedicated display terminals. Alternatively, a consumer electronic device with a display screen (such as a fridge, a washing machine or a TV set) may also be used as a "display terminal". Such a consumer electronic device not only outputs log information but also can perform a service provider choosing operation according to the present disclosure.

The cloud server refers herein to a computer or storage medium which is connected to a display terminal so as to communicate with the display terminal through a network and which feeds the display terminal with information that is needed for the user to choose a company to be allowed to use the log information. The "cloud server" is typically implemented as a combination of a general-purpose computer and software (i.e., a computer program) to perform the operation described above.

The network refers herein to a network which is made up of telecommunications lines. Examples of the "network" include the Internet, dedicated lines and LANs (local area networks).

Embodiments of the present disclosure will now be described with reference to the accompanying drawings.

Each of the embodiments to be described below shows a specific example of the present disclosure. The numerical values, shapes, components, steps and order of steps to be adopted in those embodiments are just examples and are never intended to limit the scope of the technique of the present disclosure. Also, among the components to be mentioned in the following description of embodiments, components which are not described in any independent claim at the time of filing of the present application will be described as arbitrary components. Furthermore, what will be described herein as embodiments of the present disclosure may be used in any arbitrary combination.

1. Outline of Services Provided

First of all, the services provided by a service providing system according to an embodiment of the present disclosure will be described.

FIG. 1(A) outlines a service providing system according to an embodiment of the present disclosure. This service providing system includes a plurality of information devices which are provided for a user group 100, a data center operating company 110, and a service provider 120. In this example, the target devices from which log information needs to be collected are consumer electronic devices.

The user group 100 may be a company, an association or a household, for example, and may have any size. The user group 100 includes a plurality of consumer electronic devices 101 including Devices A and B and a home gateway 102. Each of the plurality of consumer electronic devices 101 has a telecommunication function and can transmit and receive data to/from other devices. The plurality of consumer electronic devices 101 may include devices with configuration and ability to be connected directly to the Internet and devices without such configuration or ability. Examples of devices of the former type include smartphones, tablet terminals, dedicated display terminals, personal computers (PCs) and TV sets. Examples of the devices of the latter type include illuminators, washing machines and fridges. As can be seen, there may be a plurality of devices which can be connected to the Internet through the home gateway 102. The plurality of consumer electronic devices 101 in the user group 100 may be used by one or more users 10. It should be noted that the users 10 are illustrated just for the sake of convenience and actually do not form part of this service providing system.

The home gateway 102 receives log information about the device's operation from each of the plurality of consumer electronic devices 101 and transmits the log information to a cloud server 111. The home gateway 102 accumulates the log information and feeds that log information accumulated to the cloud server 111 once a day, for example.

Although only one home gateway 102 is illustrated in FIG. 1(A), this is only an example. Alternatively, there may be a plurality of home gateways. If there are a number of home gateways, one of those home gateways may be connected to an external network (and which will be hereinafter referred to as a "master home gateway") and the other home gateways (which will be hereinafter referred to as "slave home gateways") may be connected to the master home gateway. Each of the slave home gateways receives and accumulates log information from one or more of the devices 101 and uploads the log information to the server through the master home gateway. Alternatively, each slave home gateway may output a signal to operate one or more of the devices 101 through the master home gateway.

The data center operating company 110 includes the cloud server 111, which is a virtualization server that operates in cooperation with various devices through the Internet, for example. The cloud server 111 manages a group of data of huge sizes that are too big to handle with any existent general technology (i.e., so-called "big data") such as an ordinary database management tool. The data center operating company 110 makes data management, management of the cloud server 111 and operates a data center that makes those managements. The role played by the data center operating company 110 will be described in detail later.

The data center operating company 110 does not have to be a company which makes only the data management or manages the cloud server 111. FIGS. 1(B) and 1(C) illustrate modified examples of the data center operating company 110. FIG. 1(B) illustrates a device maker which functions as the data center operating company 110. If a device maker which develops and manufactures devices included in the plurality of devices 110 also makes data management or manages the cloud server 111, that device maker corresponds to the data center operating company 110. On the other hand, FIG. 1(C) illustrates a plurality of companies which together manage the cloud server 111. As can be seen, the data center operating company 110 does not have to be a single company. If a device maker and another management company work either together or independently of each other to make data management and manage the cloud server 111, both of them correspond to the data center operating company 110. It should be noted that even if a device maker and another management company work either together or independently of each other to make data management and manage the cloud server 111, only the device maker or the management company may function as the data center operating company 110. Optionally, the data center operating company 110 may function as a service provider as well.

The cloud server 111 may be implemented as not only a piece of hardware such as a computer but also a piece of software in which the function that the cloud server 111 needs to have is programmed.

The service provider 120 has a server 121. In this description, the "server" 121 refers herein to a computer or storage medium with the ability to provide either data or services based on that data. As long as the server 121 has that ability, its size is not particularly limited. For example, considering that data can be provided using a person's PC, either that person's PC itself or a storage medium such as a memory built in the person's PC may also be a "server". In some cases, the service provider 120 may have no servers 121.

It should be noted that the home gateway 102 is not an essential component for the server providing system described above. For example, if the cloud server 111 manages every piece of data, no home gateway 102 is needed. Also, if each and every device in a household has configuration and function to be connected to the Internet (i.e., if there are no devices that cannot be connected to the Internet by themselves), the home gateway 102 may also be omitted. In that case, the log information may be given out directly to the cloud server 111 by a plurality of consumer electronic devices 101 through the Internet.

Next, it will be described how and where information flows according to these services.

First of all, either Device A or B in the user group 100 transmits its own log information to the cloud server 111 in the data center operating company 110. In response, the cloud server 111 receives and accumulates the log information that has been sent by Device A or B (as indicated by the arrow (a) in FIG. 1).

Next, the cloud server 111 of the data center operating company 110 feeds the log information accumulated on a constant unit basis to the service provider 120. In this case, the "constant unit" may be either a unit on which the data center operating company can sort out the information accumulated and feed it to the service provider 120 or a unit required by the service provider 120. Even though the log information accumulated is supposed to be fed "on a constant unit basis", sometimes the log information may not be fed on a constant unit basis. Rather, depending on the situation, the amount of log information fed may vary. The log information is saved as needed in the server 121 that the service provider 120 has (as indicated by the arrow (b) in FIG. 1).

The service provider 120 sorts out the log information into a type of information that matches the service to be provided for the users, and provides that information for the users. The users to be provided with that information may be either the users 10 who use or own the plurality of consumer electronic devices 101 or external users 20. As to how to provide services for the users, the service provider 120 may directly provide the services for the users (as indicated by the arrows (b) and (e) in FIG. 1). Or the services may be provided for the users 10 by way of the cloud server 111 of the data center operating company 110 again (as indicated by the arrows (c) and (d) in FIG. 1). Still alternatively, the cloud server 111 of the data center operating company 110 may sort out the log information into a type of information that matches the service to be provided for the users, and feed that information to the service provider's (120) computer.

It should be noted that the users 10 may or may not be identical with the users 20. Also, not all of the plurality of consumer electronic devices 101, the cloud server 110 and the server 121 have to be installed in the same country. For example, all of the plurality of consumer electronic devices 101 may be installed in Japan, but the cloud server 111 and the server 121 may be installed in the United States, or vice versa. If at least one of the cloud server 111 and server 121 provides a result of analysis in response to the user's manipulation (or control) and if the user can check out the result of analysis on a display terminal such as a PC, it can be said that the user is enjoying the benefits of that system in his or her own country. In that case, it is substantially no different from a situation where the system is installed within a single country.

It should be noted that when the log information is collected (as indicated by the arrows (a) and (b) in FIG. 1) and when the information is given out (as indicated by the arrows (c), (d), (e) and (f) in FIG. 1), if the information includes any sensitive information with which respective users 10 can be identified, then that information could be abused. That is why this system may be operated so that no sensitive personal information to identify the respective users 10 (e.g., their names) is included in the log information. If that information to identify the respective users 10 is included, the device on the transmitting end may transmit that information after having encrypted it in order to prevent their sensitive personal information from being leaked.

Figure 2:
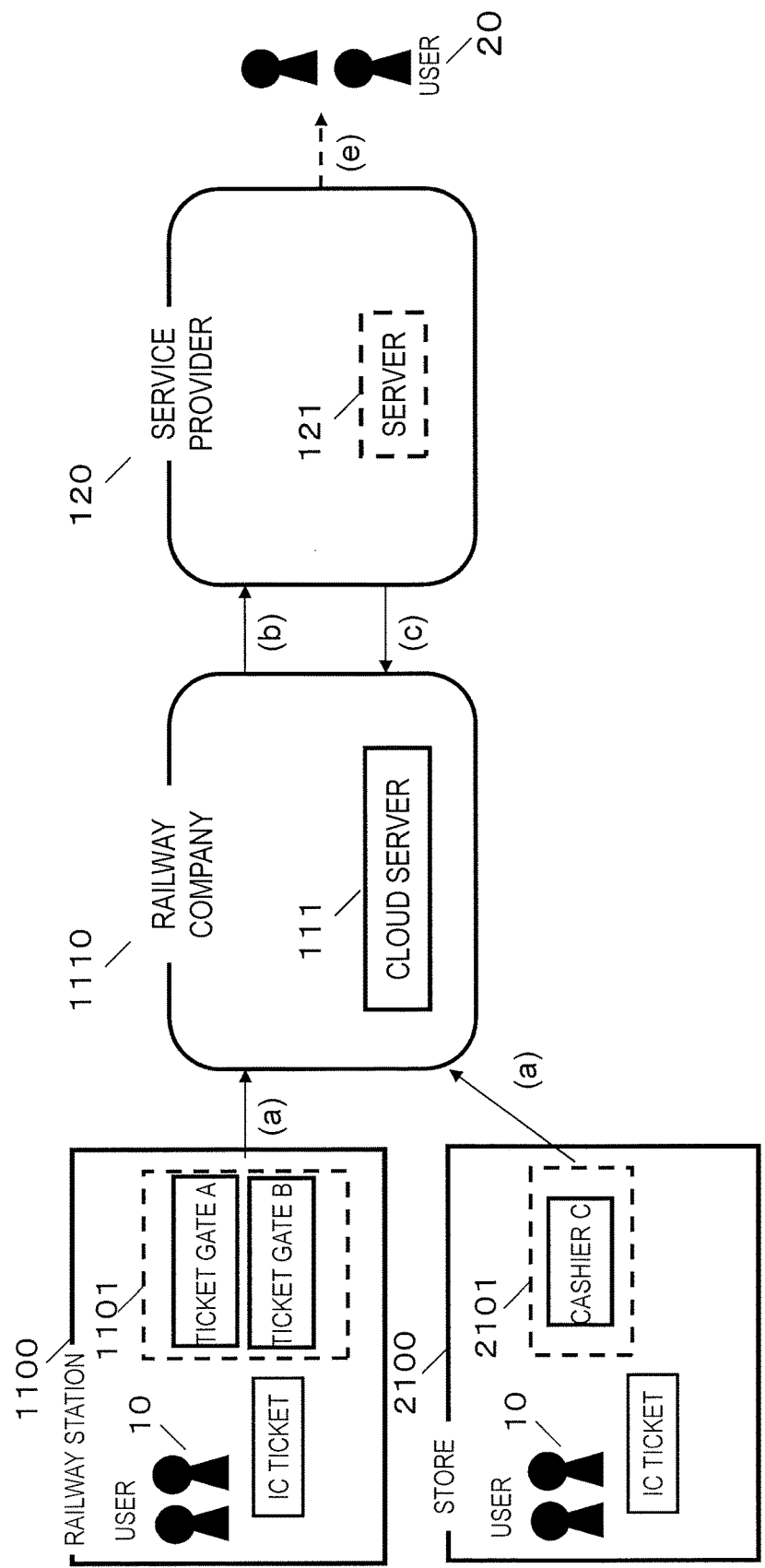
FIG. 2 A diagram that illustrates an overall configuration for another exemplary information providing system according to the present disclosure.

FIG. 2 outlines a service providing system according to another embodiment of the present disclosure. This service providing system includes a plurality of information devices which are provided for a railway station 1100, a store 2100, a railway company 1100, and a service provider 120. In this example, the target devices from which the log information needs to be collected are a plurality of automatic ticket gates 1101 which are installed at the railway station 1100 and a cash register (cashier) 2101 installed at the store 2100.

The station 1100 is a railway station run by the railway company 1110 and has a plurality of automatic ticket gates 1101 including Ticket Gates A and B. Each of those ticket gates has the ability to open the gate by sensing an IC ticket card approach. The store 2100 may be a convenience store, for example, and has one or more cashiers 2101 including Cashier C which accepts payment with an IC ticket card. Each of the automatic ticket gates 1101 and cashiers 2101 has a telecommunication function, and can transmit information about the history of use to the cloud server 111 managed by the railway company 1110. Although not shown in FIG. 2, a relay device such as a router for relaying communications between the respective devices and the cloud server 111 may also be used. Even though only one station 1100 and only one store 2100 are illustrated in FIG. 2, there may be a plurality of stations 1100 and a plurality of stores 2100 as well.

In this example, the railway company 1110 functions as the data center operating company 110 described above, and manages the log information which has been collected from the automatic ticket gates 1101 and the cashiers 2101 using the cloud server 111. The log information of the automatic ticket gates 1101 may include entering history information indicating that the user 10 has passed through a first automatic ticket gate installed at a first railway station to enter the first railway station from outside of the gate and leaving history information indicating that the user 10 has passed through a second automatic ticket gate installed at a second railway station to leave the second railway station from inside of the gate. The log information of the cashier 2101 may include purchase history information about the types and quantities of products which have been purchased with an IC ticket card.

Such log information is sent to the cloud server 111, which further forwards the information to the service provider's (120) server 121 where the information is used. The service provider 120 sorts out the log information into information that matches the kind of the service to provide, and provides that information for the user. The user to be provided with that information may be the user 10 who holds the IC ticket card or another user 20.

As can be seen, the target device from which the log information is collected does not have to be a consumer electronic device but may also be device for business use such as an automatic ticket gate or a cashier. Optionally, the same technique is also applicable to a different type of target device such as an IC card reader which is installed inside a bus instead of the automatic ticket gates at a railway station.

2. Outline of Operation of Choosing Service Provider

Next, the operation of choosing a service provider according to an embodiment of the present disclosure will be outlined.

In an embodiment of the present disclosure, the user 10 shown in FIG. 1(A) or 2 may choose a service provider whom he or she is going to allow to use the log information of the consumer electronic device 101 using a display terminal such as a smartphone. For that purpose, the cloud server 111 transmits necessary information to choose a service provider to the display terminal. On the other hand, in response to the information that has been entered by the user 10, the display terminal transmits setting information to the cloud server 111.

Figure 3:
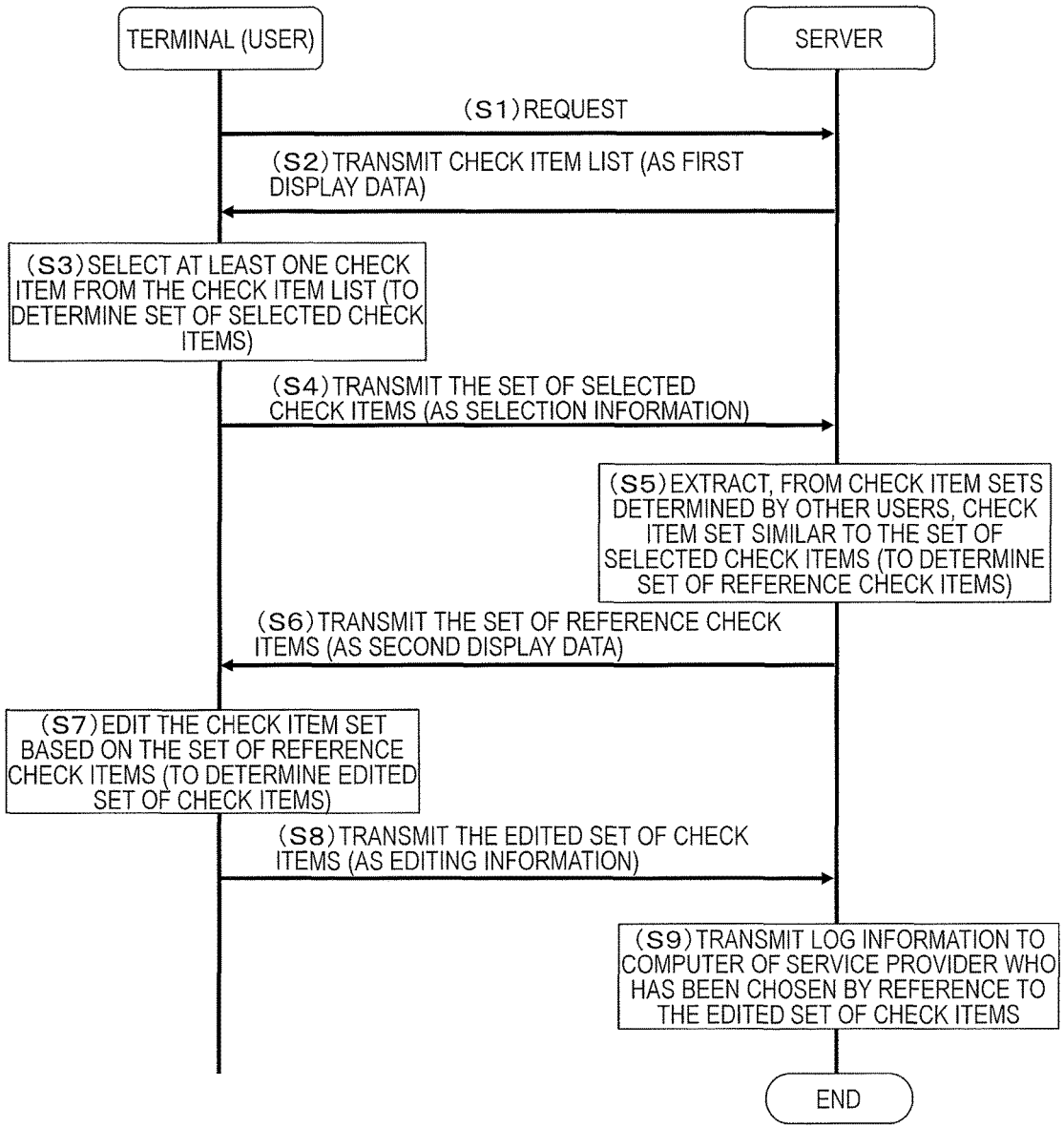
FIG. 3 A diagram that shows a sequence of basic operations to be performed in an embodiment of the present disclosure.

FIG. 3 shows the flow of the processing which is carried out between a display terminal (which will be hereinafter simply referred to as a "terminal") and the cloud server 111 (which will be hereinafter simply referred to as a "server") in order to choose a service provider to which the log information is going to be given out. As shown in FIG. 3, first of all, the terminal requests the server to transmit necessary information to choose a service provider (in Step S1). On receiving this request, the server transmits information about a check item list including a plurality of check items (which will be hereinafter referred to as "first display data") to the terminal (in Step S2).

On receiving the first display data, the terminal presents the checklist on the display screen. In this case, the terminal presents the checklist so as to allow the user to select at least one of a plurality of check items. In the following description, at least one check item selected by the user will be hereinafter referred to as a "set of selected check items". Once the set of selected check items has been determined by the user (in Step S3), the terminal transmits information about the set of selected check items (which will be hereinafter referred to as "selection information") to the server (in Step S4).

On receiving the selection information, the server extracts a set of check items which is similar to the set of selected check items from multiple sets of check items that have been received from other users' terminals (i.e., sets of check items that have been determined by other users) (in Step S5). The set of check items extracted in this process step will be hereinafter referred to as a "set of reference check items". A single set of reference check items is not always extracted but sometimes multiple sets of reference check items may be extracted. It should be noted that the set of reference check items is a set of check items including check items that are either similar to, or the same as, the check items that are included in the set of selected check items represented by the selection information. A specific method of determining the set of reference check items will be described later. The server transmits second display data including the set of reference check items extracted to the terminal (in Step S6).

On receiving the second display data, the terminal presents the set of reference check items that are included in the second display data on the display screen. In this case, the terminal presents the set of reference check items so as to allow the user to edit the set of selected check items by reference to the set of reference check items. Such a set of check items that has been obtained by the user by editing (i.e., changing) the set of selected check items will be hereinafter referred to as an "edited set of check items". Once the user has determined the edited set of check items (in Step S7), the user transmits information about the edited set of check items (which will be hereinafter referred to as "editing information") to the server (in Step S8).

Next, on receiving the edited set of check items, the server determines at least one service provider by reference to that information. In this case, the server may transmit information about that service provider to the terminal to prompt the user to make another choice or may decide to transmit the log information to that service provider's computer. In any case, the server transmits the log information to the computer of the service provider that has been chosen by reference to the edited set of check items (in Step S9). At an appropriate timing before performing the processing step S9, the server has collected the log information from the consumer electronic device 101.

Figure 4:
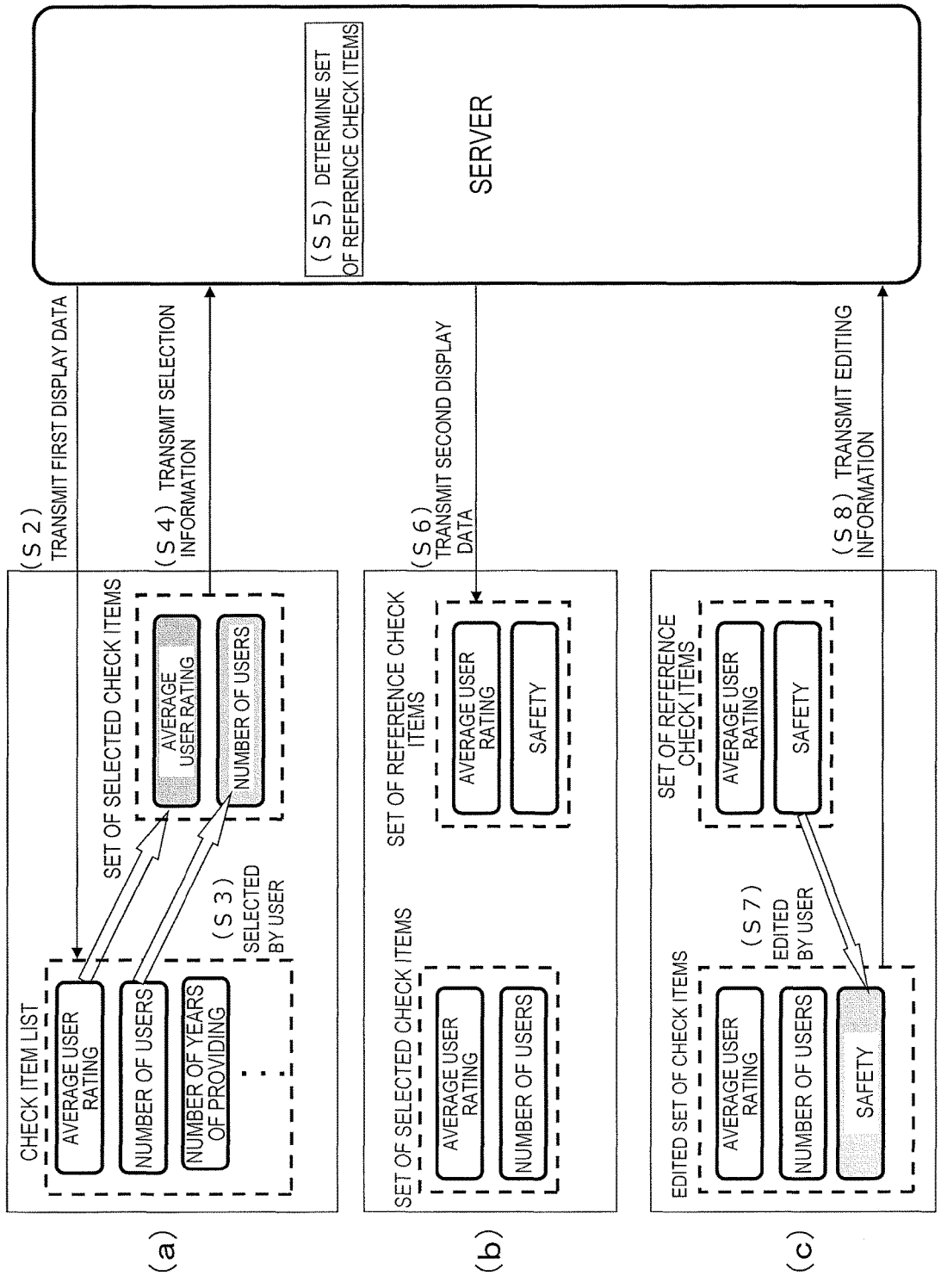
FIG. 4 A diagram that illustrates schematically what basic operations are performed in an embodiment of the present disclosure.

FIG. 4 illustrates schematically how the image on the screen changes and how the user makes his or her manipulations while the process steps S2 through S8 shown in FIG. 3 are being performed.

When the first display data is transmitted in Step S2 from the server to the terminal, the terminal presents a set of check items on the display screen as shown in portion (a) of FIG. 4. In this example, the set of check items is a set of a plurality of check items such as the "average user rating", "number of users" and "number of years of providing". In Step S3, the user selects check items that he or she thinks are important in checking the reliability of the service provider from the list of check items. In the example illustrated in FIG. 4, the "average user rating" and "number of users" are moved to the area of the "set of selected check items" by drag and drop manipulation. In this manner, the user determines the set of selected check items. Although the user can select multiple check items as a set of selected check items in this example, the computer program (application) to be executed by the terminal may also be designed so that only one check item can be selected by him or her.

Information about the set of selected check items that has been determined in this manner (i.e., selection information) is transmitted to the server in Step S4. In response, the server determines a set of reference check items in Step S5 based on the set of selected check items. In this case, the server searches multiple sets of check items that have been collected from multiple other users' terminals to find and extract at least one set that is similar to the set of selected check items and then transmits that set as second display data to the terminal. The number of sets of check items to be extracted in this process step does not have to be one but may also be more than one. Those sets of check items to be compared have been determined by other users and are stored in a database. The degree of similarity may be determined by checking out how many check items belonging to a given set are either the same as, or similar to, the ones included in the set of selected check items. For example, if a given set of check items has turned out to include a half or more of the check items that form the set of selected check items, then the server may find that set of check items "similar to" the set of selected check items. Alternatively, if a grade indicating the degree of similarity between those two sets exceeds a predetermined grade, then the server may find that set of check items "similar to" the set of selected check items. In this case, the degree of similarity is calculated based on the contents and arrangement order of check items that are included in the set of check items to be compared and on the contents and arrangement order of check items that are included in the set of selected check items. The set of reference check items just needs to include some check items that are either the same as, or similar to, the ones included in the set of selected check items among a number of check items that have been received from other users' terminals. And the set of reference check items may be determined in any arbitrary manner.

Next, on receiving the second display data that has been transmitted from the server, the terminal presents a set of reference check items, represented by the second display data, on the display screen in Step S6 as shown in portion (b) of FIG. 4. In this process step, the set of selected check items may also be presented on the same display screen as shown in FIG. 4. If there are multiple sets of reference check items, the application may be designed so that the user can change the sets of reference check items to present. In this state, the user can edit the set of selected check items. In the example illustrated in portion (c) of FIG. 4, the user moves the check item "safety" in Step S7 from the area where the set of reference check items is presented to the area allocated to the edited set of check items by drag and drop manipulation. By making such a manipulation, the edited set of check items can be determined. Information about the edited set of check items thus determined (i.e., editing information) is transmitted to the server in Step S8.

As can be seen from the foregoing description, according to an embodiment of the present disclosure, in choosing a service provider who the user is going to allow to use log information, the user can make a decision not only based on his or her own criterion but also by reference to other users' criteria as well. As a result, the user can notice an important criterion that he or she should miss if he or she made a decision solely by him- or herself, and therefore, can choose a service provider more carefully and more appropriately.

Optionally, on receiving the editing information, the server may transmit information about the number of other users who have selected the edited set of check items represented by the editing information to the display terminal. Also, on receiving the editing information, the server may transmit third display data, including information about at least one service provider who deals with the edited set of check items represented by that editing information, to the display terminal. In this case, the third display data may further include purpose of use information about the purpose for which each service provider is going to use that log information. The purpose of use information may include at least one item indicating for what purpose the log information is going to be used. In such an embodiment, on accepting the choice of a service provider and a purpose of use that has been made through the display terminal, the server may transmit information about a period of time for which the service provider chosen is allowed to use the log information for the purpose of use to the display terminal. Alternatively, the third display data may include not only the purpose of use information about a purpose for which each service provider is going to use the log information but also period-of-use information about a period of time for which each service provider is allowed to use the log information for that purpose of use.

In an embodiment in which the server receives the editing information and then transmits the third display data, including information about the service provider, to the terminal, the terminal can present the information about the service provider on the display screen based on the third display data received. If the third display data includes purpose of use information about a purpose for which the service provider is going to use the log information, an indicator button indicating the purpose of use may be displayed on the display screen. In such an embodiment, by pressing the indicator button, the user can get the purpose of use presented on the display screen. Or instead of displaying such an indicator button, when a service provider who is going to be allowed to use the log information is chosen from at least one service provider presented, at least one item indicating the purpose for which the service provider chosen is going to use the log information may be presented on the display screen. Also, when the user chooses a service provider and the purpose of use, the terminal may transmit those pieces of information about his or her choice to the server and may receive information about the period for which that service provider is allowed to use the log information for that purpose of use from the server. In this manner, the period-of-use information can be presented and the user can be prompted to choose the period of use. The period-of-use information may be presented when the indicator button indicating that period-of-use information is pressed by the user.

According to such an embodiment, the user can not only choose a service provider but also specify the purpose and period for which the log information will be used. As a result, the log information can be given out with the user's intention further respected.

Next, more specific embodiments that are based on the basic idea described above will be described.

3. Service Providing System According to Embodiment 1

Figure 5:
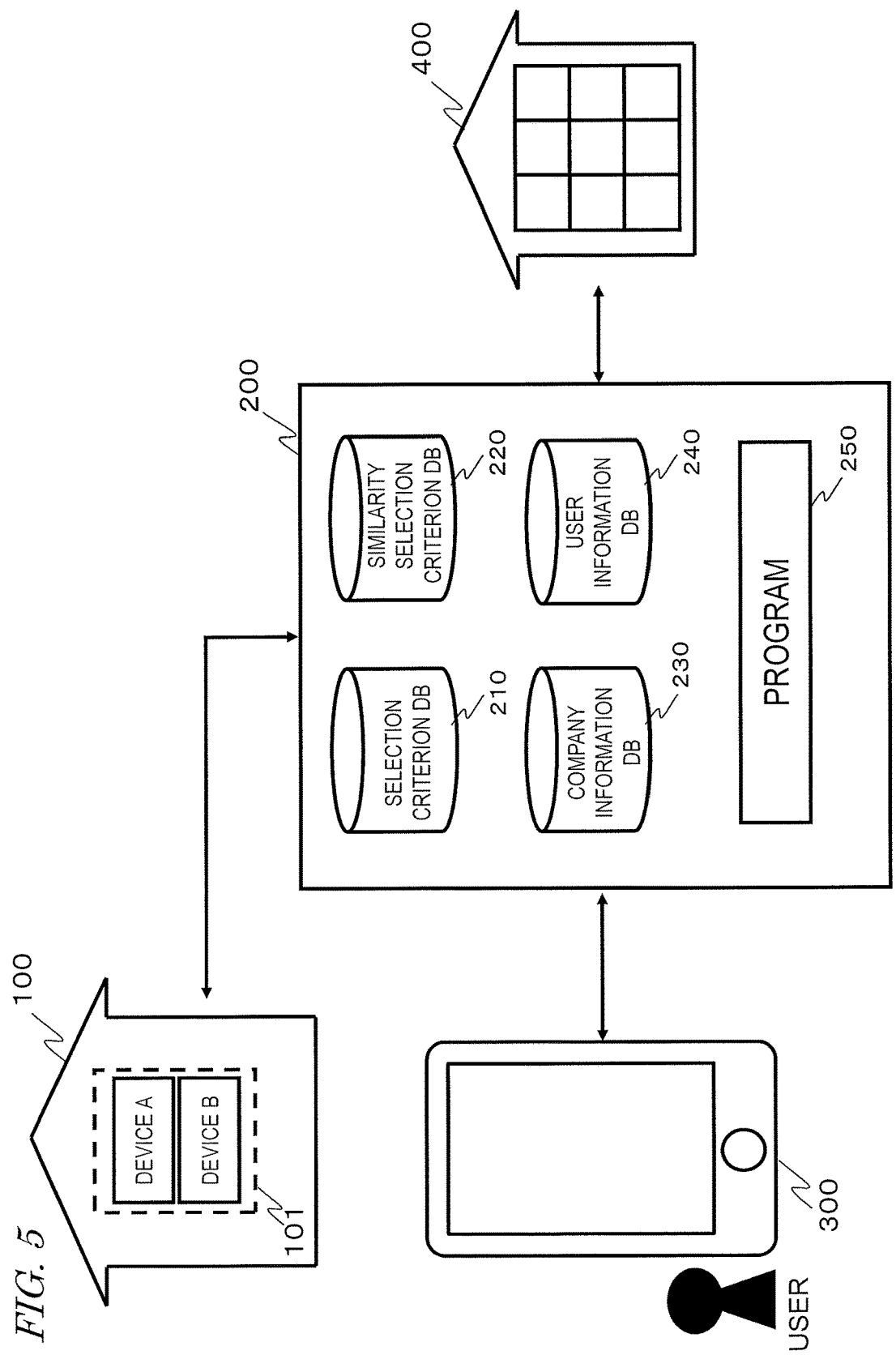
FIG. 5 A diagram that illustrates an overall configuration for an information management system according to a first embodiment.

FIG. 5 illustrates an outline of a service providing system according to a first embodiment of the present disclosure. This service providing system includes a display terminal (user terminal) 300 and a cloud server (log information management server) 200. In FIG. 5, also illustrated are a user group 100 such as a house and a service provider 400. In this embodiment, the display terminal 300 is supposed to be a smartphone. However, the display terminal may also be a cellphone, a tablet terminal, a laptop computer, a desktop computer or any other kind of information terminal device as described above. The cloud server 200 may be a data center or a computer installed in the building of a service providing company, for example.

The cloud server 200 includes a storage medium which stores a computer program 250, a CPU which executes the program 250, and a number of databases (DBs), which include a selection criterion DB 210, a similarity selection criterion DB 220, a company DB 230 and a user information DB 240. The cloud server 200 has the ability to collect log information from a plurality of consumer electronic devices 101 in the user group 100 and transmit that information to the computer of a service provider 400 which will be allowed to use the log information. The cloud server 200 also communicates with the display terminal 300 through a network and feeds the display terminal 300 with necessary information which will be referred to by the user in choosing a service provider who will be allowed to use the log information.

3.1 Configuration of Cloud Server 200

Figure 6:
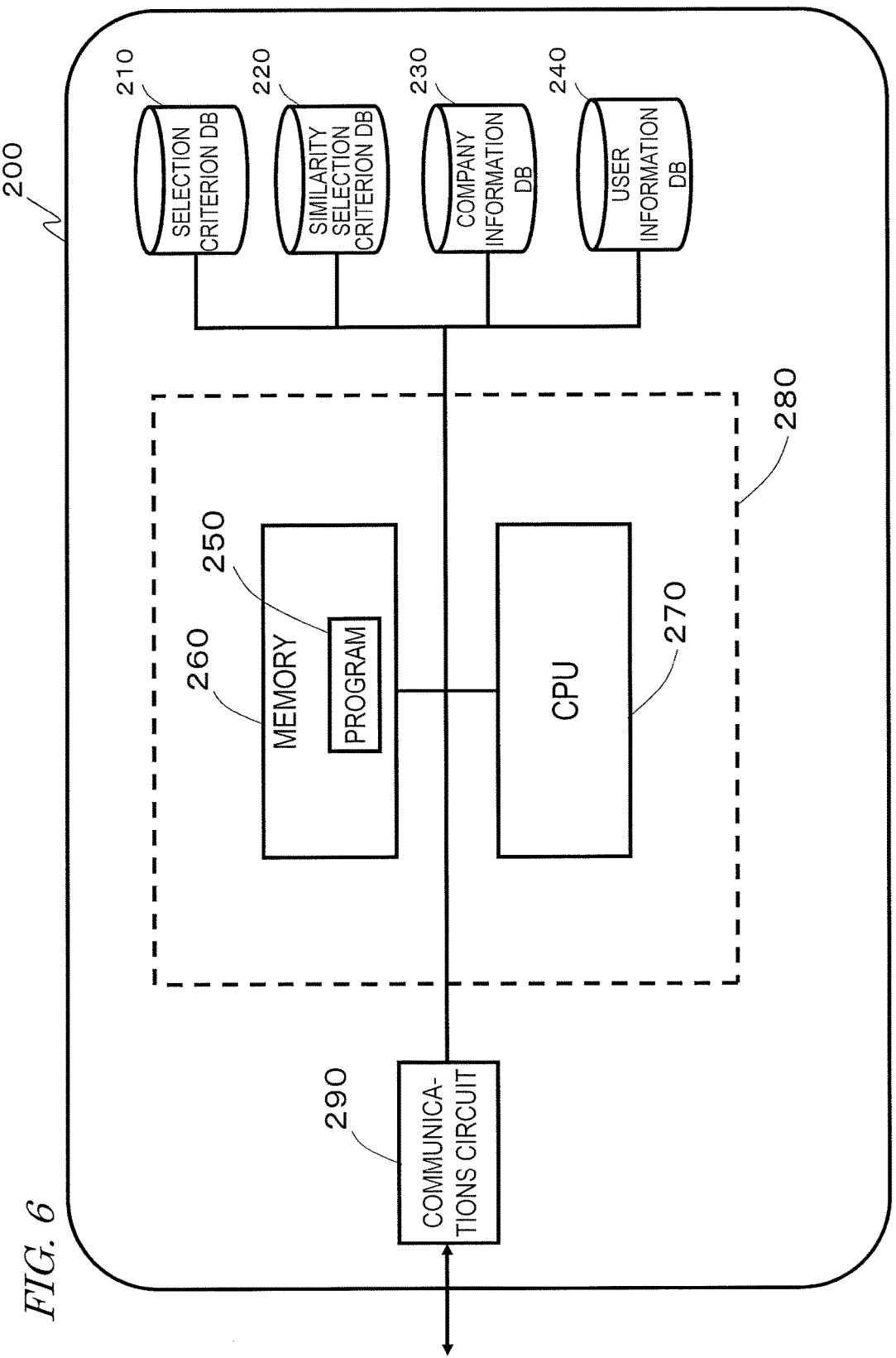
FIG. 6 A diagram that illustrates a configuration for a log information management server (cloud server) according to the first embodiment.

FIG. 6 is a block diagram illustrating a hardware configuration for the cloud server 200, which includes a number of databases 210, 220, 230, 240, a processor 280 and a communications circuit 290. The processor 280 includes a CPU 270 and a memory 260 which stores a program 250. All of these components are connected together with a bus so as to exchange data with each other.

The communications circuit 290 communicates with other communications devices (such as the communications circuit of the display terminal 300 shown in FIG. 5) over a network. The communications circuit 290 makes communications compliant with the Ethernet™ standard, for example.

The CPU 270 controls the operation of the cloud server 200, and performs a group of instructions which are described in the computer program 250 that has been loaded in the memory 260. As a result, the CPU 270 can perform various functions. The computer program 250 describes a group of instructions that should be carried out to allow the cloud server 200 to perform the operation to be described later.

The computer program 250 may be circulated as a product on the market by being recorded on a storage medium such as a CD-ROM or downloaded through a telecommunications line such as the Internet. When loaded with the computer program 250, a device including the hardware shown in FIG. 6 (such as a PC) may function as a cloud server 200 according to this embodiment.

Optionally, the CPU 270 and the memory 260 that stores the computer program 250 may also be implemented as a piece of hardware such as a DSP (digital signal processor) in which a computer program has been installed in a single semiconductor circuit. Such a DSP can carry out all by itself (i.e., by a single integrated circuit) every processing to be performed by the CPU 270 when executing the computer program 250 described above. Thus, the CPU 270 and memory 260 shown in FIG. 6 may be replaced with such a DSP as the processor 280.

Next, the functional configuration to be realized by the processor 280 will be described with reference to FIG. 7.

Figure 7:
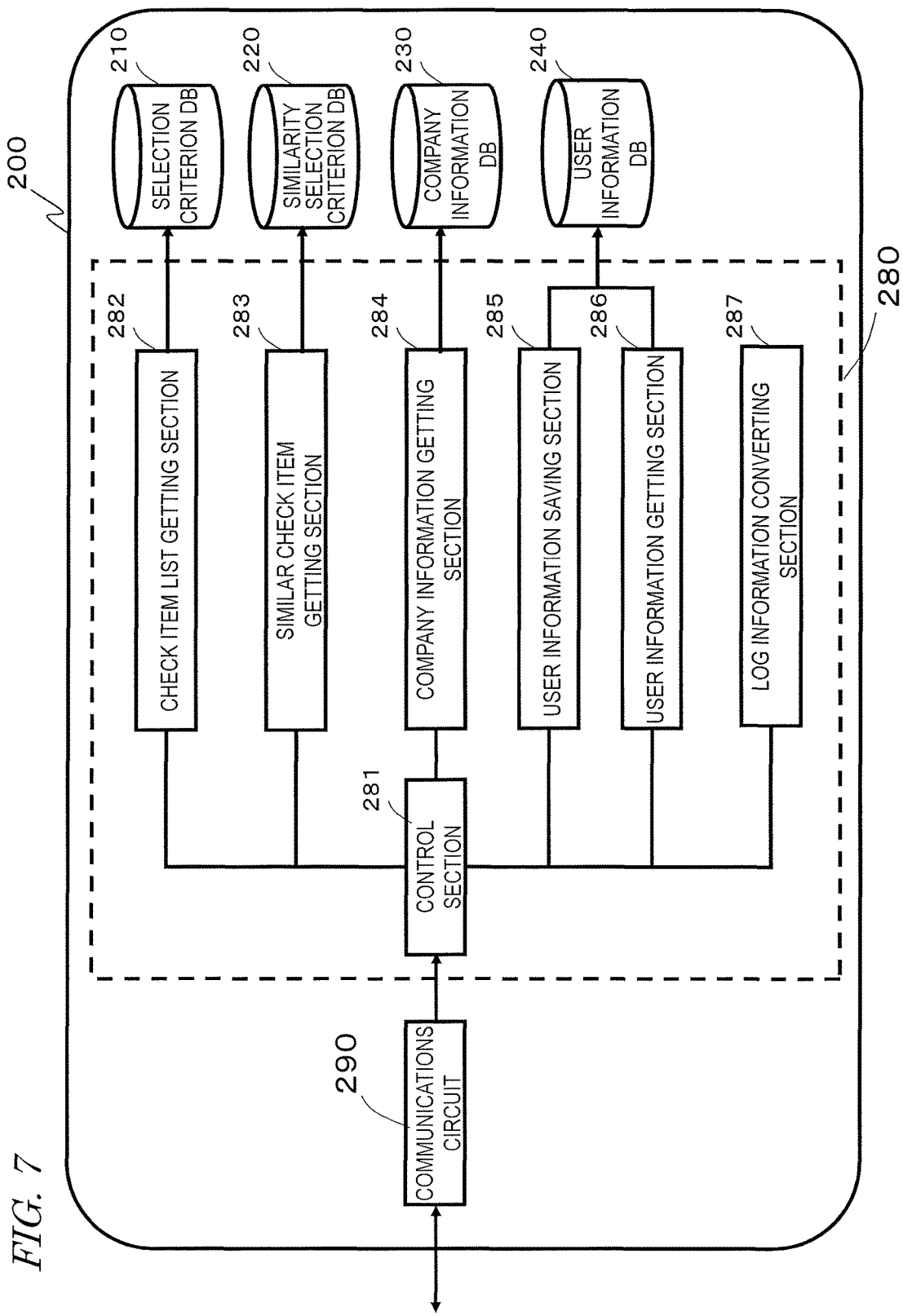
FIG. 7 A diagram that shows the functional blocks of the log information management server (cloud server) according to the first embodiment.

FIG. 7 is a block diagram illustrating a functional configuration of the cloud server 200. In FIG. 7, any component also shown in FIG. 6 and having substantially the same function as its counterpart is identified by the same reference numeral as its counterpart's and description thereof will be omitted herein. In FIG. 7, illustrated are seven blocks of functions (namely, a control section 281, a check item list getting section 282, a similar check item getting section 283, a company information getting section 284, a user information saving section 285, a user information getting section 285, and a log information converting section 287) to be performed by the processor 280. The CPU 270 executing the software program functions as the check item list getting section 282 at a certain point in time, and functions as the similar check item getting section 283 at another point in time. As can be seen, the CPU 270 has the function of each of these seven functional blocks. Optionally, at least one of these seven functional blocks may be implemented as a piece of hardware which performs dedicated processing (such as a DSP).

The check item list getting section 282 accesses the selection criterion DB 210 to get a list of check items which will be used as a criterion in checking the reliability of a service provider. The similar check item getting section 283 accesses the similarity selection criterion DB 220 to get check items that have been determined by other users. The company information getting section 284 accesses the company information DB 230 to get information about a company that is the service provider. The user information saving section 285 saves information about the user who is using the service providing system in the user information DB 240. The user information getting section 286 gets recorded user information from the user information DB 240. The log information converting section 287 converts the log information that has been collected from the consumer electronic devices into the form required by the service provider. The control section 281 controls the respective elements of the cloud server 200, thereby performing various kinds of processing that should be carried out to collect log information, choose a service provider who will be allowed to use the log information, and to give out the log information to the service provider. Although the four databases 210, 220, 230 and 240 are supposed to be provided inside the cloud server 200 in this embodiment, those databases 210, 220, 230 and 240 may also be provided outside of the cloud server 200. In that case, the cloud server 200 may be configured to get necessary information from those databases through a network and save that information.

3-2. Configuration of Display Terminal 300

Next, the configuration and function of the display terminal 300 will be described.

Figure 8:
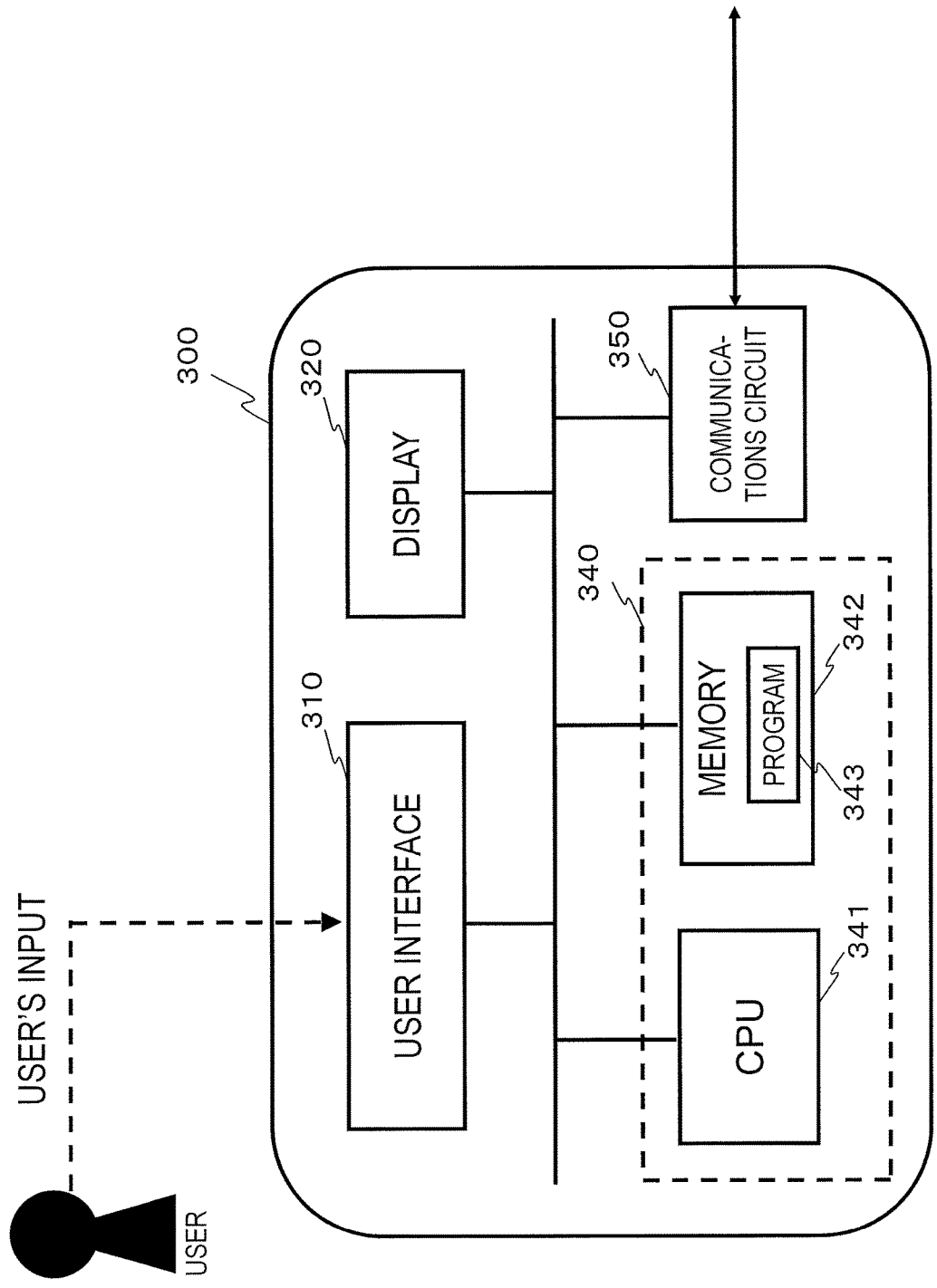
FIG. 8 A diagram that illustrates a configuration for a display terminal according to the first embodiment.

FIG. 8 is a block diagram illustrating a hardware configuration for the display terminal 300, which includes a user interface 310, a display device 320, a processor 340 and a communications circuit 350. The processor 340 includes a CPU 341 and a memory 342 in which a program is stored.

The user interface 310 is an input device which accepts an instruction that has been entered by the user, and may be implemented as a touchscreen, a hardware button, a keyboard, a mouse, or a combination thereof. The display device 320 is a device which displays a requested image in accordance with the instruction given by the processor 340. The display device 320 may be implemented as a liquid crystal display or an organic EL display. If a touchscreen is adopted as the display device 320, then the display device 320 also functions as the user interface 310.

The communications circuit 350 communicates with other communications devices (such as the communications circuit 290 of the cloud server 200) over a network. The communications circuit 290 makes communications compliant with the Ethernet™ standard, for example.

The CPU 341 controls the operation of the display terminal 300, and performs a group of instructions which are described in the computer program 343 that has been loaded in the memory 342. As a result, the CPU 341 can perform various functions. The computer program 343 describes a group of instructions that should be carried out to allow the display terminal 300 to perform the operation to be described later.

The computer program 343 may be circulated as a product on the market by being recorded on a storage medium such as a CD-ROM or downloaded through a telecommunications line such as the Internet. If the display terminal 300 is implemented as a smartphone or a tablet terminal, the computer program 343 may be either put on sale or provided free of charge as an application. Alternatively, when loaded with this computer program 343, any other device including the hardware shown in FIG. 8 (such as a PC) may also function as a display terminal 300 according to this embodiment.

Optionally, the CPU 341 and the memory 342 that stores the computer program 343 may also be implemented as a piece of hardware such as a DSP (digital signal processor) in which a computer program has been installed in a single semiconductor circuit. Such a DSP can carry out all by itself (i.e., by a single integrated circuit) every processing to be performed by the CPU 341 when executing the computer program 343 described above. Thus, the CPU 341 and memory 342 shown in FIG. 8 may be replaced with such a DSP as the processor 280.

Next, the functional configuration to be realized by the processor 340 will be described with reference to FIG. 9.

Figure 9:
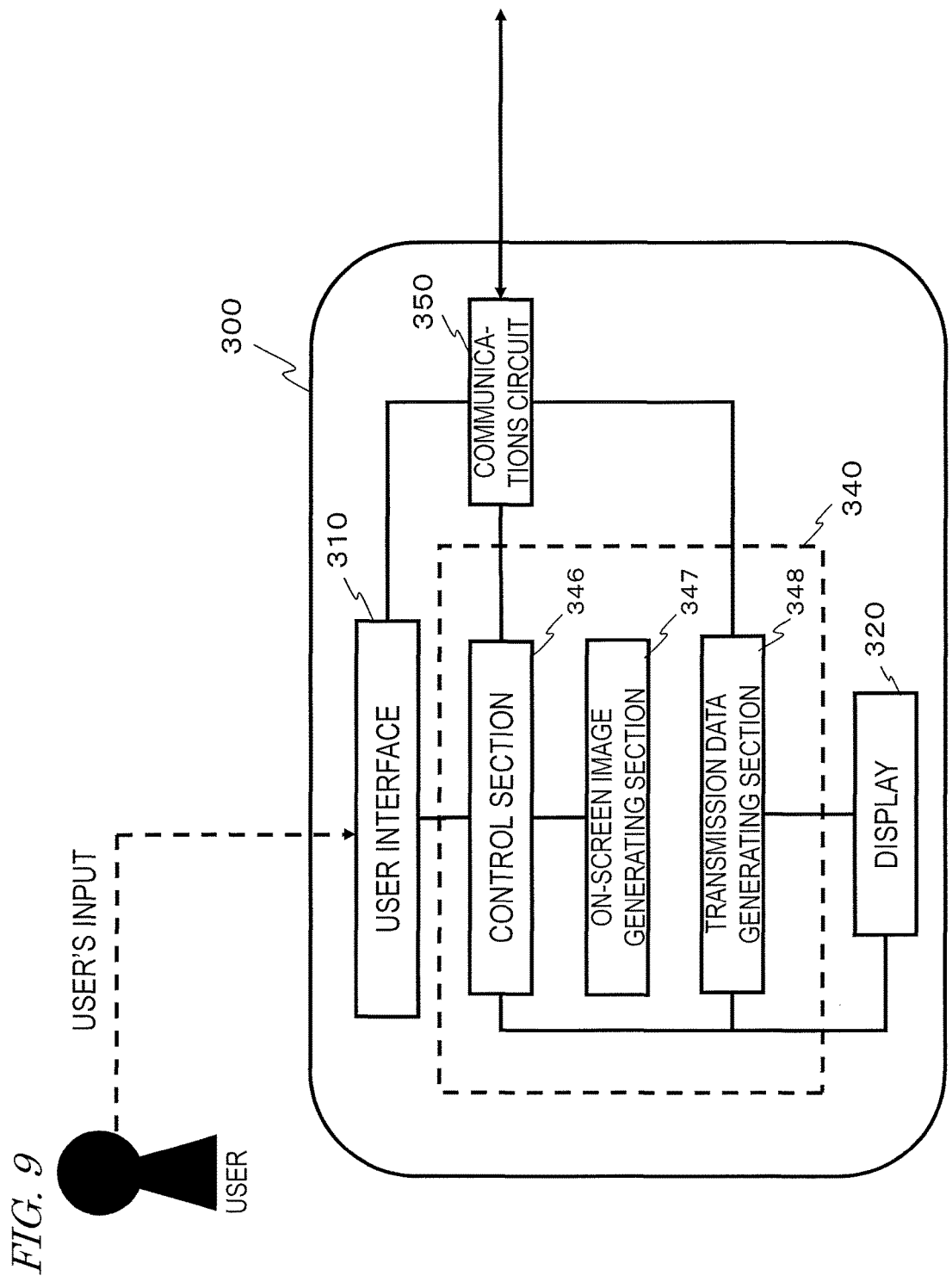
FIG. 9 A diagram that shows the functional blocks of the display terminal according to the first embodiment.

FIG. 9 is a block diagram illustrating a functional configuration for the display terminal 300. In FIG. 9, any component also shown in FIG. 8 and having substantially the same function as its counterpart is identified by the same reference numeral as its counterpart's and description thereof will be omitted herein. In FIG. 9, illustrated are three blocks of functions to be performed by the processor 340 (namely, a control section 346, an on-screen image generating section 347, and a transmission data generating section 348). The CPU 341 executing the software program functions as the on-screen image generating section 347 at a certain point in time, and functions as the transmission data generating section 348 at another point in time. As can be seen, the CPU 341 has the function of each of these three functional blocks. Optionally, at least one of these three functional blocks may be implemented as a piece of hardware which performs dedicated processing (such as a DSP).

The on-screen image generating section 347 generates an image to be presented on the display device 320. The transmission data generating section 348 generates data to be transmitted over the network through the communications circuit 350. The control section 346 controls the respective elements of the display terminal 300, thereby performing various kinds of processing that should be carried out to determine a service provider who will be allowed to use the log information.

3-3. Configurations of Databases

Next, exemplary configurations of the respective databases according to this embodiment will be described.

Figure 10:
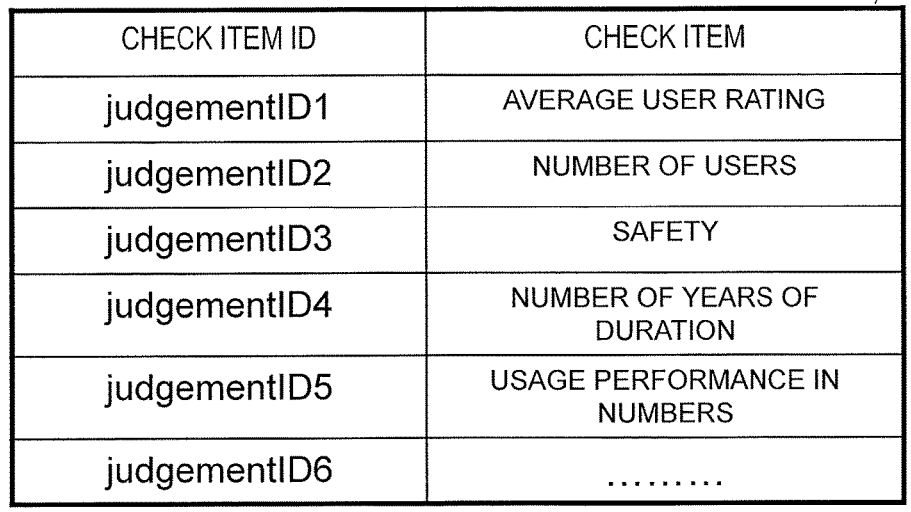
FIG. 10 A diagram that shows a table stored in a selection criterion DB.

FIG. 10 shows an exemplary configuration for the selection criterion DB 210, which includes a table 210a with a column of check item IDs and a column of check items. The check items are items which are used by the user as a criterion for choosing a company and which may include the average user rating, the number of users registered, the degree of safety, the number of years of providing, and the usage performance in numbers. The cloud server 200 transmits these check items to the display terminal 300 at the user's request. As a result, the user can select one or more criteria which he or she thinks are important in checking the reliability of a service provider from these check items. A set of check items thus selected corresponds to the "set of selected check items" described above.

Figure 11A:
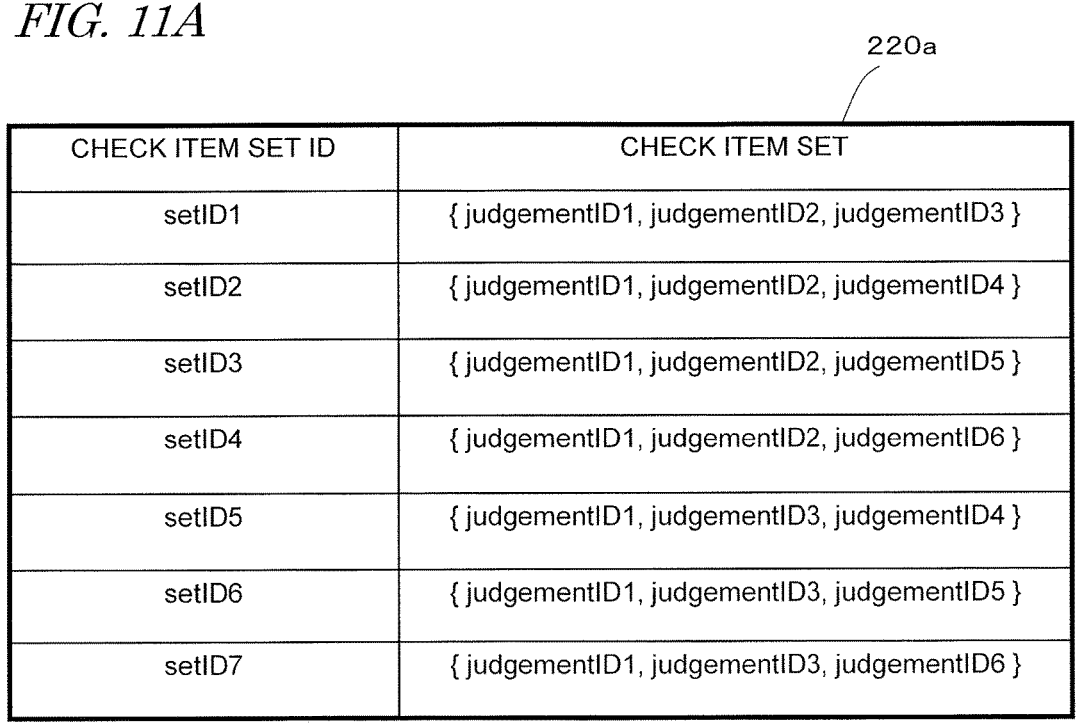
FIG. 11A A table showing the contents of a check item set in a similarity selection criterion DB.
Figure 11B:
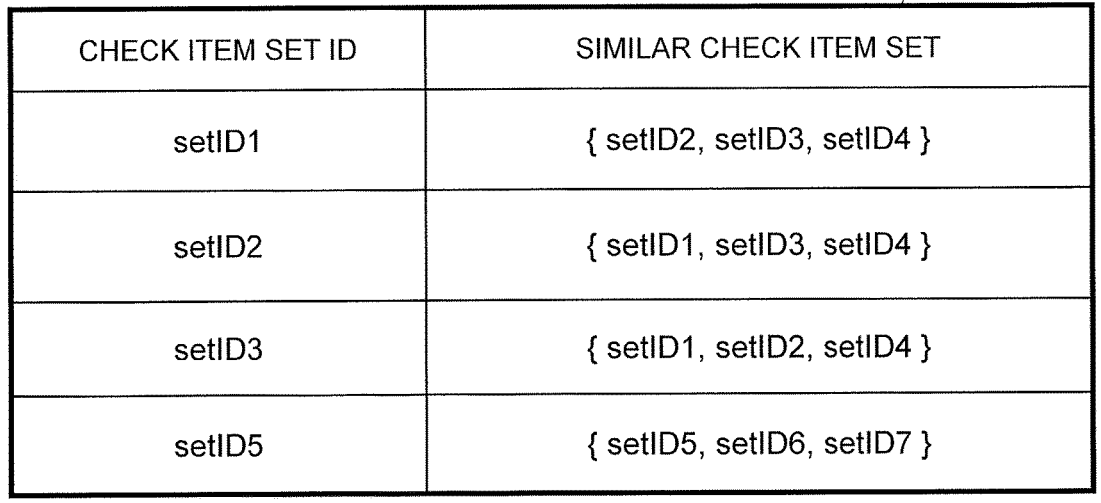
FIG. 11B A table showing a similarity check item set in the similarity selection criterion DB.
Figure 11C:
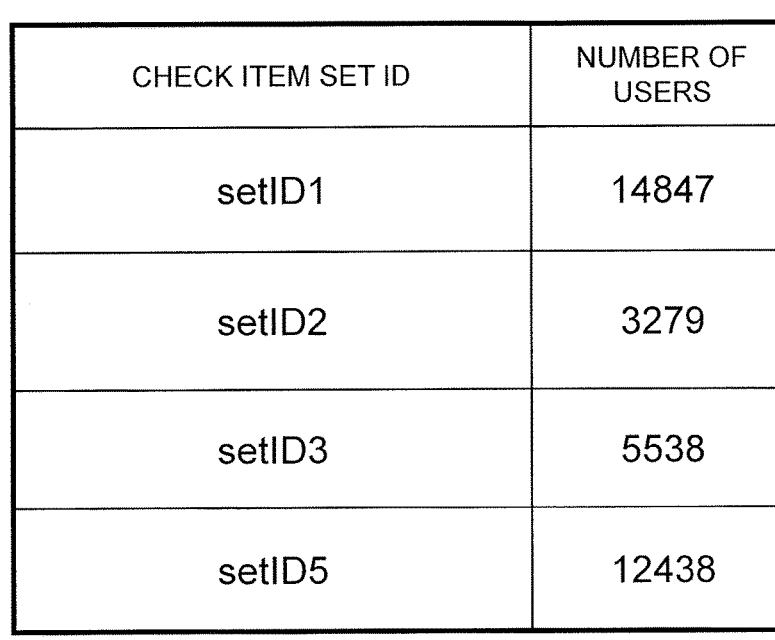
FIG. 11C A table showing a relation between a check item set and the number of users in the similarity selection criterion DB.

FIGS. 11A, 11B and 11C illustrate exemplary configurations for tables included in the similarity selection criterion DB 220. Specifically, FIG. 11A illustrates a table 220a on which check item set IDs and check item sets, each including at least one check item, are recorded. FIG. 11B illustrates a table 220b on which correspondence between check item sets and similar check item sets is recorded. FIG. 11C illustrates a table 220c carrying information about how many users have ever selected each set of check items. In FIG. 11A, seven check item sets setID1 through setID7, each comprised of three check items, are illustrated as just an example. However, the number of check items that form each check item set does not have to be three but may also be any other arbitrary number that is equal to or greater than one.

The table 220b shown in FIG. 11B shows what check item set is similar to each check item set. In the example illustrated in FIG. 11B, for each of setID1, setID2, setID3, setID4, and setID5, another check item set, of which two-thirds of the check items are also included in a given check item set, is recorded as a similar check item set. For example, comparing setID1 and setID2 to each other, it can be seen that two of the three check items of theirs (i.e., judgementID1 and judegementID2) are included in common in both of these two sets. That is why these two sets are recorded as similar sets on the table 220b shown in FIG. 11B. The degree of similarity between check item sets may be determined by the control section 281 shown in FIG. 7 and may be recorded on the similarity selection criterion DB 220 by the similar check item getting section 283. However, the degree of similarity does not have to be determined in this manner but may also be determined by any other method.

The table 220c shown in FIG. 11C carries information about how many users of the service of this embodiment have finally adopted a check item set on a set-by-set basis. By reference to this table 220c, the cloud server 200 can notify the display terminal 300 how many other users have ever selected the check item that a given user has just selected.

Figure 12:
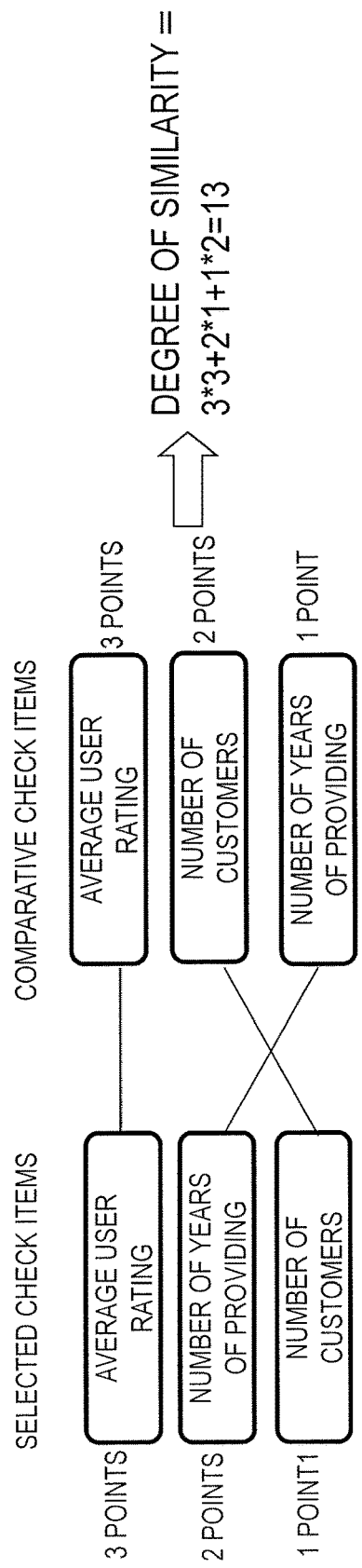
FIG. 12 A diagram that shows how to calculate the degree of similarity between check item sets (using their arrangement order).

FIG. 12 shows another exemplary method for determining whether or not two check item sets are similar to each other. In this example, a grade indicating the degree of similarity is calculated based on the contents and arrangement of items. And the decision is made that the two sets are similar to each other or not by seeing if the grade exceeds a predetermined grade (reference value). For example, suppose the user thinks the degrees of importance of the check items selected by him or her decrease in the order of (1) average user rating, (2) number of years of providing, and (3) number of users registered, and the check items to be compared to each other in determining the degree of similarity have the order of priorities of (1) average user rating, (2) number of users registered, and (3) number of years of providing. In this example, three points are added to the first item, two points to the second item and one to the third, the priority order points added to the pair of corresponding items are multiplied together, and the resultant products are added together, thereby calculating the degree of similarity. Specifically, in the example illustrated in FIG. 12, the first items of the two sets are the same but the second and third items of one of the two sets are arranged in reverse order in the other. That is why $3*3+2*1+1*2=13$ is calculated as the degree of similarity. Since this grade is greater than a reference value of 10, for example, the decision is made that these two check item sets are similar to each other. Although the number of check items included is three in each of the two sets in this example, one of the two sets may include a different number of check items from the other. Or even if each of the two sets is comprised of the same number of check items, an item included in one of the two sets may not be found in the other set. In that case, zero points may be added to such an item that is not found in the other set. Optionally, points may also be added in the same way to not only the same check item but also similar check items as well. For example, suppose a situation where the "number of users" that is one of the check items to be compared in FIG. 12 is replaced with a similar item such as the "number of customers". In that case, the cloud server 200 may calculate the degree of similarity in the same way as described above on the supposition that the "number of users" in the check item selected is substantially the same as the "number of customers" in the item to be compared. The decision that two check items are similar to each other or not can be made by reference to dictionary data which is stored in the storage medium of cloud server 200 as will be described later with reference to FIG. 35.

FIGS. 13 and 14 illustrate exemplary configurations for tables which may be included in the company information DB 230. Specifically, FIG. 13 illustrates a table 230a which records information about a service provider who provides services by reference to the log information of a consumer electronic device. On this table 230a, recorded are the company ID and various pieces of information about the company (including the name of the company, its address, the number of years of providing, the number of users registered, the average user rating, the degree of safety, users' comments, the purpose of use, and period of use). By reference to such company information, the company information getting section 284 can extract a company that matches the check items selected by the user.

FIG. 14 shows a table 230b on which recorded is for what purpose the service providers are going to use the log information on a device-by-device basis. On this table 230b, recorded are company IDs, information about device types, and information about the purpose of use associated with them. In this embodiment, the user can decide whether or not he or she allows the service provider to use the log information for each of the purposes of use that have been set by the service provider. That is why the table 230b shown in FIG. 14 is recorded on the company information DB 230. By reference to this table 230b, the cloud server 200 can transmit the purpose of use information about each device the user owns to the display terminal 300 for each of the companies extracted.

FIGS. 15 to 18 show configurations for tables included in the user information DB 240. On the table 240a shown in FIG. 15, recorded is information about the users of the service providing system according to this embodiment. On the table 240b shown in FIG. 16, recorded is information about the consumer electronic devices each of those users owns. On the table 240c shown in FIG. 17, recorded is information about the company to be allowed to use the log information and the purpose and period of using the log information for each of those devices that the user owns.

Figure 18:
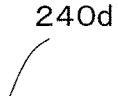
FIG. 18 A table showing what check item sets are finally adopted by respective users.

And on the table 240d shown in FIG. 18, recorded is information about the check item set that has been finally adopted by the user.

Figure 15:
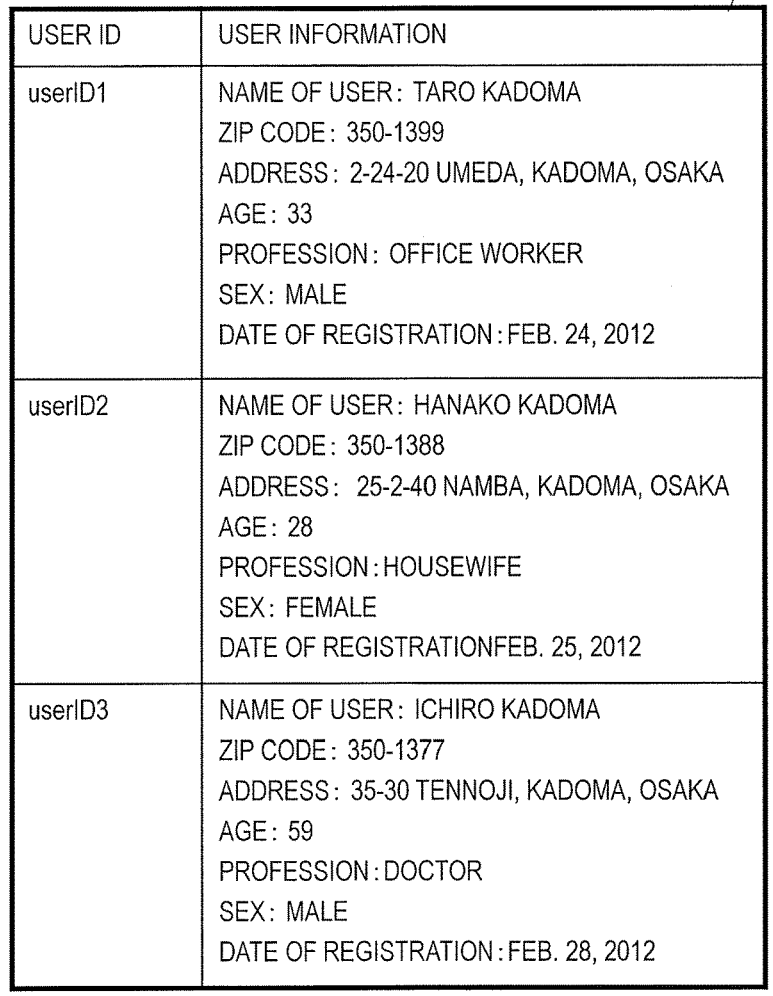
FIG. 15 A table on which detailed information about users is recorded in a user information DB.

Specifically, on the table 240a shown in FIG. 15, recorded are user ID and user information (including his or her name, zip code, physical address, age, profession, sex and date of registration). In registering a new user, the user information saving section 285 adds information about that user to this table. Also, if there is any request to change user information or delete a user, the user information saving section 285 either changes or deletes information about the user in question on/from this table. The user information recorded on the user information DB 240 may be converted with the personal information hidden and then given out to a service provider in association with the device's log information. In that case, the user information getting section 286 gets user information from the user information DB 240 and sends it to the log information converting section 287. In response, the log information converting section 287 converts the user information and the device's log information. Then, the information converted is transmitted by the communications circuit 290 to the service provider's computer.

Figure 16:
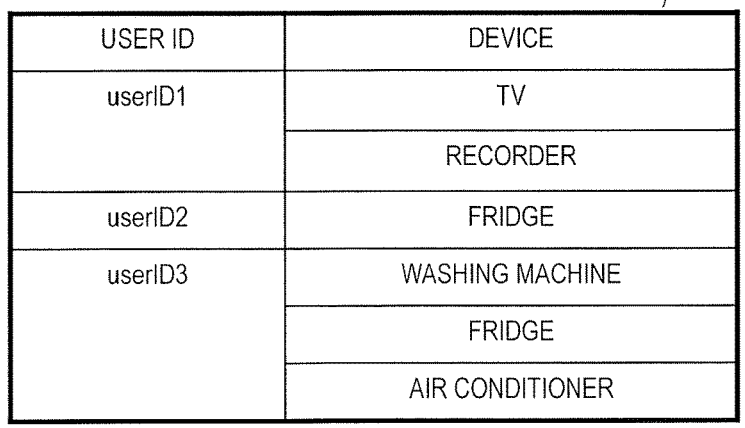
FIG. 16 A table on which information about devices the users own is recorded in the user information DB.

On the table 240b shown in FIG. 16, recorded is information about the devices that each user owns. In this case, the user may be managed on a family basis, for example. That is to say, one user ID corresponds to one family. That is why on this table 240b, their devices are managed on a family basis. Every device is added to this list if its log information could be given out to anyone in the services according to this embodiment. Optionally, the user ID may also be managed on an individual person basis, not on a family basis.

FIG. 17 shows a table 240c on which recorded is information about the company to be allowed to use the log information and their purpose and period of use that have been set by each user on a device by device basis. As will be described later, in choosing a company that he or she will allow to use the log information, the user can select the purpose and period of using the log information. Since the purpose of use is associated with each device, a table 240c such as the one shown in FIG. 17 can be drawn up according to this embodiment. When the user finishes choosing a company, the user information saving section 285 will record information about the company chosen by him or her on the table 240c in the user information DB 240.

FIG. 18 shows a table 240d on which a check item set that has been finally adopted by the user is recorded. By reference to this table 240d, the number of users who have ever adopted a given check item set is calculated. And information about the number of users calculated is recorded on the table 220c shown in FIG. 11C.

It should be noted that the configurations of the databases described above are just an example. The databases may have any other configurations as long as the operation to be described below can get done.

3-4. Operation

Next, it will be described with reference to FIGS. 19 through 30 how to perform the operation of determining a service provider who will be allowed to use log information according to this embodiment. FIGS. 19 to 24 show sequences of that operation. FIGS. 25 to 30 illustrate on-screen images to be presented while that operation is being performed.

Figure 19:
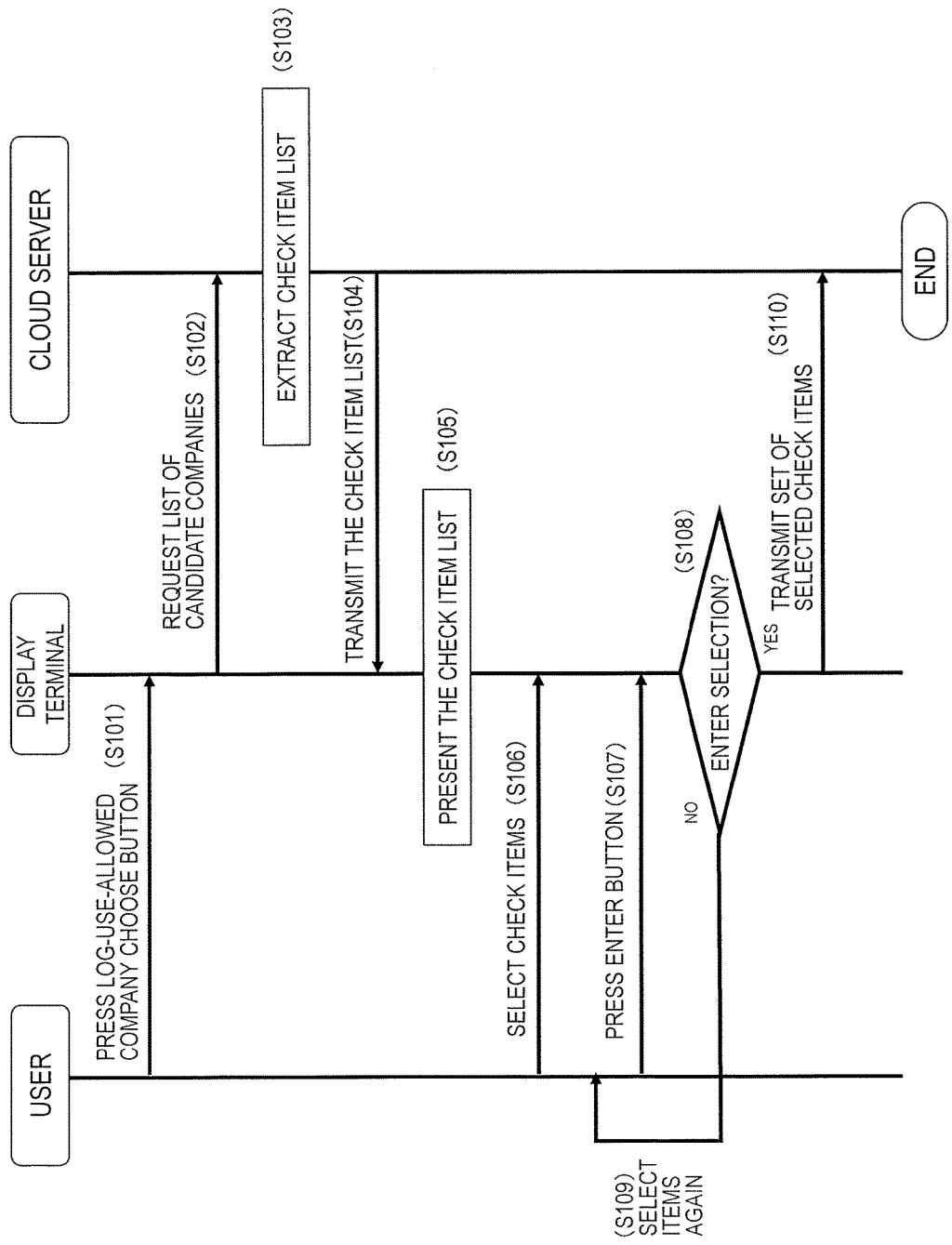
FIG. 19 A diagram that shows a sequence of operations to be performed until the user transmits a selection criterion.
Figure 25:
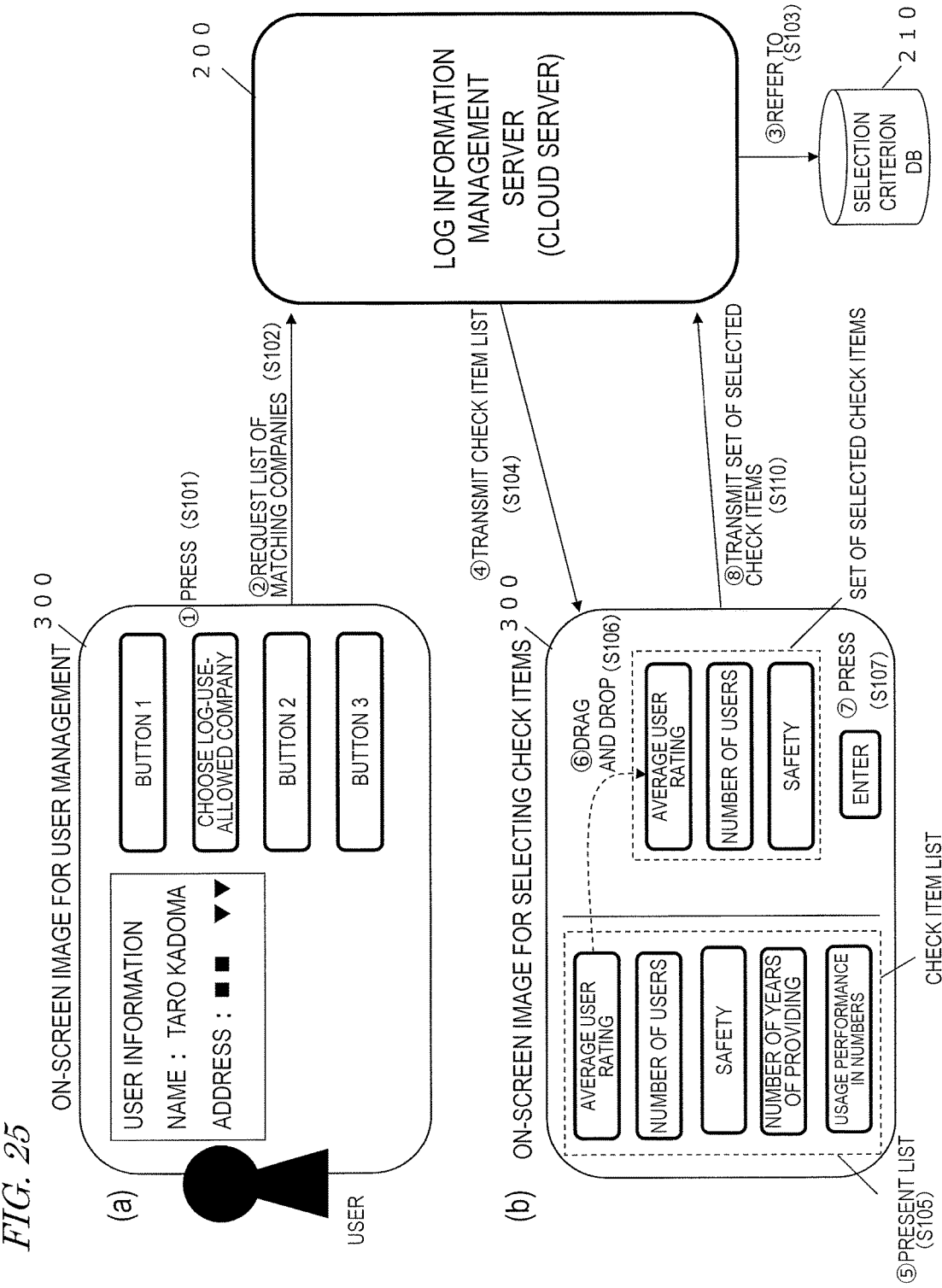
FIG. 25 A diagram that shows the procedure of selecting check items for use to choose a service provider who will be allowed to use log information.

First of all, look at FIGS. 19 and 25, which show the operation to be performed until the user sets a selection criterion (check item) while choosing a service provider who will be allowed to use log information.

When the user logs in a user dedicated website provided by a cloud server (log information management server) 200 using a display terminal 300, a user management on-screen image is presented on the display screen as shown in portion (a) of FIG. 25. This on-screen image includes a plurality of buttons including a button to choose a company to be allowed to use log information (which will be hereinafter referred to as "log-use-allowed company"). When the user presses that button to choose a log-use-allowed company (in Step S101), the display terminal 300 requests the cloud server 200 to send information about a list of candidate companies to be allowed to use log information (in Step S102).

On receiving the request from the display terminal 300, the cloud server 200 extracts a check item list by reference to the selection criterion DB 210 (in Step S103), and then transmits the check item list extracted to the display terminal 300 over a network (in Step S104).

On receiving the check item list, the reception terminal 300 presents it on the display screen (in Step S105). In this process step, the display terminal 300 presents the list so as to allow the user to select at least one check item. For example, an on-screen image such as the one shown in FIG. 25(b) may be presented to allow the user to select any check item included in the check item list by drag and drop manipulation. If not every item on the check item list can be presented on the display screen at a time, those hidden items may be presented by scroll manipulation, for example.

In the example shown in FIG. 25, when the user selects check items by drag and drop manipulation (in Step S106), the items selected are sorted and presented in an area where the set of selected check items is displayed. When the user finishes selecting check items and presses the "ENTER" button on the screen (in Step S107), a dialog box asking if the user really wants to enter his or her selection pops up (in Step S108). In this process step, the user can choose to either enter his or her selection or cancel it. If the user chooses to cancel his or her selection, he or she can select check items all over again (in Step S109). On the other hand, if the user chooses to determine his or her selection, the display terminal 300 transmits the check items selected (i.e., the set of selected check items) to the cloud server 200 (in Step S110).

Figure 20:
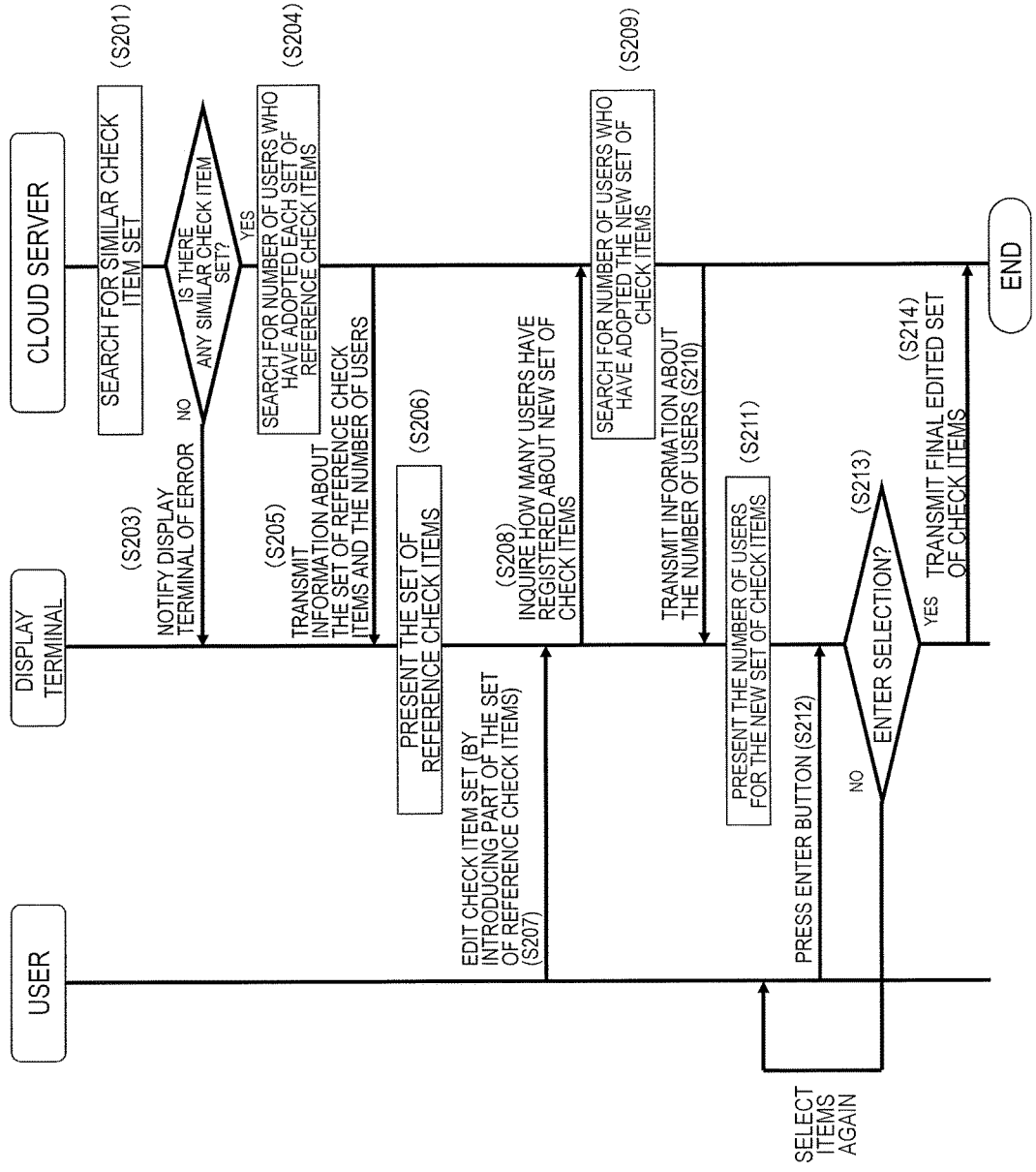
FIG. 20 A diagram that shows a sequence of operations to be performed until the user transmits a selection criterion finally adopted.

Next, it will be described with reference to FIGS. 20 and 26 what operation needs to be performed until a set of check items (i.e., an edited set of check items) is finally fixed by reference to a set of reference check items which is similar to the set of selected check items that has been selected by the user.

On receiving information about the set of selected check items, the cloud server 200 accesses the similarity selection criterion DB 220 to search for a set of check items (i.e., a set of reference check items) which is similar to the set of selected check items (in Step S201). The degree of similarity may be determined by the method that has already been described with reference to FIGS. 11A through 12. Typically, multiple sets of reference check items are extracted in the descending order of their degree of similarity (i.e., a set of reference check items with the highest degree of similarity is extracted first). If there are no similar sets of check items, then the cloud server 200 notifies the display terminal 300 of an error (in Step S203). On the other hand, if there is any similar set of check items, the cloud server 200 accesses the table 220c shown in FIG. 11C to retrieve information about the number of users for each set of reference check items that has been searched for (in Step S204). Subsequently, the cloud server 200 transmits each set of reference check items and information about the number of users who have adopted it to the display terminal 300.

On receiving information about the set of reference check items, the display terminal 300 presents that information on the display screen (in Step S206). In this process step, the display terminal 300 presents the sets of reference check items one by one along with information about the number of users registered beside the set of selected check items as shown in portion (a) of FIG. 12. In this example, two triangular buttons 380 are displayed over the set of reference check items. This display screen is configured so as to present another set of reference check items by having the user press any of these buttons 380. In this case, the user can introduce any item which is included in the set of reference check items but not included in the set of check items selected by him- or herself into the check items selected. For example, as shown in portion (b) of FIG. 26, the item called "the number of years of providing" which has not been selected by him- or herself may be added by drag and drop manipulation as shown in portion (b) of FIG. 26.

Once the set of check items has been edited in this manner, the display terminal 300 inquires of the cloud server 200 how many users have registered about the new set of check items (in Step S208). In response to the inquiry, the cloud server 200 accesses the similarity selection criterion DB 220 again to get information about the number of users registered (in Step S209). After that, the cloud server 200 transmits the information gotten about the number of users registered to the display terminal 300 (in Step S210). On receiving that information about the number of users registered about the new set of check items, the display terminal 300 presents that information on the display screen (in Step S211).

When finding the edited set of check items to be no problem, the user finalizes that editing by pressing the ENTER button (in Step S212). In response, the display terminal 300 transmits the edited check items that have been finally fixed to the cloud server 200 (in Step S214).

Figure 21:
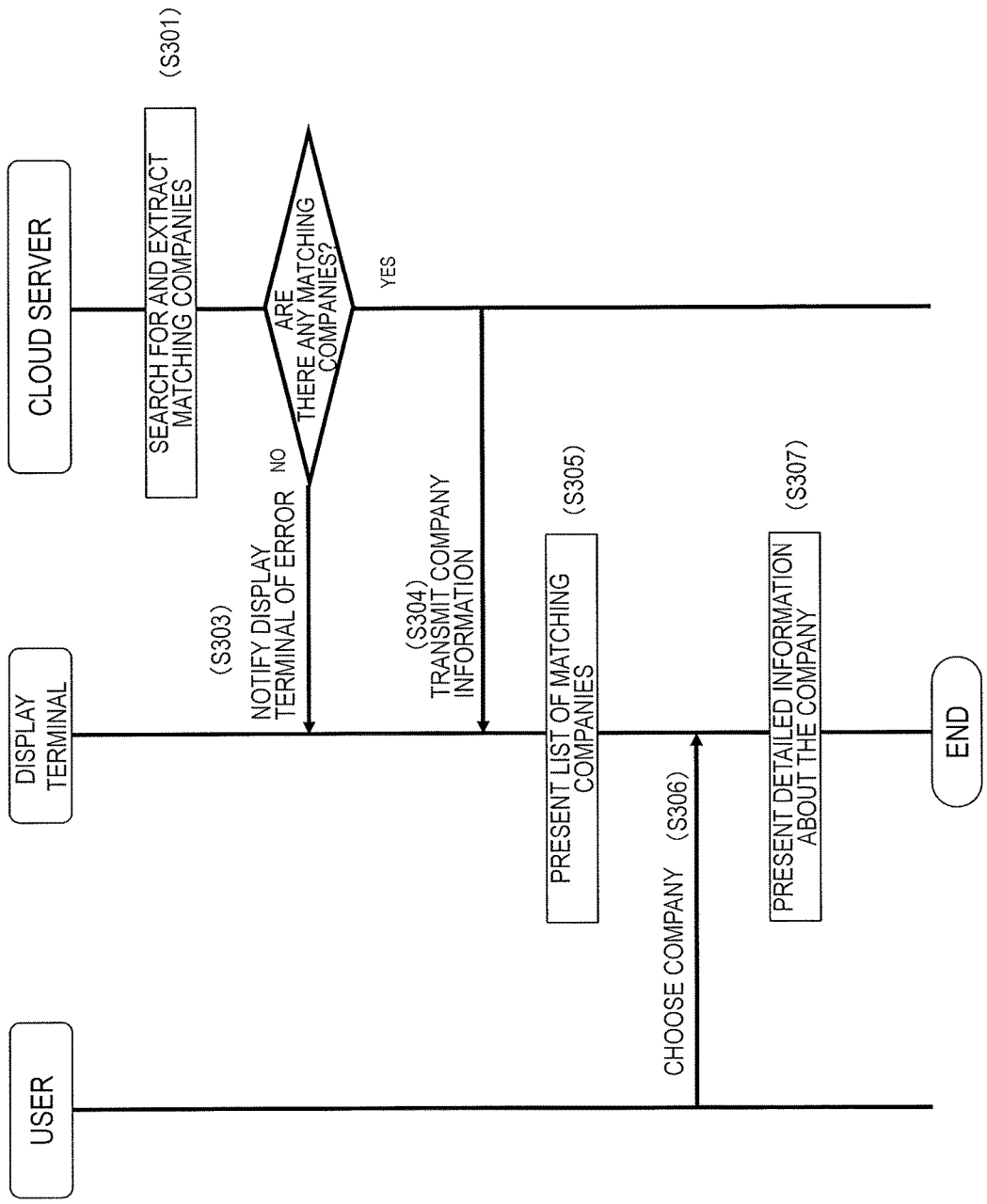
FIG. 21 A diagram that shows a sequence of operations to be performed until detailed information about a company is displayed.
Figure 27:
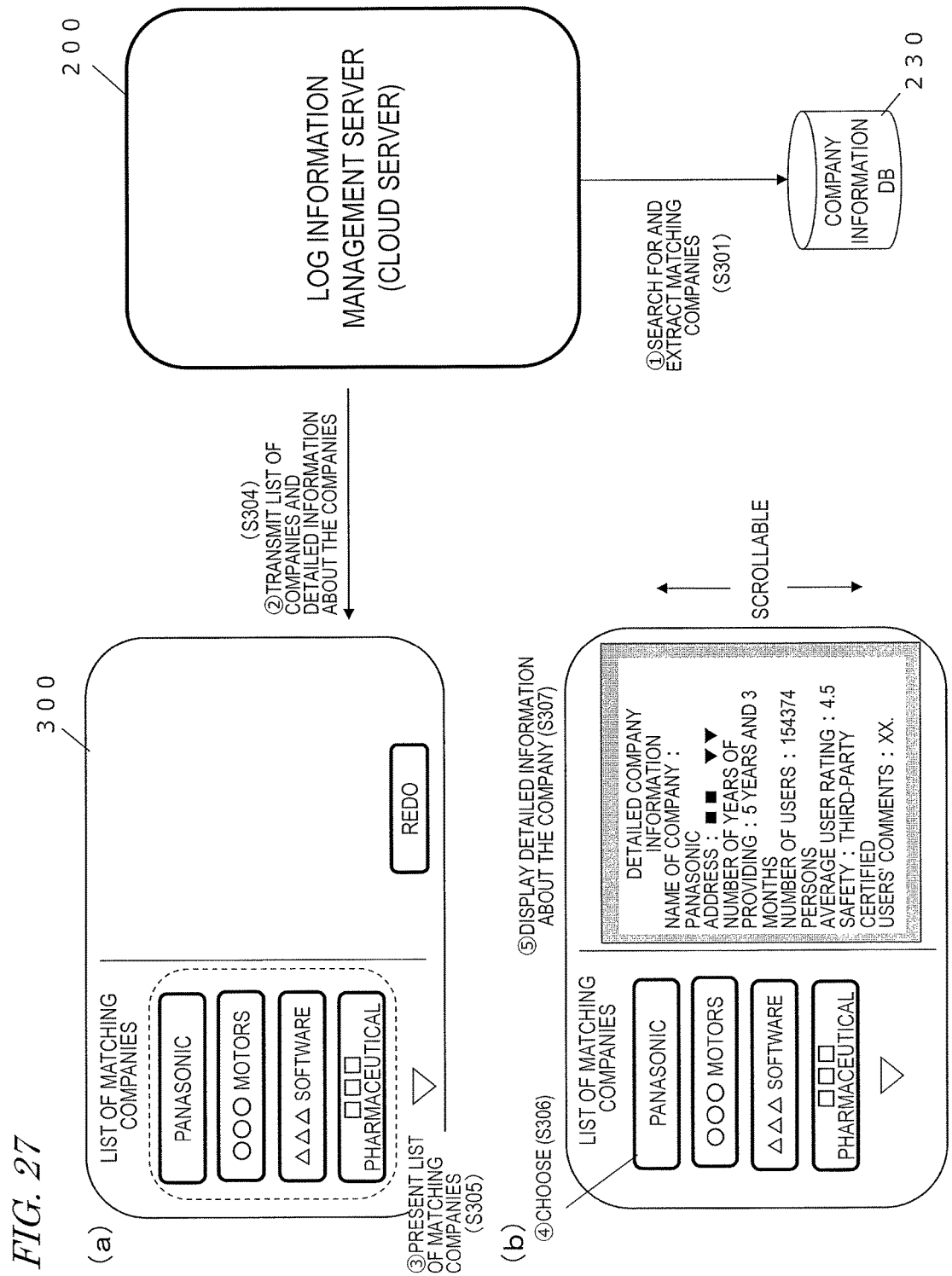
FIG. 27 A diagram that shows the procedure of choosing a service provider who has been extracted as a one that meets the criteria of the set of selected check items.

Next, it will be described with reference to FIGS. 21 and 27 what operation needs to be performed until detailed information about a company (i.e., service provider) that meets the criteria of the edited set of check items is displayed.

On receiving information about the edited set of check items, the cloud server 200 accesses the company information DB 230 to search for and extract any companies that meet the criteria of the edited set of check items (in Step S301). More specifically, the cloud server 200 refers to various pieces of information about each company, including the number of years of service, the number of users registered, the average user rating, and the degree of safety, as on the table 230*a* shown in FIG. 13, and extracts, if any, matching companies which meet the criteria of the check items that have been selected by the user to relatively high degrees. In this case, the number of companies extracted may be determined arbitrarily. In this process step, if no matching companies have been found, the cloud server 200 notifies the display terminal 300 of an error (in Step S303). On the other hand, if there are any matching companies, then the cloud server 200 transmits information about those companies to the display terminal 300 (in Step S304).

On getting the company information, the display terminal 300 presents a list of matching companies on the display screen (in Step S305). For example, the names of multiple matching companies received may be presented in line as shown in portion (a) of FIG. 27. In this case, if information about not every company can be presented on the screen at a time, the names of hidden companies may be displayed either by scrolling or pressing a button. For instance, in the example illustrated in portion (a) of FIG. 27, the screen is configured to go back to the previous on-screen image by having the user press a "redo" button.

In this case, the user can choose one or more companies which he or she'd like to allow to use the log information from the list of companies presented. As shown in portion (b) of FIG. 27, when the user chooses a company (in Step S306), detailed information about that company is presented (in Step S307). In the example illustrated in FIG. 27, if the user chooses another company, detailed information displayed changes into information about that company. If detailed information about a company cannot be presented on the screen at a time, the rest of the information may be displayed by scrolling.

Figure 22:
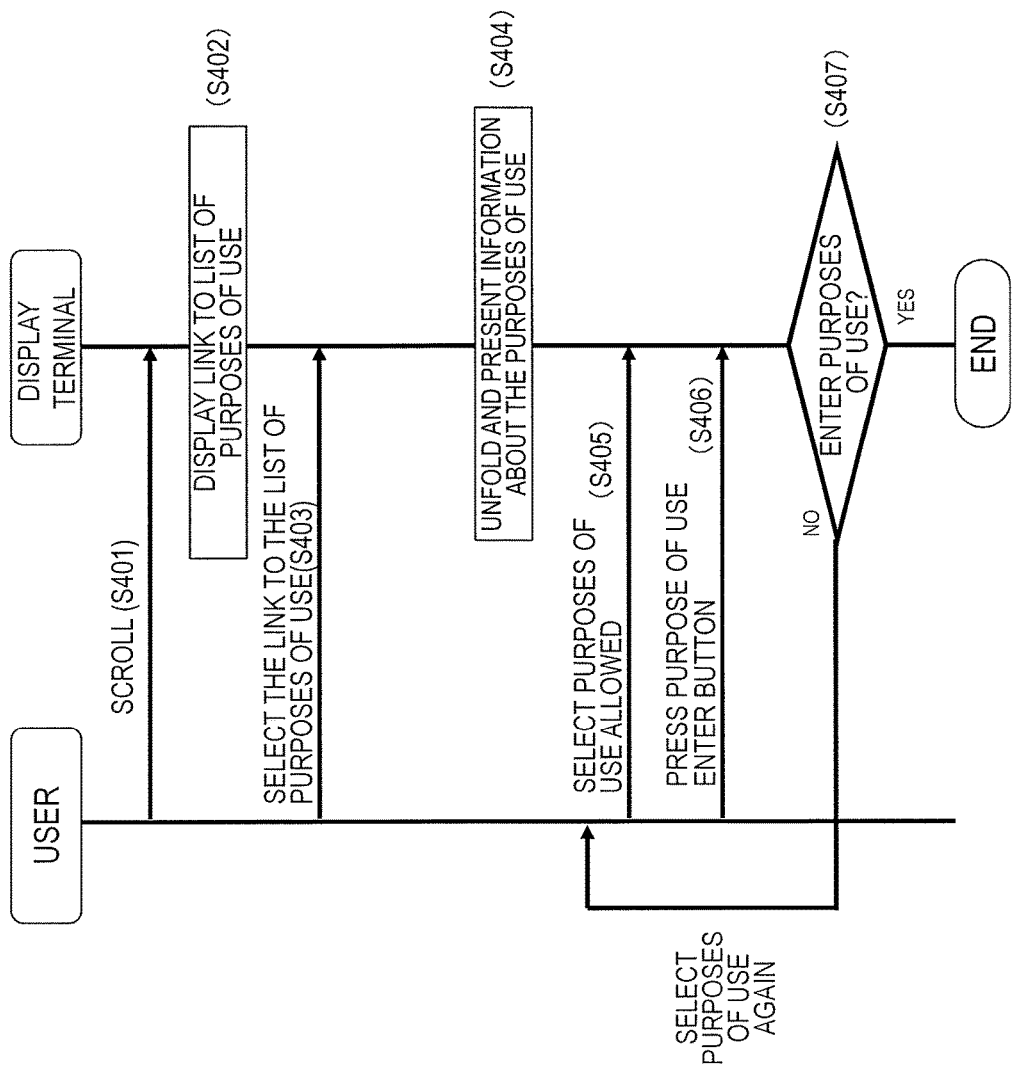
FIG. 22 A diagram that shows a sequence of operations to be performed until the purpose of use for the company is entered.
Figure 28:
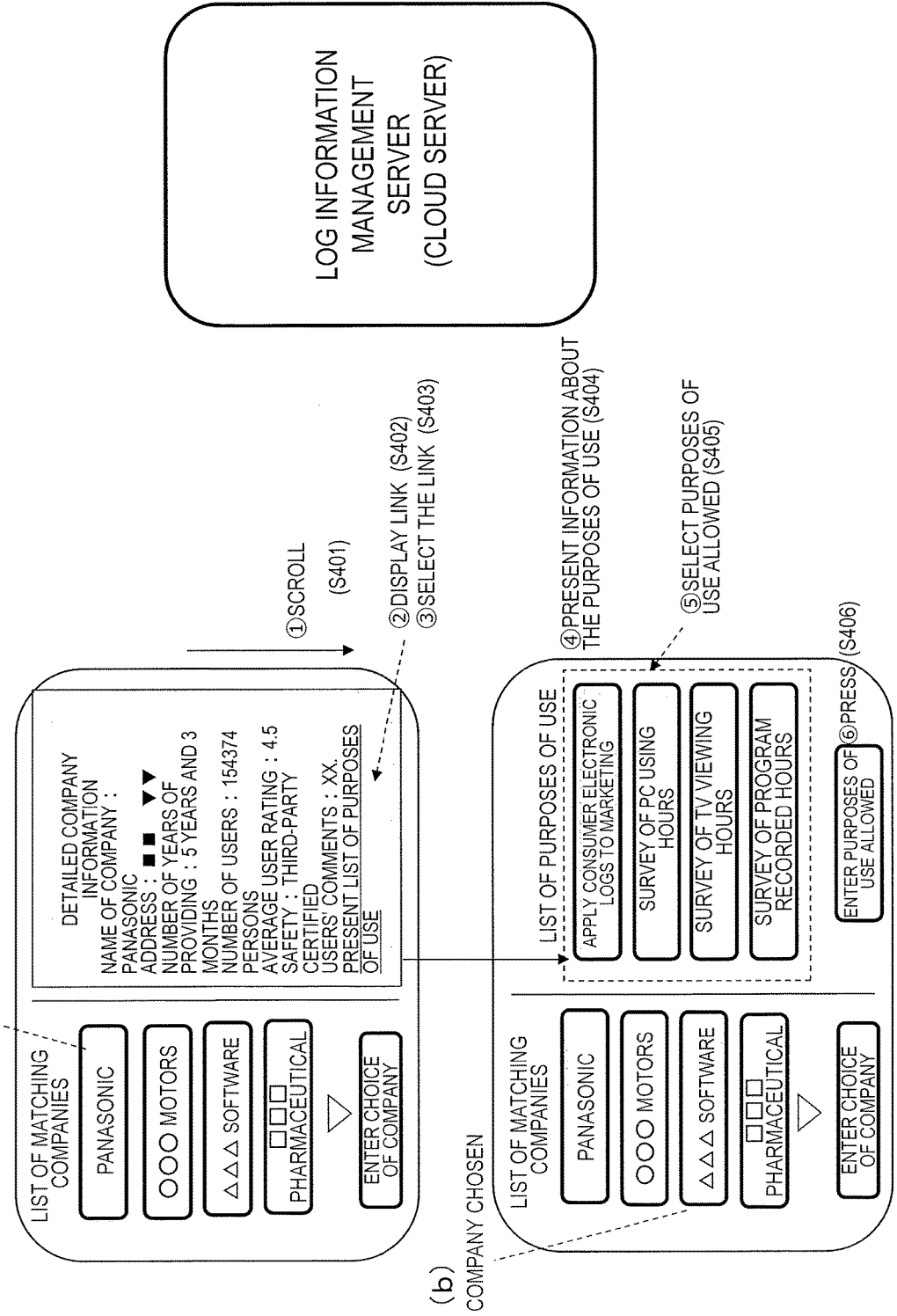
FIG. 28 A diagram that shows an on-screen image and procedure for checking out the purpose for which the service provider is going to use the log information.

Next, it will be described with reference to FIGS. 22 and 28 what operation needs to be performed until the user finally allows the company's purpose of using the log information.

As the user scrolls the area where the detailed information about the company is displayed (in Step S401), a link to a "list of purposes of use" will be soon displayed (in Step S402). When the user selects that link (in Step S403), a list of purposes of use is presented as shown in portion (b) of FIG. 28 (in Step S404). In this process step, presented are only the purposes of use for the user's consumer electronic devices that have been registered in advance. For example, information obtained by extracting only the purposes of use about the user in question by combining the tables 240*b* and 230*b* shown in FIGS. 16 and 14 with each other is transmitted from the cloud server 200 to the display terminal 300 and presented on the display screen. Optionally, by searching the user's consumer electronic devices at this timing, only the purposes of use for those consumer electronic devices at present may be presented.

The user can choose one or more items from the list of purposes of use presented (in Step S405). The log information is transmitted to the chosen company within the purposes of use that have been selected in this manner. For example, if only the items "to apply consumer electronics log to marketing" and "to survey PC running time" have been selected, only log information that needs to be referred to just for those purposes is transmitted to the chosen company. In this case, multiple companies may be chosen at a time. Portion (b) of FIG. 28 illustrates a situation where two companies are chosen at the same time. When the user presses the "enter purposes of use" button (in Step S406), the purposes of use are entered (in Step S407).

Figure 23:
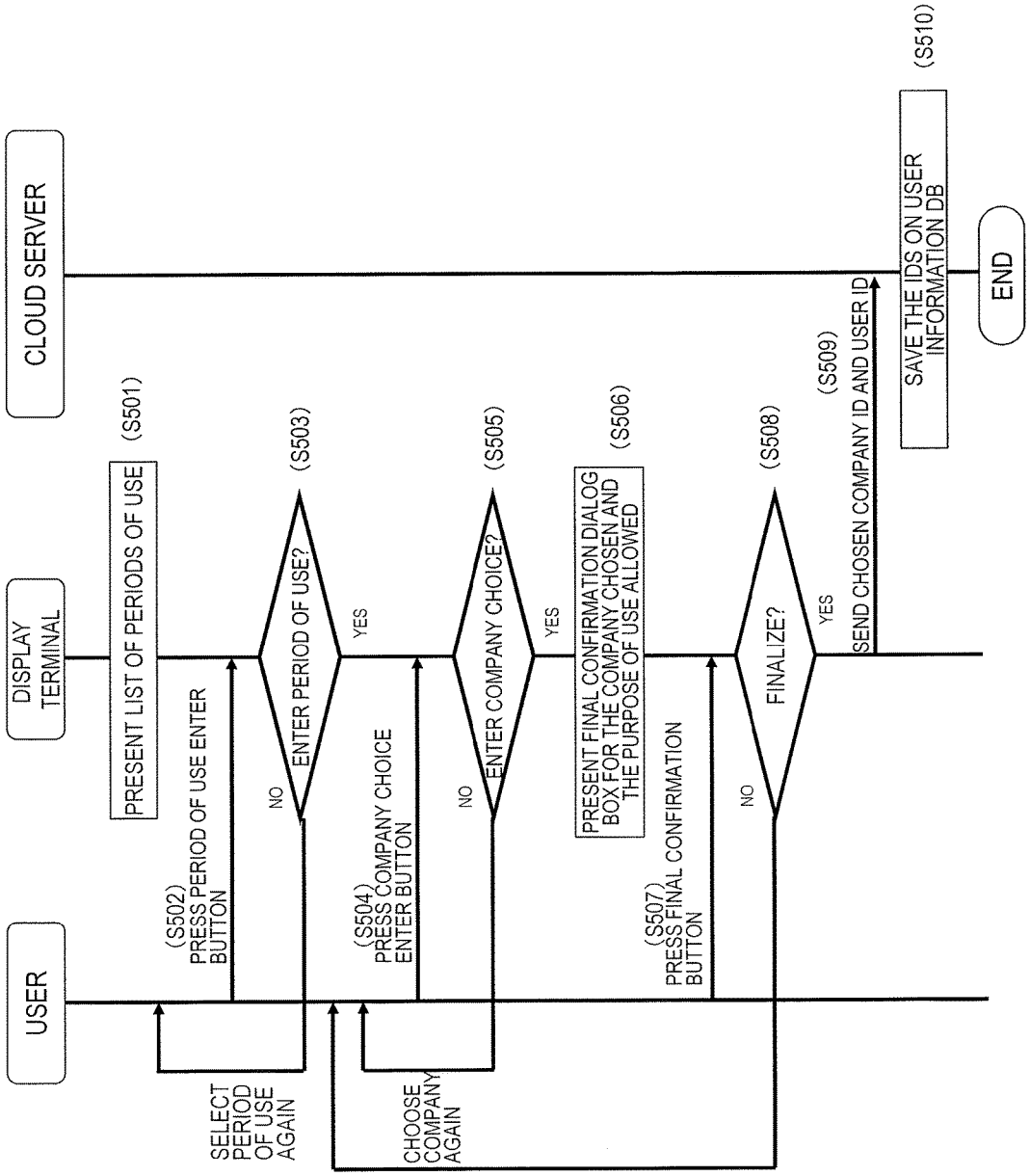
FIG. 23 A diagram that shows a sequence of operations to be performed until the period of use for the company is entered and saved in a user information DB.
Figure 29:
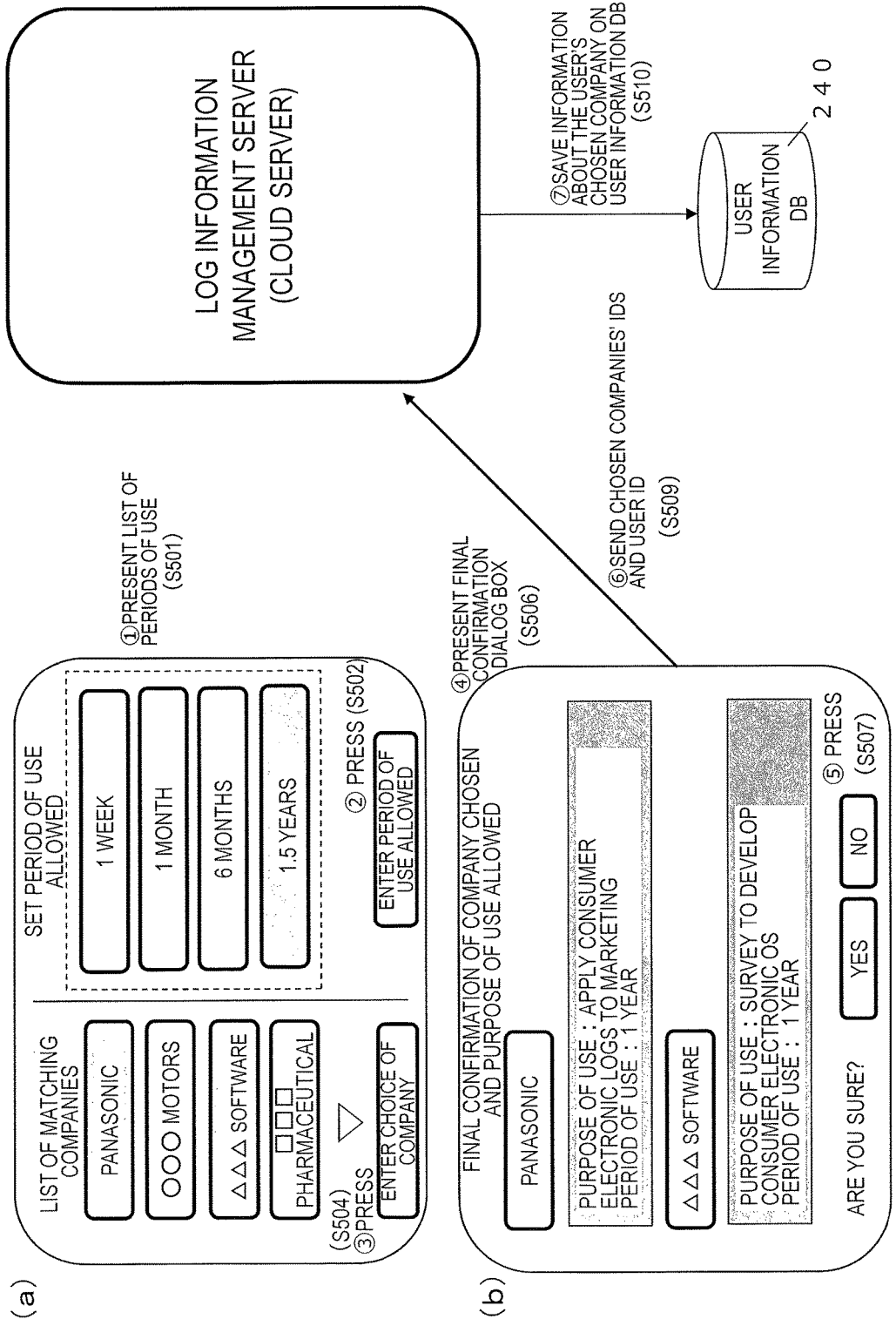
FIG. 29 A diagram that shows an on-screen image and procedure for finalizing the choice of a service provider.

Next, it will be described with reference to FIGS. 23 and 29 what operation needs to be performed until the company that is allowed to use the log information is finally fixed.

When the purpose of use is fixed, the display terminal 300 presents a list of periods of use for which use of the log information will be allowed on the display screen (in Step S501). When the user chooses one of these periods of use and presses the "enter period of use" button (in Step S502), the period of use is entered, and the choice of company enter button is ready to be pressed (i.e., the answer to the query of the processing step S503 is YES). When the "choice of company enter button" shown in FIG. 29 is pressed by the user (in Step S504), the display terminal 300 presents, on the display screen, a final confirmation dialog box asking if the user really wants to enter his or her choice of the company and allow their purpose of use as shown in portion (b) of FIG. 29 (in Step S506). In this case, if the user presses the final confirmation button (i.e., if the answer is "YES" in portion (b) of FIG. 29) (in Step S507), the display terminal 300 finally determines his or her choice (i.e., the answer to the query of the processing step S508 is YES), and transmits the chosen company's ID and the user ID to the cloud server 200 (in Step S509). In this process step, information about the purpose of use and the period of use is also transmitted. In response, the cloud server 200 saves these pieces of information received in the user information DB 240 (in Step S510). Specifically, the user information saving section 285 of the cloud server 200 adds information about the user's choice to the table 240c shown in FIG. 17. As a result, when the log information of that user's consumer electronic device is given out to a service provider's computer next time, the log information will be given out within the range allowed by that user by reference to the information on the table 240c. The cloud server 200 also adds information about the check item set that has been finally fixed by the user to the table 240d shown in FIG. 18, and increments by one the number of users who have adopted that check item set on the table 220c shown in FIG. 1C. In this manner, information about the number of users to be referred to when other users choose a company in the same way will be updated.

By performing these process steps, the choice of a log-use-allowed company by the user gets done. According to this embodiment, the user can make the choice of a company not only based on his or her own criterion but also by reference to other people's criteria as well. As a result, a company can be chosen more appropriately than ever.

Next, it will be described with reference to FIGS. 24 and 30 what operation needs to be performed until the cloud server 200 transmits the log information to the service provider's computer. In the following description, the service provider's computer will be sometimes simply referred to as a "service provider".

When the service provider requests the cloud server 200 to feed log information (in Step S601), the server 200 searches for a user who is ready to give out log information to that company (in Step S602). If there are no such users (i.e., if the answer to the query of the processing step S603 is NO), the cloud server 200 notifies the service provider of an error (in Step S604). On the other hand, if there is any such user (i.e., if the answer to the query of the processing step S603 is YES), the server 200 gets the user's device information (in Step S605). If there are no devices (i.e., if the answer to the query of the processing step S606 is NO), then the server 200 notifies the service provider of an error (in Step S607). On the other hand, if there is any such device, then the server 200 collects log information from that device (in Step S608). When the log information is collected, the server 200 converts that log information into a form that is required by the service provider and that protects personal information (in Step S609). Then, the server 200 transmits the converted log information to the service provider (in Step S610).

Figure 24:
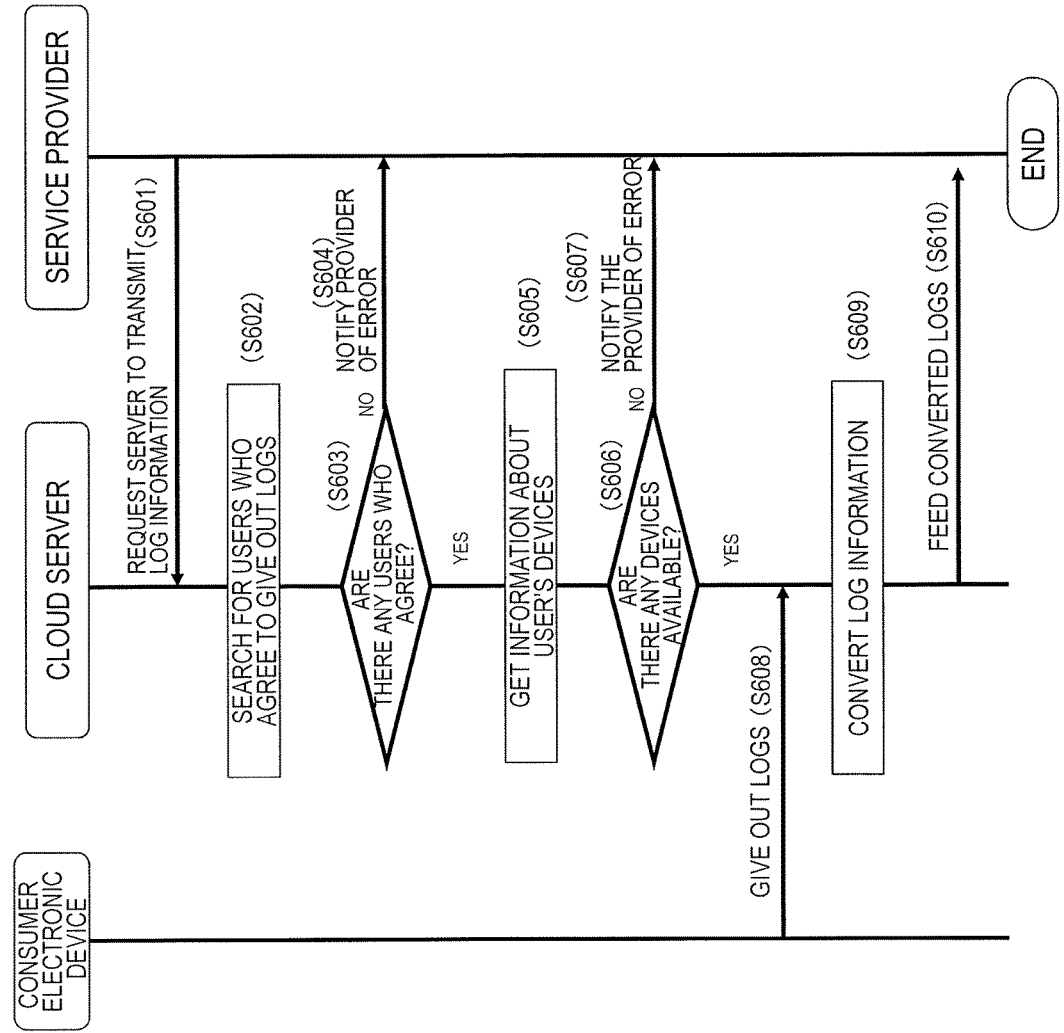
FIG. 24 A diagram that shows a sequence of operations to be performed until a service provider is allowed to use the log information.
Figure 30:
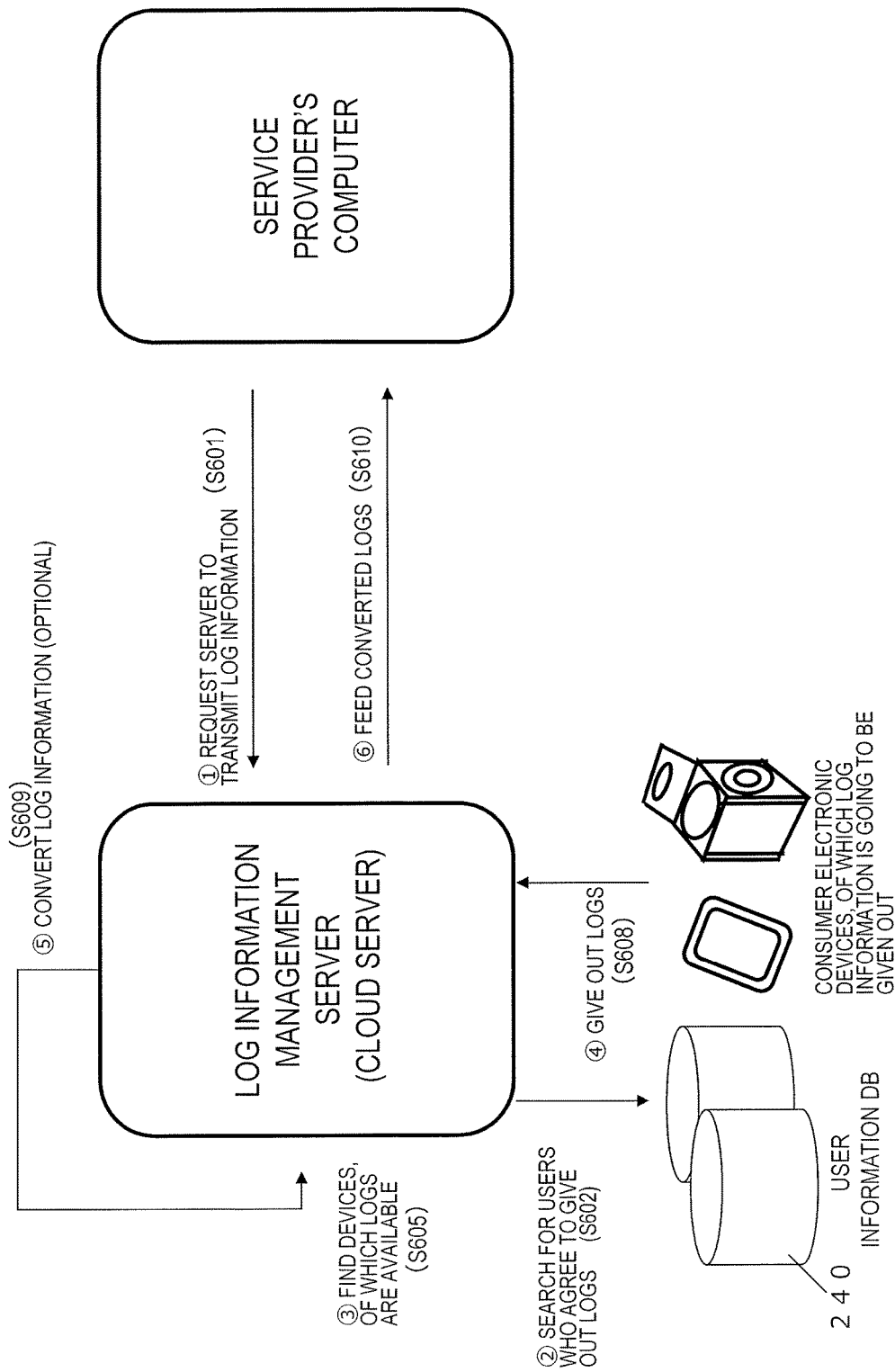
FIG. 30 A diagram that shows the procedure of feeding the log information that has been collected by the information management system to a service provider.

In the example illustrated in FIGS. 24 and 30, every time the service provider asks the server to transmit log information, the log information of a user's consumer electronic device at present is supposed to be collected. However, this is only an example. Alternatively, log information may be collected from a user's consumer electronic device on a regular basis (e.g., once a day), and the log information that has been collected in advance may be transmitted upon a service provider's request.

3-5. Effects

As can be seen from the foregoing description, according to this embodiment, in choosing a service provider who the user is going to allow to use log information, the user can make a decision not only based on his or her own criterion but also by reference to other users' criteria as well. As a result, the user can choose a company to be allowed to use the log information by reference to other people's decisions and with important check items that he or she should miss if he or she made a decision solely by him- or herself taken into account.

In addition, according to this embodiment, when the user either selects or edits a set of check items, he or she can learn how many other users have ever selected that check item set. That is why if only a few people have ever used that combination of check items selected or edited, the user can make a decision easily to select check items all over again, for example.

On top of that, according to this embodiment, after a set of check items has been edited, detailed information about a company that meets the criteria of that check item set is provided. At the same time, information about the purpose of using the log information and the period of use is also provided. That is why the user can specify not only a company to which he or she agrees to give out the log information but also the purpose of using the log information and the period of use as well. As a result, the user can learn not only information about that company but also exactly for what purpose the company is going to use that log information and how long they will use that information. Consequently, the user can control the risk of giving out log information to a certain degree by him- or herself, and he or she can give out the log information with more confidence and more at ease. What is more, the user can decide who will be allowed to use the log information according to their purpose of use and their planned period of use, and therefore, the reliability of the overall system that gives out the log information can be increased. Meanwhile, since the purposes of use can be prepared by the service provider who will use the log information, the log information can be collected on the unit of information required by the service provider.

From the standpoint of the user who is going to give out log information, the log information is sensitive personal information that should be handled carefully. For that reason, the user needs to not only choose a company who will be allowed to use the log information but also define the range in which the log information can be used by specifying a purpose of use and period of use which are acceptable for him or her for each company chosen. On the other hand, the companies need to use the log information for different purposes and for different periods of time from one company to another. Furthermore, a service provider of some large scale should have a high degree of reliability but would use the log information in a broad range. In view of these considerations, according to this embodiment, the purpose and period for which a company is going to use the log information are presented in association with the information displayed about that company.

3-6. Modified Examples

Next, modified examples of this embodiment will be described.

Figure 31:
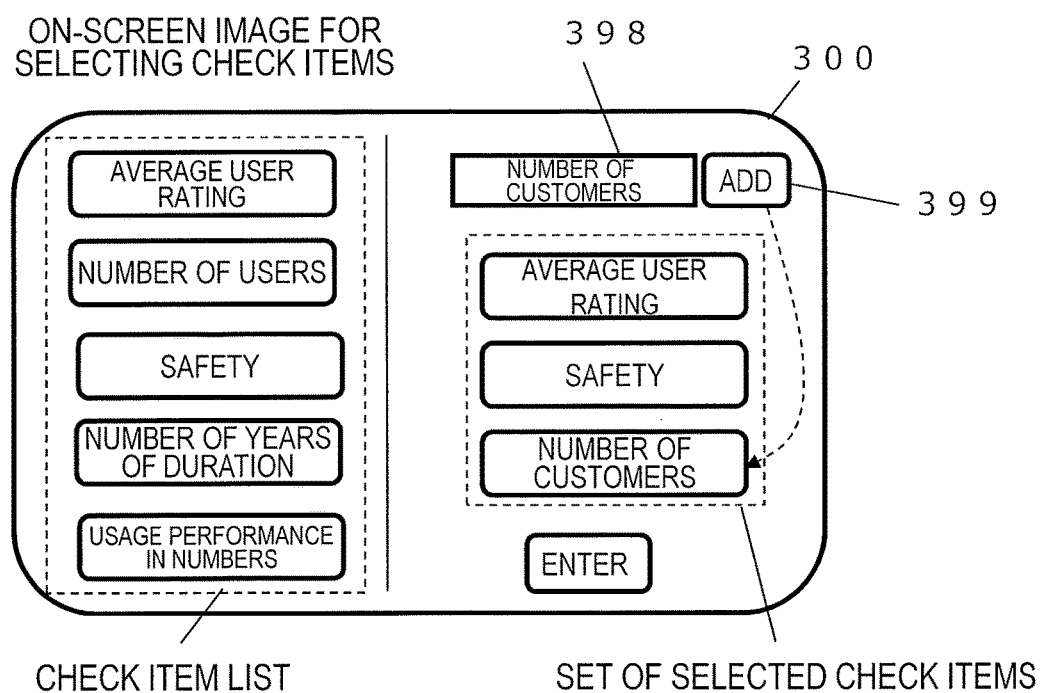
FIG. 31 A diagram that illustrates a modified example of an on-screen image for editing a check item set.

FIG. 31 illustrates a modified example of the on-screen image for selecting check items shown in portion (b) of FIG. 25. In this example, the user can not only select check items from the list of check items by drag and drop manipulation but also enter a keyword as an indicator of reliability into a text box 398 and press the "ADD" button 399 to add that keyword to the list of check items. As a result, the user can save the trouble of searching the list of check items for an item he or she is looking for and can directly specify any item he or she likes.

Figure 26:
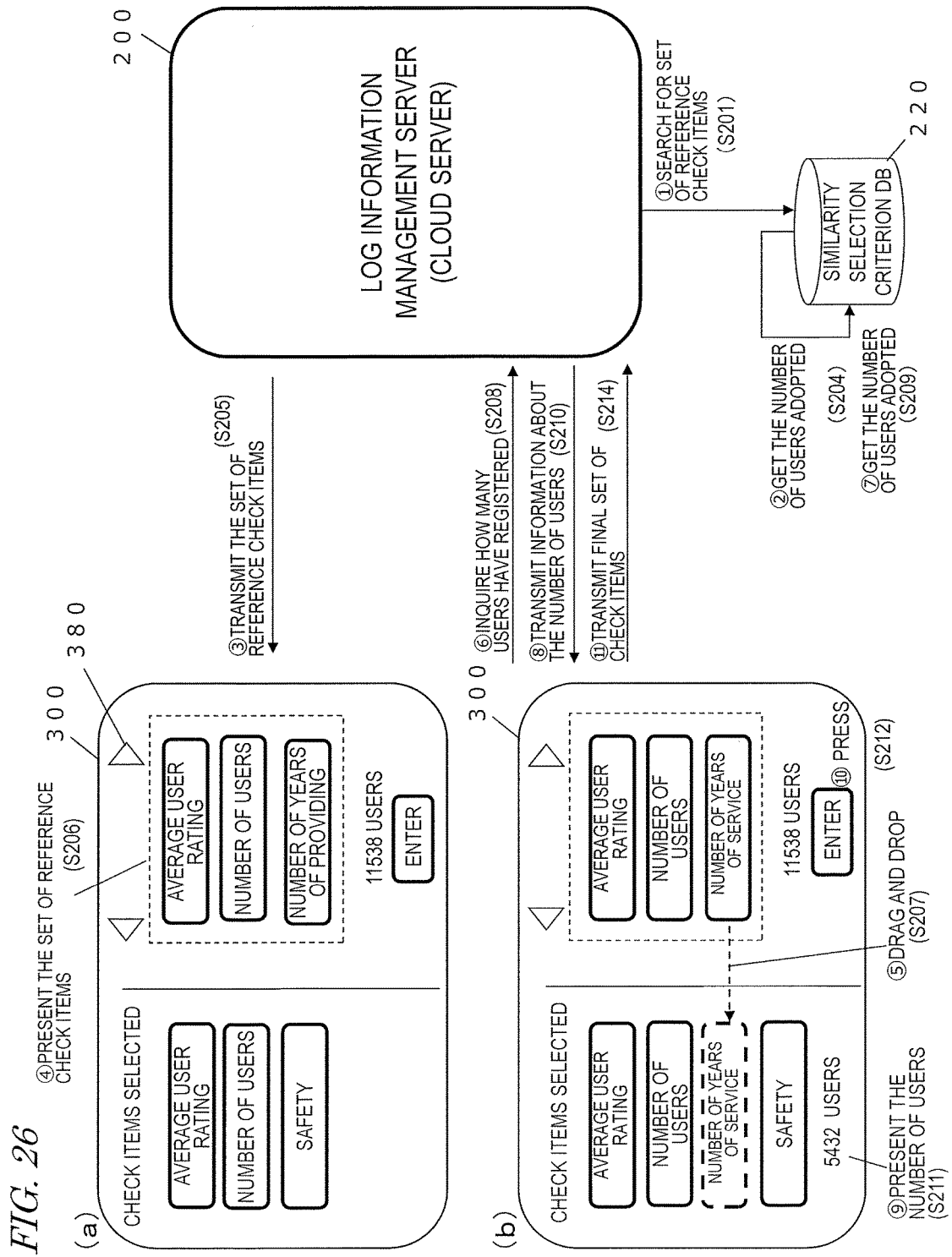
FIG. 26 A diagram that shows the procedure of selecting a check item set which is similar to a check item set that has been selected by the user.
Figure 32:
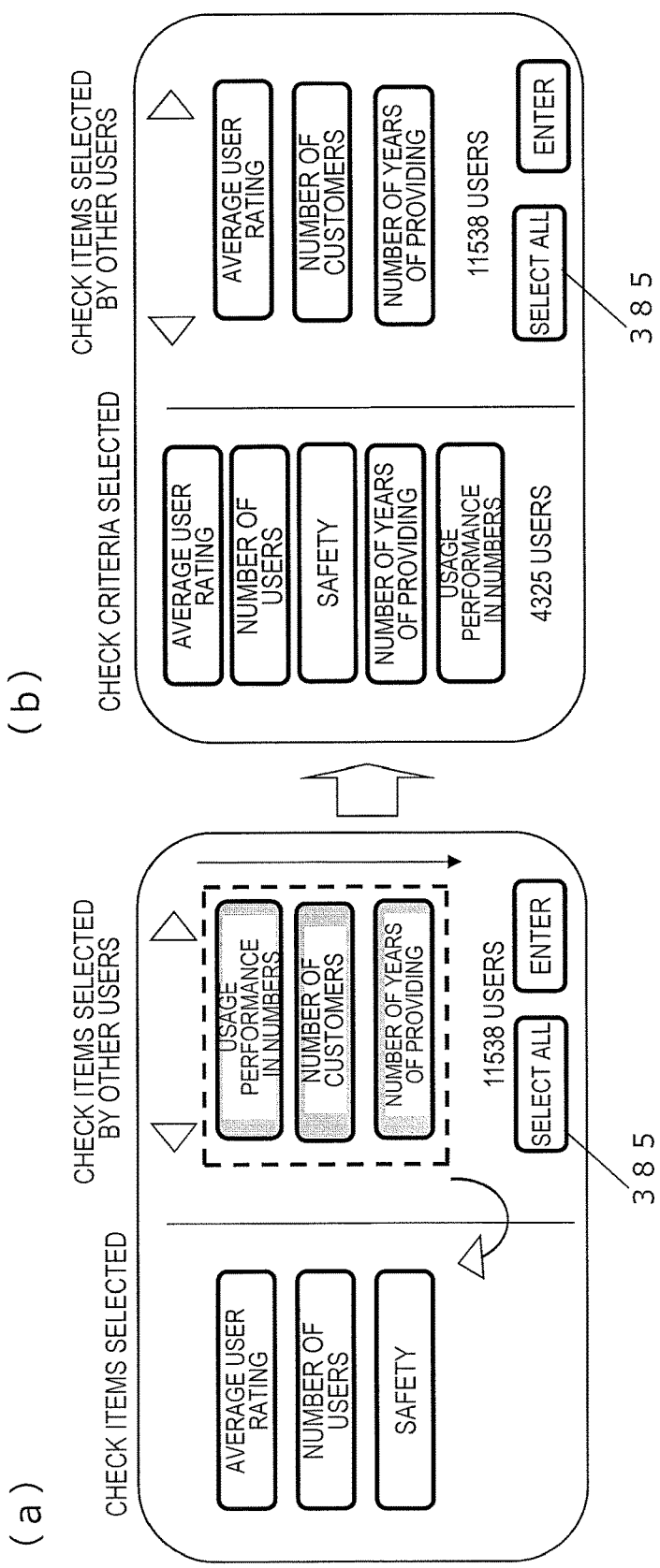
FIG. 32 A diagram that illustrates a modified example in which all items of a set of reference check items are selected at a time.

FIG. 32 illustrates a modified example of an on-screen image presenting a set of reference check items shown in FIG. 26. In the example shown in portion (a) of FIG. 32, a "SELECT ALL" button 385 is further displayed as an additional button. If the user presses the "SELECT ALL" button 385, all of the check items included in the set of reference check items are added to the set of selected check items. In this case, similar items such as "the number of users" and "the number of customers" are automatically merged together and added as a single item as shown in portion (b) of FIG. 32. This modified example can be used effectively particularly when the set of reference check items includes so many items that it will take a lot of time for the user to check out every one of those items. By pressing the "SELECT ALL" button 385, all of those differential check items can be added at a time, thus shortening the amount of time it takes for the user to get his or her selection done. In this example, the user is supposed to be able to enter any keyword he or she likes as in the exemplary embodiment shown in FIG. 31. In such an embodiment, a check item that is not included in the selection criterion DB 210 may be entered by the user and recorded on the similarity selection criterion DB 220. In that case, if the degrees of similarity between the item newly entered and an existent item are automatically checked out so that similar ones, if any, are merged together, it is possible to avoid a situation where substantially the same check items are transmitted redundantly to the cloud server 200.

Figure 33:
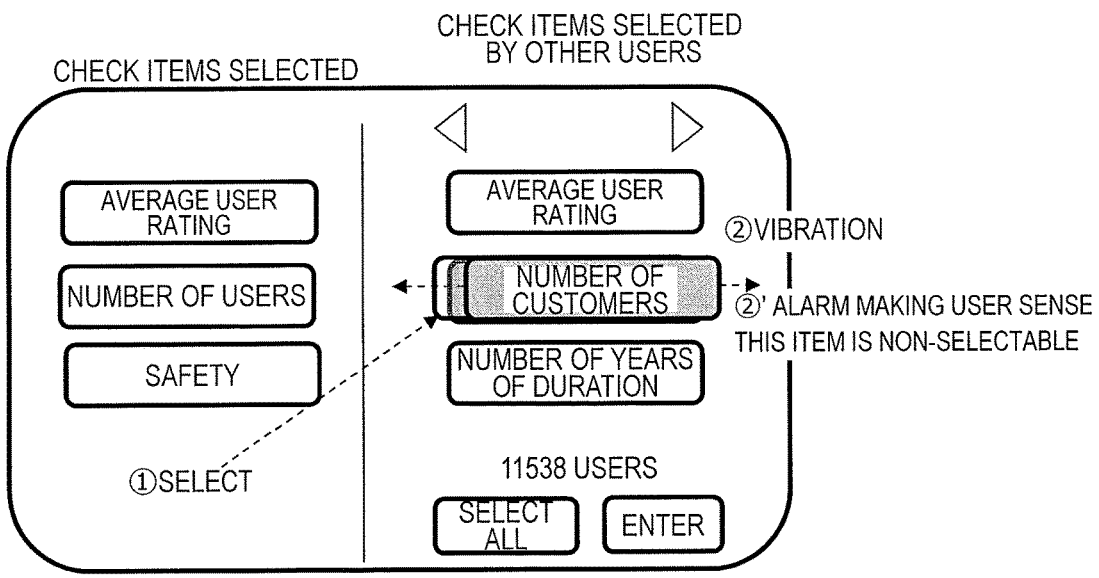
FIG. 33 A diagram that shows a first method of notifying the user of the existence of a similar item during editing.

FIG. 33 illustrates a modified example in which if the set of reference check items includes any item which is similar to one of the check items that have been handpicked as selection criteria by the user him- or herself, the user is alerted to that. In this example, the display terminal 300 is supposed to be a touchscreen. When the user touches one of the items included in the set of reference check items that is similar to one of the check items that have been selected by him- or herself, the point of touch vibrates. In the example illustrated in FIG. 33, the "number of users" and the "number of customers" are similar to each other. That is why when the user touches the "number of customers" button, the point of touch vibrates. As a result, the user can sense that he or she is going to select an item which is similar to one of the items already selected. Optionally, instead of, or in addition to, the vibration, an alarm making the user sense that the item is non-selectable may be sounded. Such an alarm can also warn the user that that item is no longer selectable. It should be noted that only such an alarm without vibration is also applicable to a display terminal with no touchscreen.

Figure 34:
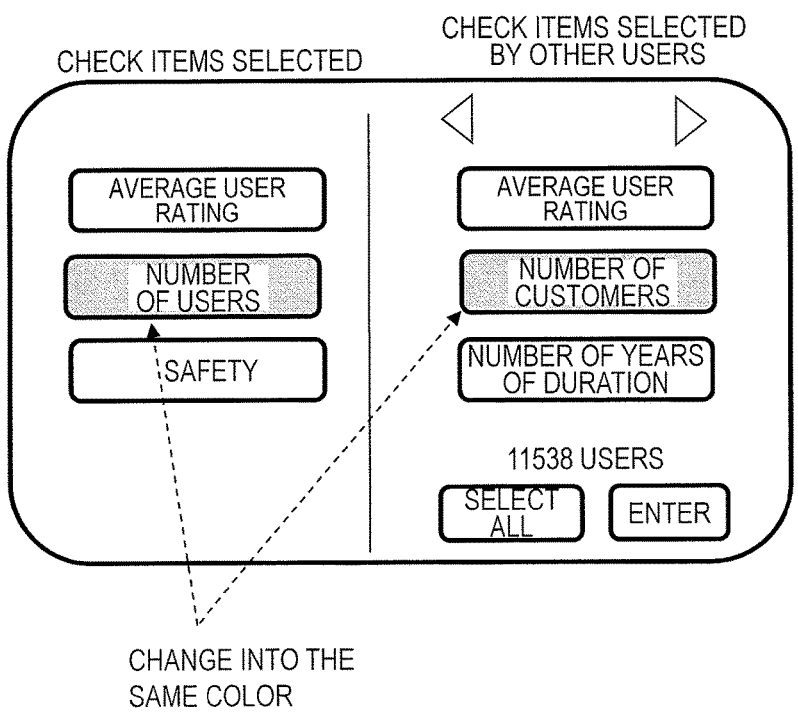
FIG. 34 A diagram that shows a second method of notifying the user of the existence of a similar item during editing.

FIG. 34 illustrates another modified example in which if the set of reference check items includes any item which is similar to one of the check items that have been handpicked as selection criteria by the user him- or herself, the user is alerted to that. In this example, the color of a similar item changes to draw the user's attention to the fact that he or she has already selected a similar item. If there are multiple pairs of similar items, the colors may change into different ones from one pair to another. In this manner, the user can sense the existence of such a pair of similar items intuitively.

Figure 35:
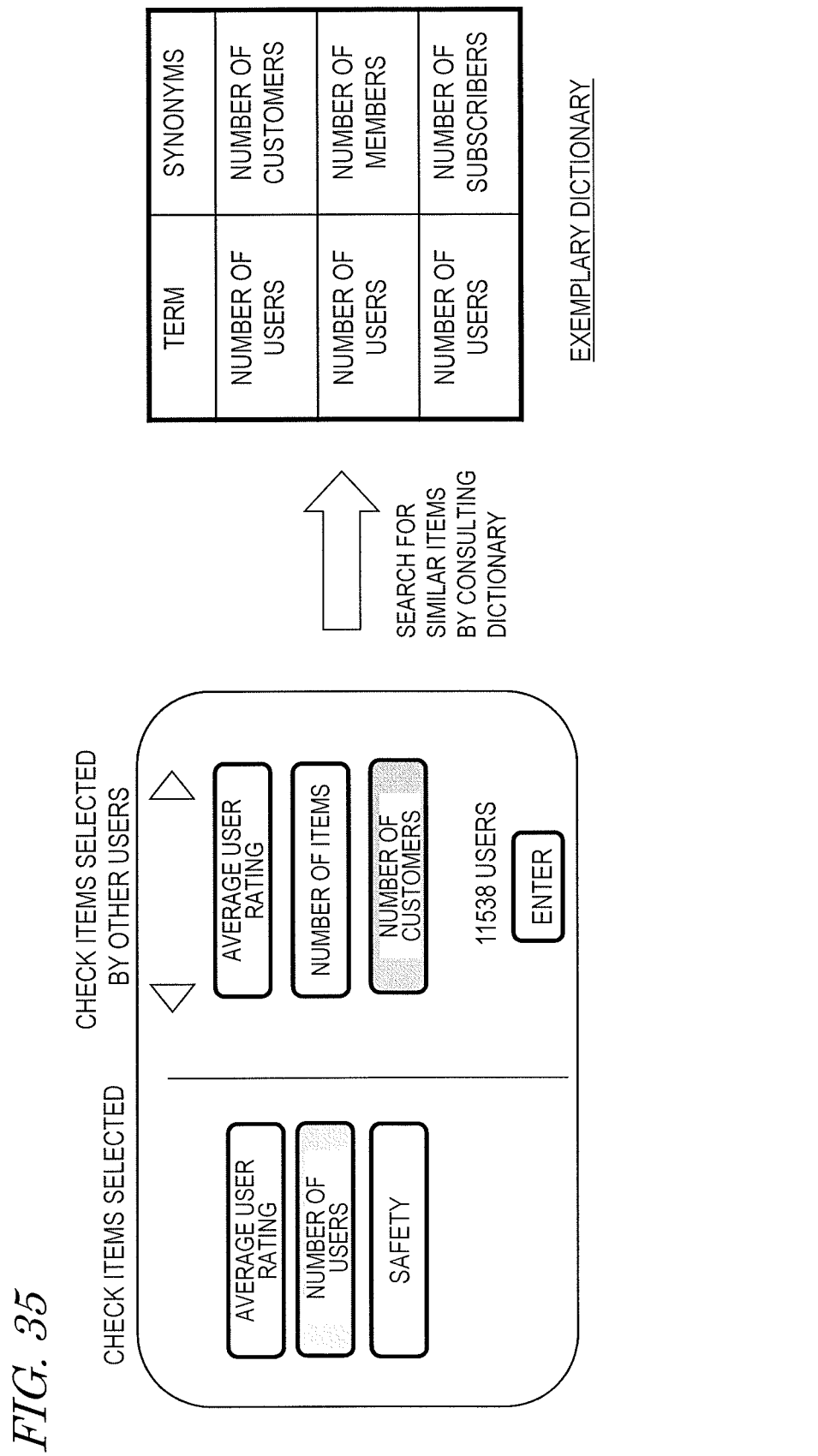
FIG. 35 A diagram that shows how to detect a similar item and present it to the user.

FIG. 35 illustrates an exemplary method for seeing if two check items are similar to each other. Either the display terminal 300 or the cloud server 200 can determine, by consulting a dictionary shown on the right-hand side of FIG. 35, whether or not two items are similar to each other. Such a dictionary may be a piece of information such as a table on which a term and its similar term are recorded in association with each other.

Figure 36:
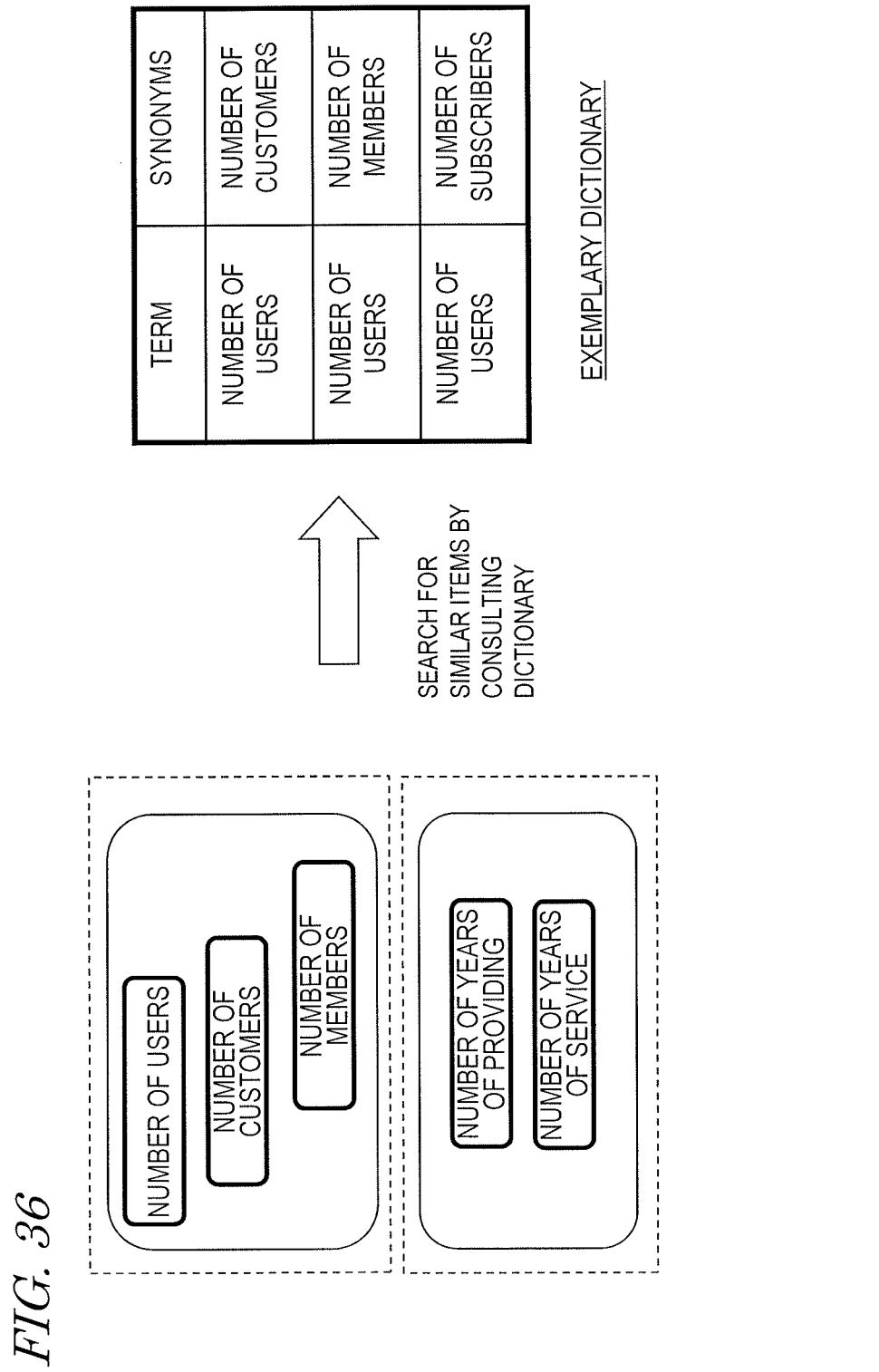
FIG. 36 A diagram that shows how to calculate the degree of similarity (by clustering).

FIG. 36 illustrates a modified example in which the method shown in FIG. 12 is adopted to check out the degree of similarity between multiple sets of check items. In this example, if two sets of check items to be compared to each other include any pair of similar items, the grade will be given by regarding such items as the same item. For example, the "number of users", "number of customers" and "number of members" are classified into the same cluster and regarded as the same item when the grade indicating the degree of similarity shown in FIG. 12 is calculated. The same can be said about the "number of years of providing" and the "number of years of service". In this example, the degree of similarity between two items is also checked out by consulting a dictionary.

FIG. 37 illustrates a modified example of an on-screen image for selecting purposes of use to be allowed. The purposes of use may be selectively allowed by checking off check boxes which are provided for respective purposes of use as shown in FIG. 37 instead of using the on-screen image shown in portion (b) of FIG. 28.

4. Service Providing System According to Embodiment 2

Figure 38:
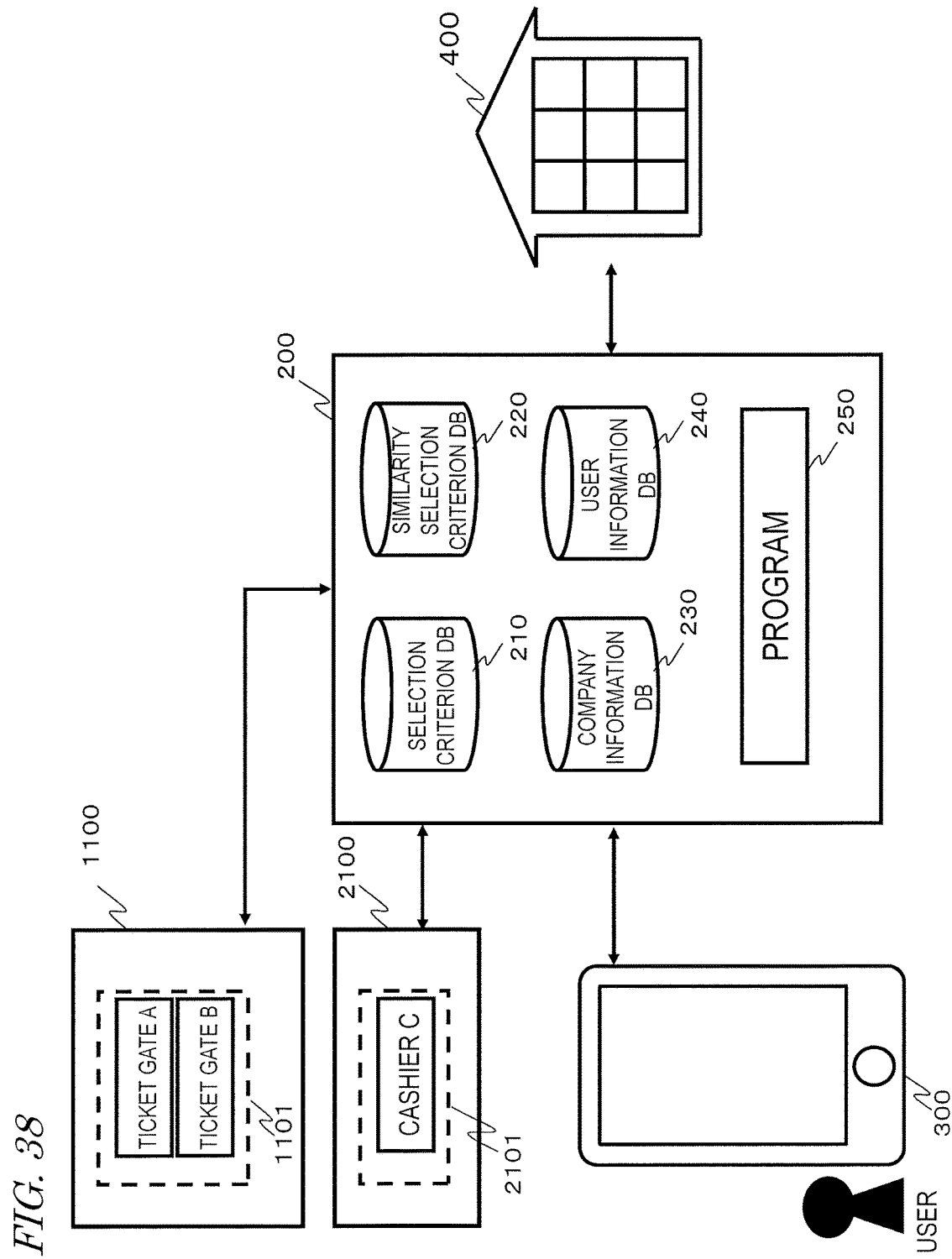
FIG. 38 A diagram that illustrates an overall configuration for an information management system according to a second embodiment.

FIG. 38 outlines a service providing system as a second embodiment of the present disclosure. In this embodiment, the target devices from which log information needs to be collected are automatic ticket gates 1101 in a railway station and a cashier 2101 in a store 2100, which is a difference from the first embodiment described above. The following description of this second embodiment will be focused on only such differences from the first embodiment, and their common features will not be described all over again to avoid redundancies.

When a user enters or leaves a railway station using an IC ticket card, the automatic ticket gate 1101 transmits log information including a user ID identifying the user, the time when he or she entered or left the railway station, and railway station ID identifying that railway station to the cloud server 200 that the railway company manages. On the other hand, when a user purchases a product using an ID card, the cashier 2101 transmits log information including a user ID identifying that user, the time of purchase, and a store ID identifying that store to the cloud server 200.

Just like the first embodiment described above, the cloud server 200 also includes a selection criterion DB 210, a similarity selection criterion DB 220, a company information DB 230 and a user information DB 240. Now it will be described how different these databases are from the counterparts of the first embodiment.

FIG. 39 shows an exemplary table 230a which may be included in the company information DB 230. This table corresponds to the one shown in FIG. 13. In this embodiment, the "service provider" 400 may be a marketing company or a trading company, for example. And their purpose of using the log information may be to use the log information in do marketing in an area surrounding a railway station or in making a marketing research on the degree of correlation between the actual conditions of commuting and the sales of drink products.

FIG. 40 shows an exemplary table 240c which may be included in the user information DB 240. This table 240c corresponds to the one shown in FIG. 17, and stores information about the company who will be allowed to use the log information and their purpose and period of use for each item of the log information the user gives out. This table 240c has an "item" column instead of the "device" column on the table shown in FIG. 17. In the "item" column, information about the combination of a railway station, time, and history of purchase may be stored. In the "purpose of use" column, information such as product development marketing or station surrounding area development marketing may be stored.

FIG. 41 shows another exemplary table 240e which may be included in the user information DB 240. This table 240e stores information about the history of use of an IC ticket card on a user by user basis. Specifically, the information stored there includes a user ID, the type of use (which may be either transportation or purchase), a departing station ID or purchase store ID, a departure time or purchase time, an arriving station ID, an arrival time, product purchased and payment. The "user ID" is an identifier to identify the user uniquely. The "type of use" is a piece of information indicating whether the IC card was used at an automatic ticket gate or at a store's cashier. The "departing station ID" is an identifier to identify the departing station (i.e., the first railway station) if the type of use is "transportation", while the "purchase store ID" is an identifier to identify a store if the type of use is "purchase". The "departure time" is information about the date and time when the user passed through an automatic ticket gate at the departing station, while the "purchase time" is information about the date and time when the user purchased product(s). The "arriving station ID" is an identifier to identify the arriving station (i.e., the second railway station). The "arrival time" is information about the date and time when the user passed through an automatic ticket gate at the arriving station. If the type of use is "purchase", no information about the arriving station ID or the arrival time is stored. "Product purchased" is information about the product purchased if the type of use is "purchase". "Payment" is information about either the amount paid or whether the user used the card within the valid range of his or her commuter pass ticket card.

Figure 42:
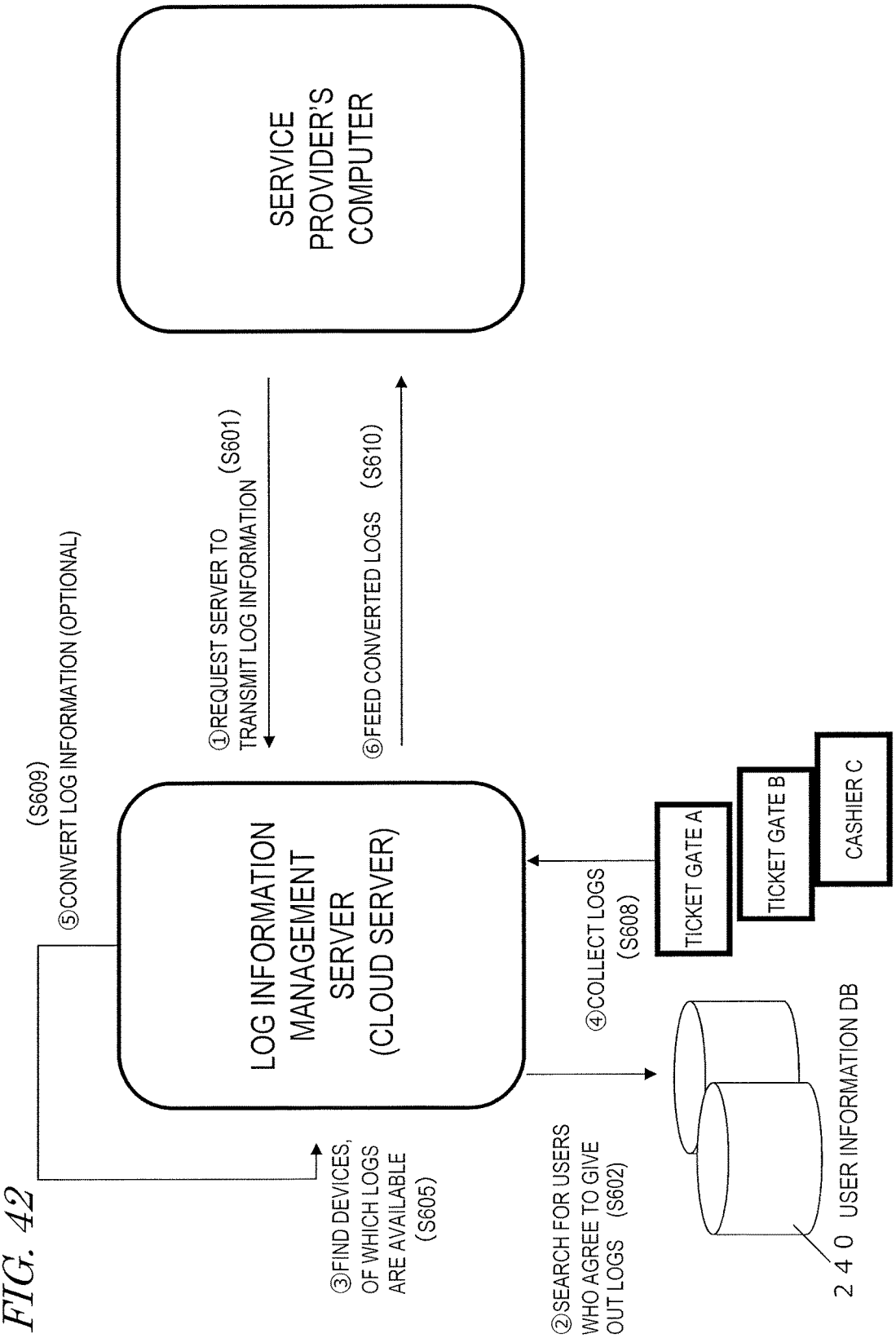
FIG. 42 A diagram that shows the flow of information according to the second embodiment.

FIG. 42 shows the flow of information according to this embodiment. FIG. 42 corresponds to FIG. 30 that has already been referred to for the first embodiment. In FIG. 42, however, the devices to collect log information from are automatic ticket gates and a cashier, which is the only difference from the first embodiment. The operation of determining who will be allowed to use the log information may be performed in quite the same way as in the first embodiment. That is why according to this embodiment, when choosing a service provider who will be allowed to use the log information, the user can make a decision not only based on his or her selection criterion but also by reference to other people's selection criteria as well. As a result, the user can choose a company to be allowed to use the log information by reference to other people's decisions and with important check items that he or she should miss if he or she made a decision solely by him- or herself taken into account.

In this embodiment, information about the history of entering and leaving a railway station through an automatic ticket gate and information about the history of purchase at a store are supposed to be managed collectively. However, these pieces of information may also be managed separately from each other. For example, the table shown in FIG. 41 may be divided according to the type of use. Also, either only information about the history of entering and leaving a railway station through an automatic ticket gate or only information about the history of purchase at a store may be managed.

5. Types of Cloud Services to Implement Service Providing System

The technology that has been described for the embodiments may be implemented as the following types of cloud services. It should be noted that these types of cloud services are just examples and there can be other types of cloud services as well.

5.1. Service Type 1: Cloud Service Using in-House Data Center

Figure 43:
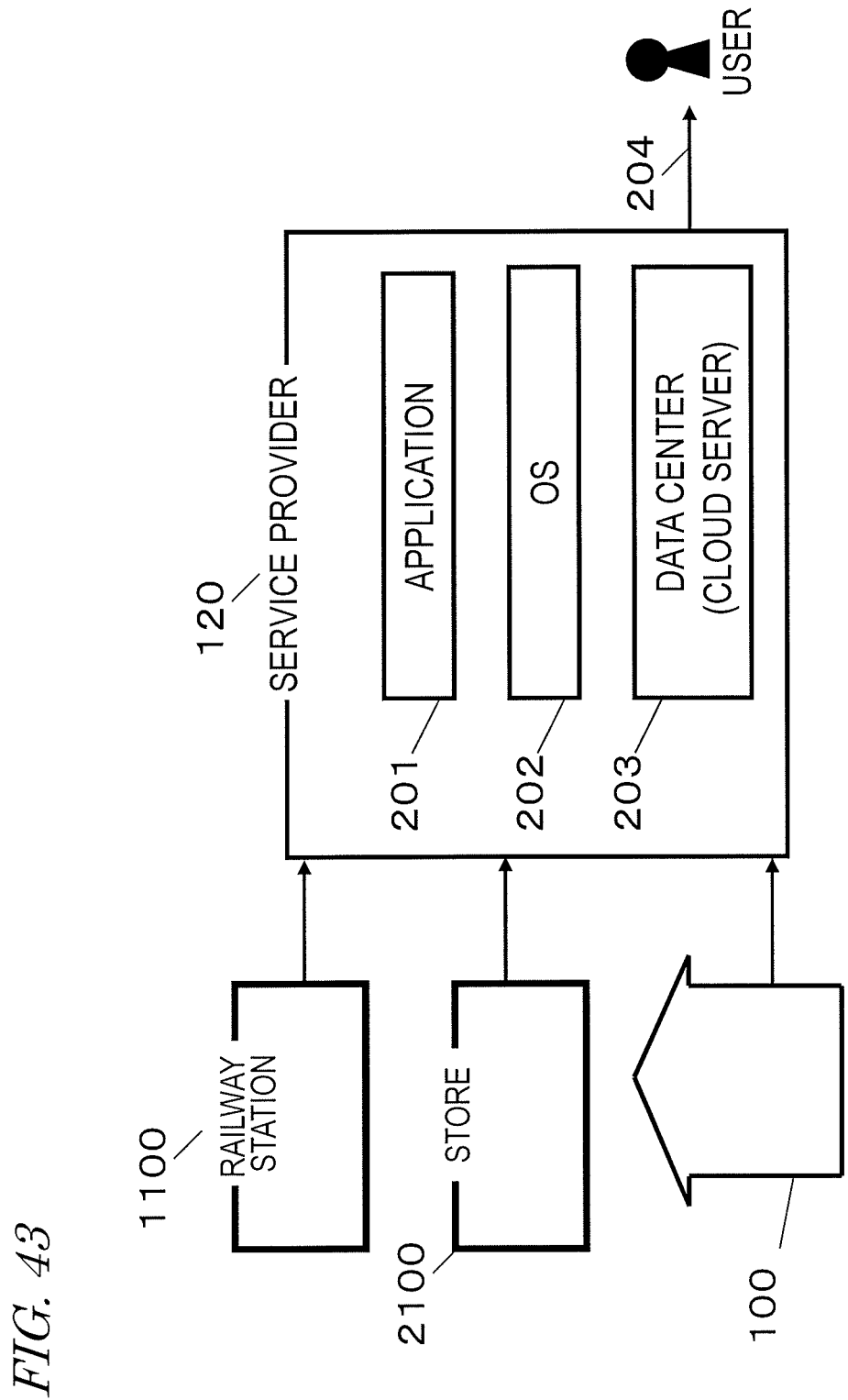
FIG. 43 A diagram that illustrates an overall configuration for an information providing system of Service Type 1 according to the present disclosure.

FIG. 43 outlines the service provided by a system which uses Service Type 1 (cloud service using in-house data center). According to this type, a service provider 120 collects information from target devices which are installed at a user group 100 such as a house, a store 2100 and a railway station 1100, and provides services for the user. According to this type, the service provider 120 functions as a data center operating company. That is to say, the service provider 120 owns a cloud server 203 which manages big data. Thus, there is no data center operating company.

According to this type, the service provider 120 operates and manages the data center (cloud server) 203, and also manages an operating system (OS) 202 and an application 201. And the service provider 120 provides services using the OS 202 and application 201 that are managed by the service provider 120 by itself (as indicated by the arrow 204).

5.2. Service Type 2: Cloud Service Using IaaS

Figure 44:
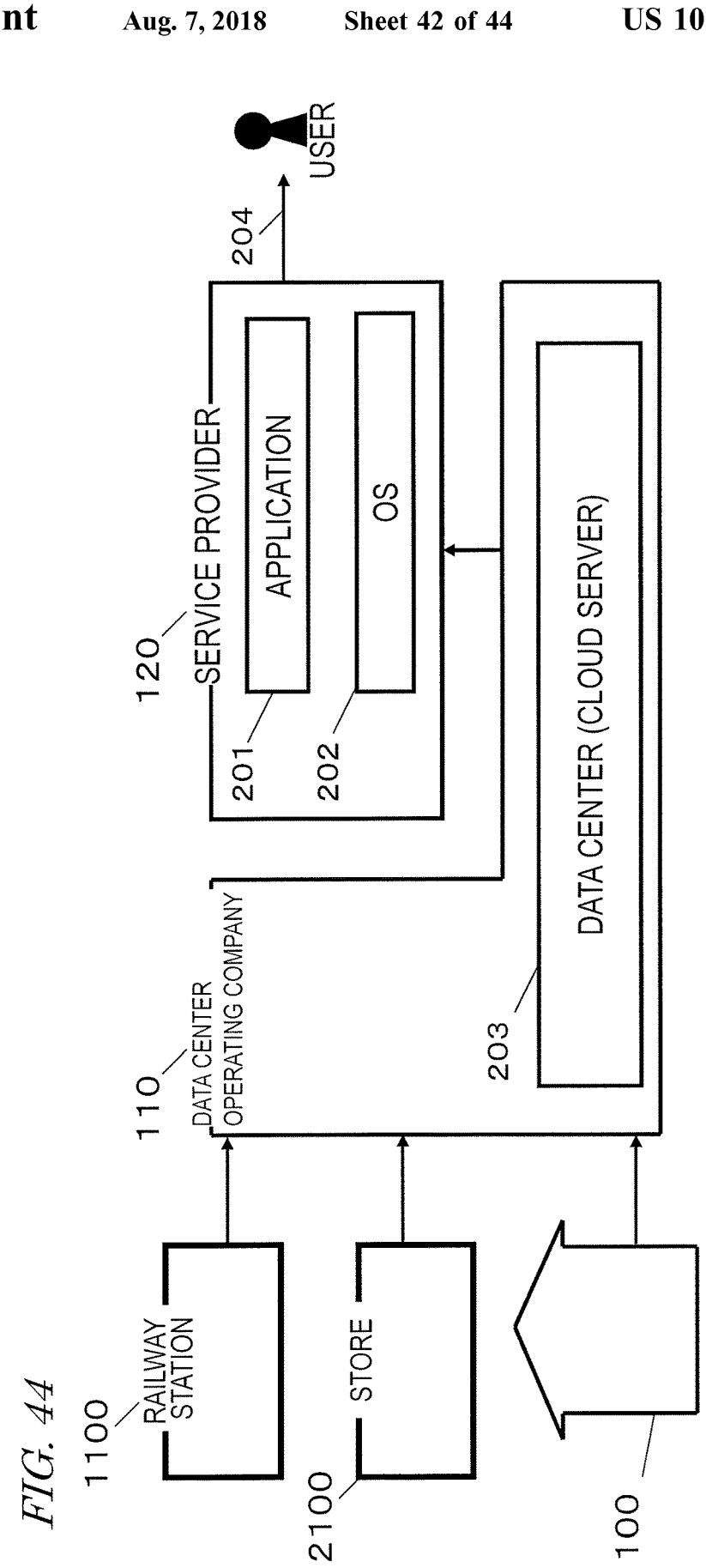
FIG. 44 A diagram that illustrates an overall configuration for an information providing system of Service Type 2 according to the present disclosure.

FIG. 44 outlines the services provided by a system of Service Type 2 (cloud service using IaaS). In this description, IaaS stands for Infrastructure as a Service, and is a cloud service providing model which provides the basis of establishing and operating a computer system as an Internet-based service.

According to this type, the data center operating company 110 operates and manages the data center (cloud server) 203, and collects information from target devices which are installed at a user group 100 such as a house, a store 2100 and a railway station 1100. Meanwhile, the service provider 120 manages an OS 202 and an application 201. And the service provider 120 provides services using the OS 202 and application 201 that are managed by the service provider 120 by itself (as indicated by the arrow 204).

5.3. Service Type 3: Cloud Service Using PaaS

Figure 45:
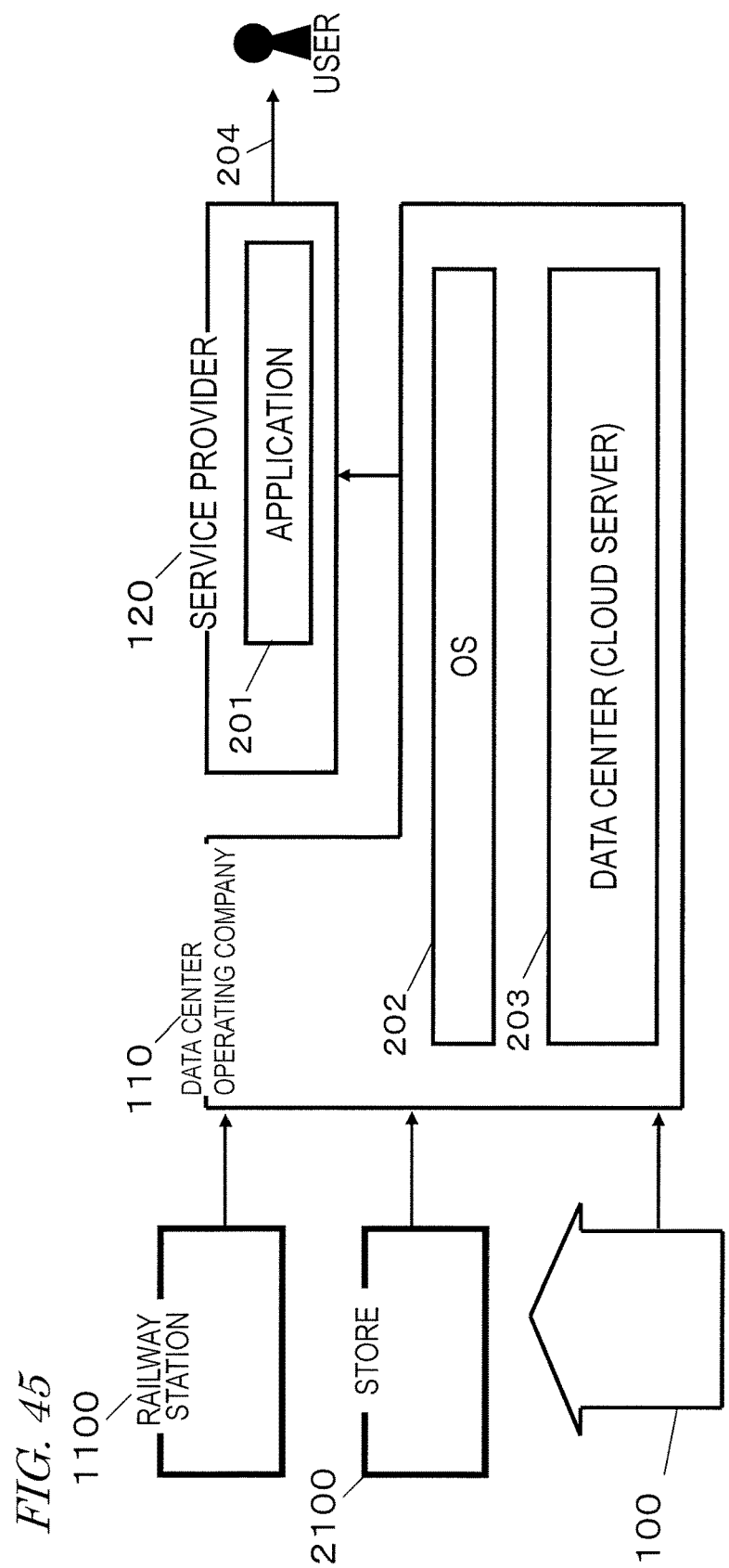
FIG. 45 A diagram that illustrates an overall configuration for an information providing system of Service Type 3 according to the present disclosure.

FIG. 45 outlines the services provided by a system of Service Type 3 (cloud service using PaaS). In this description, PaaS stands for Platform as a Service, and is a cloud service providing model which provides a platform to be the basis of establishing and running software as an Internet-based service.

According to this type, the data center operating company 110 manages the OS 202, operates and manages the data center (cloud server) 203, and collects information from target devices which are installed at a user group 100 such as a house, a store 2100 and a railway station 1100. Meanwhile, the service provider 120 manages an application 201. And the service provider 120 provides services using the OS 202 managed by the data center operating company 110 and the application 201 managed by the service provider 120 itself (as indicated by the arrow 204).

5.4. Service Type 4: Cloud Service Using SaaS

FIG. 46 outlines the services provided by a system of Service Type 4 (cloud service using SaaS). In this description, SaaS stands for Software as a Service, and is a cloud service providing model which has the function of allowing a user such as a company or a person who owns no data center (cloud server) to use, through a network such as the Internet, an application provided by a platform provider who owns a data center (cloud server), for example.

According to this type, the data center operating company 110 manages the application 201 and the OS 202, operates and manages the data center (cloud server) 203, and collects information from target devices which are installed at a user group 100 such as a house, a store 2100 and a railway station 1100. Meanwhile, the service provider 120 provides services using the OS 202 and application 201 managed by the data center operating company 110 (as indicated by the arrow 204).

According to any of these types of cloud services, the service provider 120 provides services. Also, either the service provider or the data center operating company may either develop an OS, an application or a database of big data by themselves or have it developed by a third party.

INDUSTRIAL APPLICABILITY

The technique of the present disclosure can be used effectively to implement a service providing system which provides cloud services using log information of consumer electronic devices.

REFERENCE SIGNS LIST 10, 20 user
100 user group
101 consumer electronic device
102 home gateway
110 data center operating company
111 cloud server
120 service provider
121 service provider's server
200 cloud server
201 application
202 OS
203 data center (cloud server)
210 selection criterion DB
220 similarity selection criterion DB
230 company information DB
240 user information DB
250 computer program
300 display terminal
400 service provider
1100 railway station
1101 automatic ticket gate
2100 store
2101 cashier

The invention claimed is:

1. An information providing method for use in an information management system which collects log information from a target device through a network and provides services by reference to the log information, the target device including a first automatic ticket gate installed at a first railway station and a second automatic ticket gate installed at a second railway station, the method comprising:
 transmitting, in response to a user's access using a display terminal, first display data to the display terminal, the first display data including a plurality of check items to be used by the user who is choosing a service provider to be allowed to use the log information to check the reliability of the service provider, wherein:
  the log information includes entering history information indicating that the user has passed through the first automatic ticket gate to enter the first railway station from outside of the gate and leaving history information indicating that the user has passed through the second automatic ticket gate to leave the second railway station from inside of the gate;
  the entering history information includes a user ID by which the user is identifiable, first passage time information about a point in time when the user passed through the first automatic ticket gate, and a first railway station ID by which the first railway station is identifiable, and
  the leaving history information includes a user ID by which the user is identifiable, second passage time information about a point in time when the user passed through the second automatic ticket gate, and a second railway station ID by which the second railway station is identifiable;
 receiving selection information representing a set of selected check items including at least one check item that has been selected from the plurality of check items included in the first display data using the display terminal;
 transmitting second display data representing a set of reference check items to the display terminal, the set of reference check items including, among a plurality of check items that have been received from a number of other users' terminals, check items which are either similar to, or the same as, check items that are included in the set of selected check items represented by the selection information;
 receiving editing information representing an edited set of check items obtained by editing the set of selected check items by reference to the set of reference check items represented by the second display data at the display terminal, from the display terminal; and
 providing the target device's log information to a computer of the service provider who has been chosen based on the edited set of check items.

2. The information providing method of claim 1, comprising determining, when the selection information is received, by reference to the plurality of check items that have been received from those other users' terminals, whether or not any other user has selected check items that are either similar to, or the same as, check items included in the set of selected check items represented by the selection information, and transmitting, if the answer is yes, the second display data representing the set of reference check items to the display terminal.

3. The information providing method of claim 1, comprising transmitting, when the editing information is received, information about the number of other users who have selected the edited set of check items represented by that editing information to the display terminal.

4. The information providing method of claim 1, wherein the set of reference check items includes at least a half of the check items that are included in the set of selected check items.

5. The information providing method of claim 1, wherein the set of reference check items includes check items, of which the grade indicating a degree of similarity exceeds a predetermined grade, the degree of similarity being calculated based on the contents and arrangement order of those check items that are included in the plurality of check items received from those other users' terminals and on the contents and arrangement order of those check items that are included in the set of selected check items.

6. The information providing method of claim 1, comprising transmitting, when the editing information is received, third display data, including information about at least one service provider who deals with the edited set of check items represented by that editing information, to the display terminal, and the third display data includes purpose of use information about the purpose for which each service provider is going to use that log information.

7. The information providing method of claim 6, wherein the purpose of use information includes at least one item indicating for what purpose the log information is going to be used, and the method comprising transmitting, when the choice of a service provider and a purpose of use that has been made through the display terminal is accepted, information about a period of time for which the service provider chosen is allowed to use the log information for the purpose of use to the display terminal.

8. The information providing method of claim 6, wherein the third display data further includes purpose of use information about a purpose for which each service provider is going to use the log information and period-of-use information about a period of time for which each said service provider is allowed to use the log information for that purpose of use.

9. The information providing method of claim 1, wherein the target device includes a consumer electronic device that the user owns.

10. An information processing method for use in an information management system which collects log information from a target device through a network and provides services by reference to the log information, the target device including a first automatic ticket gate installed at a first railway station and a second automatic ticket gate installed at a second railway station, the method being defined to cause a computer built in a display terminal for use in the information management system to:

present information based on first display data on a display screen, the first display data including a plurality of check items to be used by a user who is choosing a service provider to be allowed to use the log information to check the reliability of the service provider, wherein:

the log information includes entering history information indicating that the user has passed through the first automatic ticket gate to enter the first railway station from outside of the gate and leaving history information indicating that the user has passed through the second automatic ticket gate to leave the second railway station from inside of the gate;

the entering history information includes a user ID by which the user is identifiable, first passage time information about a point in time when the user passed through the first automatic ticket gate, and a first railway station ID by which the first railway station is identifiable, and the leaving history information includes a user ID by which the user is identifiable, second passage time information about a point in time when the user passed through the second automatic ticket gate, and a second railway station ID by which the second railway station is identifiable;

transmit selection information, representing a set of selected check items including at least one check item that has been selected from the plurality of check items, to a server in the information management system;

receive second display data representing a set of reference check items belonging to a plurality of check items that have been received from a number of other users' terminals, the set of reference check items including check items which the server of the information management system has found either similar to, or the same as, check items that are included in the set of selected check items represented by the selection information;

present the set of reference check items represented by the second display data on the display screen; and present the set of selected check items in an editable state on the display screen.

11. The information processing method of claim 10, wherein the computer is further made to transmit editing information, representing an edited set of check items obtained by editing the set of selected check items, to the server of the information management system, and the edited set of check items is obtained by adding at least some check items, which are included in the set of reference check items presented on the display screen, to the set of selected check items.

12. The information processing method of claim 10, wherein the computer is further made to receive the first display data and present the plurality of check items, represented by the first display data received, on the display screen.

13. The information processing method of claim 10, wherein the computer is further made to present the set of selected check items on the display screen in parallel with the set of reference check items being presented on the display screen.

14. The information processing method of one claim 10, wherein the computer is further made to receive third display data, including information about at least one service provider who deals with the edited set of check items represented by the editing information, from the server of the information management system, and present the information about the at least one service provider on the display screen based on the third display data.

15. The information processing method of claim 14, wherein the third display data includes purpose of use information about a purpose for which the at least one service provider is going to use the log information, and the information presented based on the third display data includes an indicator button indicating the purpose for which the at least one service provider is going to use the log information.

16. The information processing method of claim 14, wherein the third display data includes purpose of use information about a purpose for which the at least one service provider is going to use the log information, and the information presented based on the third display data includes at least one item indicating the purpose for which the at least one service provider is going to use the log information.

17. The information processing method of claim 14, wherein the third display data includes purpose of use information about a purpose for which the at least one service provider is going to use the log information, the information presented based on the third display data includes at least one item indicating the purpose for which the at least one service provider is going to use the log information, and when a service provider who is going to be allowed to use the log information is chosen from the at least one service provider presented, the computer is further made to present the at least one item indicating the purpose for which the service provider chosen is going to use the log information on the display screen.

18. The information processing method of claim 14, wherein the third display data includes purpose of use information about a purpose for which the at least one service provider is going to use the log information, the information presented based on the third display data includes an indicator button indicating the purpose for which the at least one service provider is going to use the log information, and the computer is further made to present at least one item indicating the purpose for which the log information is going to be used on the display screen when the indicator button is pressed, transmit information about a service provider who has been chosen from the at least one service provider and information about an item which has been selected from the at least one item indicating the purpose for which the log information is going to be used to the server in the information management system, and receive information about a period of time for which the service provider chosen is allowed to use the log information for the item selected from the server of the information management system.

19. The information processing method of claim 16, wherein the computer is further made to transmit information about a service provider who has been chosen from the at least one service provider and information about an item which has been selected from the at least one item indicating the purpose for which the log information is going to be used to the server in the information management system, and receive information about a period of time for which the service provider chosen is allowed to use the log information for the item selected from the server of the information management system.

20. The information processing method of claim 14, wherein the third display data includes purpose of use information about a purpose for which the at least one service provider is going to use the log information and period-of-use information about a period of time for which use of the log information is allowed for that purpose of use, and information presented based on the third display data further includes an indicator button indicating the period of time for which the log information is usable for the purpose of use.

21. The information processing method of claim 14, wherein the third display data includes purpose of use information about a purpose for which the at least one service provider is going to use the log information and period-of-use information about a period of time for which use of the log information is allowed for that purpose of use, and information presented based on the third display data further includes at least one item indicating the purpose for which the at least one service provider is going to use the log information and information about the period of time for which the log information is usable for the purpose of use.

22. The information processing method of claim 21, wherein when a service provider who is going to be allowed to use the log information is chosen from the at least one service provider presented, the computer is further made to present information about the purpose for which the service provider chosen is going to use the log information and information about a period of time for which the log information is usable for the purpose of use on the display screen.

23. The information processing method of claim 10, wherein the target device includes a consumer electronic device that the user owns.

* * * * *